United States Patent
Haensel et al.

(10) Patent No.: US 11,254,872 B2
(45) Date of Patent: Feb. 22, 2022

(54) LIQUID CRYSTAL MEDIA COMPRISING POLYMERISABLE COMPOUNDS

(71) Applicant: Merck Patent GmbH, Darmstadt (DE)

(72) Inventors: Helmut Haensel, Muehltal (DE);
Steffen Gnauck, Darmstadt (DE);
Qiong Tong, Darmstadt (DE); Sabrina Zeiss, Heppenheim (DE)

(73) Assignee: Merck Patent GmbH, Darmstadt (DE)

( * ) Notice: Subject to any disclaimer, the term of this patent is extended or adjusted under 35 U.S.C. 154(b) by 137 days.

(21) Appl. No.: 16/561,476

(22) Filed: Sep. 5, 2019

(65) Prior Publication Data

US 2020/0080000 A1 Mar. 12, 2020

(30) Foreign Application Priority Data

Sep. 6, 2018 (EP) .................................. 18192958

(51) Int. Cl.
*G02F 1/1333* (2006.01)
*C09K 19/12* (2006.01)
*C09K 19/32* (2006.01)
*C09K 19/04* (2006.01)

(52) U.S. Cl.
CPC ............ *C09K 19/12* (2013.01); *C09K 19/322* (2013.01); *C09K 2019/0448* (2013.01); *C09K 2019/0481* (2013.01); *C09K 2019/122* (2013.01); *C09K 2019/123* (2013.01); *C09K 2019/323* (2013.01)

(58) Field of Classification Search
CPC ................. C09K 19/12; C09K 19/322; C09K 2019/0448; C09K 2019/0481; C09K 2019/122; C09K 2019/123; C09K 2019/323; G02F 1/1333
USPC ..................................................... 252/299.66
See application file for complete search history.

(56) References Cited

U.S. PATENT DOCUMENTS

| | | | | |
|---|---|---|---|---|
| 9,234,136 B2* | 1/2016 | Archetti | ............ | C09K 19/0403 |
| 9,809,748 B2* | 11/2017 | Archetti | ............ | C09K 19/3068 |
| 9,868,904 B2* | 1/2018 | Graziano | ............... | C09K 19/12 |
| 10,131,841 B2* | 11/2018 | Archetti | ............ | C09K 19/3003 |
| 10,273,409 B2* | 4/2019 | Graziano | ........... | C09K 19/0403 |
| 2013/0182202 A1 | 7/2013 | Graziano et al. | | |
| 2014/0138581 A1 | 5/2014 | Archetti et al. | | |
| 2015/0166890 A1 | 6/2015 | Archetti et al. | | |
| 2015/0252265 A1 | 9/2015 | Archetti et al. | | |
| 2020/0080000 A1* | 3/2020 | Haensel | ............... | C09K 19/322 |

FOREIGN PATENT DOCUMENTS

| | | |
|---|---|---|
| WO | 14142168 A1 | 9/2014 |
| WO | 2018162454 A1 | 9/2018 |

OTHER PUBLICATIONS

Office Action in corresponding EP 19195091.4 dated Mar. 10, 2020 (pp. 1-10).

* cited by examiner

*Primary Examiner* — Geraldina Visconti
(74) *Attorney, Agent, or Firm* — Millen White Zelano & Branigan, PC

(57) ABSTRACT

Liquid crystal (LC) media comprising polymerisable compounds as further specified in the description and claims and a self-alignment additive for vertical alignment. The media are adapted for use in LC displays, especially in LC displays of the polymer-sustained alignment type.

20 Claims, No Drawings

LIQUID CRYSTAL MEDIA COMPRISING POLYMERISABLE COMPOUNDS

The present invention relates to liquid crystal (LC) media comprising polymerisable compounds as further specified in the description or claims and a self-alignment additive for vertical alignment. The media are adapted for use in LC displays, especially in LC displays of the polymer-sustained alignment type.

BACKGROUND OF THE INVENTION

One of the liquid crystal display (LCD) modes used at present is the TN ("twisted nematic") mode. However, TN LCDs have the disadvantage of a strong viewing-angle dependence of the contrast.

In addition, so-called VA ("vertically aligned") displays are known which have a broader viewing angle. The LC cell of a VA display contains a layer of an LC medium between two transparent electrodes, where the LC medium usually has a negative dielectric anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive dielectric anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been reported (see, inter alia, S. H. Jung et al., Jpn. J. Appl. Phys., Volume 43, No. 3, 2004, 1028), which contain two electrodes on the same substrate, one of which structured in a comb-shaped manner and the other is unstructured. A strong, so-called "fringe field" is thereby generated, i.e. a strong electric field close to the edge of the electrodes, and, throughout the cell, an electric field which has both a strong vertical component and also a strong horizontal component. FFS displays have a low viewing-angle dependence of the contrast. FFS displays usually contain an LC medium with positive dielectric anisotropy, and an alignment layer, usually of polyimide, which provides planar alignment to the molecules of the LC medium.

FFS displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

Furthermore, FFS displays have been disclosed (see S. H. Lee et al., Appl. Phys. Lett. 73(20), 1998, 2882-2883 and S. H. Lee et al., Liquid Crystals 39(9), 2012, 1141-1148), which have similar electrode design and layer thickness as FFS displays, but comprise a layer of an LC medium with negative dielectric anisotropy instead of an LC medium with positive dielectric anisotropy. The LC medium with negative dielectric anisotropy shows a more favourable director orientation that has less tilt and more twist orientation compared to the LC medium with positive dielectric anisotropy, as a result of which these displays have a higher transmission. The displays further comprise an alignment layer, preferably of polyimide provided on at least one of the substrates that is in contact with the LC medium and induces planar alignment of the LC molecules of the LC medium. These displays are also known as "Ultra Brightness FFS (UB-FFS)" mode displays. These displays require an LC medium with high reliability.

The term "reliability" as used hereinafter means the quality of the performance of the display during time and with different stress loads, such as light load, temperature, humidity, voltage, and comprises display effects such as image sticking (area and line image sticking), mura, yogore etc. which are known to the skilled person in the field of LC displays. As a standard parameter for categorizing the reliability usually the voltage holding ration (VHR) value is used, which is a measure for maintaining a constant electrical voltage in a test display. Among other factors, a high VHR is a prerequisite for a high reliability of the LC medium.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light. A further development of MVA uses protrusions on only one electrode side, while the opposite electrode has slits, which improves the transparency to light. The slitted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA ("patterned VA") displays, protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are displays of the so-called PS ("polymer sustained") or PSA ("polymer sustained alignment") type, for which the term "polymer stabilised" is also occasionally used. In these, a small amount (for example 0.3% by weight, typically <1% by weight) of one or more polymerisable, compound(s), preferably polymerisable monomeric compound(s), is added to the LC medium and, after filling the LC medium into the display, is polymerised or crosslinked in situ, usually by UV photopolymerisation, optionally while a voltage is applied to the electrodes of the display. The polymerisation is carried out at a temperature where the LC medium exhibits a liquid crystal phase, usually at room temperature. The addition of polymerisable mesogenic or liquid-crystalline compounds, also known as reactive mesogens or "RMs", to the LC mixture has proven particularly suitable.

Unless indicated otherwise, the term "PSA" is used hereinafter when referring to displays of the polymer sustained alignment type in general, and the term "PS" is used when referring to specific display modes, like PS-VA, PS-TN and the like.

Also, unless indicated otherwise, the term "RM" is used hereinafter when referring to a polymerisable mesogenic or liquid-crystalline compound.

In the meantime, the PS(A) principle is being used in various conventional LC display modes. Thus, for example, PS-VA, PS-OCB, PS-IPS, PS-FFS, PS-UB-FFS and PS-TN displays are known. The polymerisation of the RMs preferably takes place with an applied voltage in the case of PS-VA and PS-OCB displays, and with or without, preferably without, an applied voltage in the case of PS-IPS displays. As can be demonstrated in test cells, the PS(A) method results in a pretilt in the cell. In the case of PS-OCB displays, for example, it is possible for the bend structure to be stabilised so that an offset voltage is unnecessary or can be reduced. In the case of PS-VA displays, the pretilt has a positive effect on response times. For PS-VA displays, a standard MVA or PVA pixel and electrode layout can be used. In addition, however, it is also possible, for example, to manage with only one structured electrode side and no protrusions, which significantly simplifies production and at the same time results in very good contrast and in very good transparency to light.

PS-VA displays are described, for example, in EP 1 170 626 A2, U.S. Pat. Nos. 6,861,107, 7,169,449, US 2004/0191428 A1, US 2006/0066793 A1 and US 2006/0103804 A1.

Below the layer formed by the phase-separated and polymerised RMs which induce the above mentioned pretilt angle, the PSA display typically contains an alignment layer, for example of polyimide, that provides the initial alignment of the LC molecules before the polymer stabilisation step.

Rubbed polyimide layers have been used for a long time as alignment layers. However, the rubbing process causes a number of problems, like mura, contamination, problems with static discharge, debris, etc. Generally the effort and costs for production of such a polyimide layer are relatively great. Therefore instead of rubbed polyimide layers it was proposed to use polyimide layers prepared by photoalignment, or self-alignment by addition of suitable additives to the LC medium.

In addition, it was observed that unfavourable interaction of the polyimide alignment layer with certain compounds of the LC medium often leads to a reduction of the electrical resistance of the display. The number of suitable and available LC compounds is thus significantly reduced, at the expense of display parameters like viewing-angle dependence, contrast, and response times which are aimed to be improved by the use of such LC compounds. It was therefore desired to omit the polyimide alignment layers.

For some display modes this was achieved by adding a self-alignment agent or additive to the LC medium that induces the desired alignment, for example homeotropic alignment, in situ by a self assembling mechanism. Thereby the alignment layer can be omitted on one or both of the substrates. These display modes are also known as "self-aligned", "self-aligning" or "self-alignment" (SA) modes.

In SA displays a small amount, typically 0.1 to 2.5%, of a self-alignment additive is added to the LC medium. Suitable self-alignment additives are for example compounds having an organic core group and attached thereto one or more polar anchor groups, which are capable of interacting with the substrate surface, causing the additives on the substrate surface to align and induce the desired alignment also in the LC molecules. Preferred self-alignment additives comprise for example a mesogenic group and a straight-chain or branched alkyl side chain that is terminated with one or more polar anchor groups, for example selected from hydroxy, carboxy, amino or thiol groups. The self-aligning additives may also contain one or more polymerisable groups that can be polymerised under similar conditions as the RMs used in the PSA process.

Hitherto SA-VA (self-alignment VA) displays have been disclosed. Suitable self-alignment additives to induce homeotropic alignment, especially for use in VA mode displays, are disclosed for example in US 2013/0182202 A1, US 2014/0138581 A1, US 2015/0166890 A1 and US 2015/0252265 A1.

The SA mode can also be used in combination with the PSA mode. An LC medium for use in a display of such a combined mode thus contains both one or more RMs and one or more self-alignment additives.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, as known from the prior art.

In particular for monitor and especially TV applications, optimisation of the response times, but also of the contrast and luminance (thus also transmission) of the LC display continues to be demanded. The PSA method can provide significant advantages here. In particular in the case of PS-VA, PS-IPS, PS-FFS and PS-posi-VA displays, a shortening of the response times, which correlate with a measurable pretilt in test cells, can be achieved without significant adverse effects on other parameters.

Prior art has suggested biphenyl diacrylates or dimethacrylates, which are optionally fluorinated as RMs for use in PSA displays However, the problem arises that not all combinations consisting of an LC mixture and one or more RMs are suitable for use in PSA displays because, for example, an inadequate tilt or none at all becomes established or since, for example, the VHR is inadequate for TFT display applications. In addition, it has been found that, on use in PSA displays, the LC mixtures and RMs known from the prior art do still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/ RM should have the lowest possible rotational viscosity and the best possible electrical properties.

In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a suitably smaller tilt angle. Preferred materials here are those which produce a lower tilt angle during polymerisation for the same exposure time than the materials known to date, and/or through the use of which the desired result can already be achieved after a shorter exposure time. The production time ("tact time") of the display could thus be shortened and the costs of the production process reduced. However, in combination with other polymerizable components, like the self-alignment additives for vertical alignment, the tilt angle can also become too low. In this case even more tuning of the tilt generating behaviour if the LC medium is required.

A further problem in the production of PSA displays is the presence or removal of residual amounts of unpolymerised RMs, in particular after the polymerisation step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. Thus, RMs and LC mixtures are required which enable or support highly effective and complete polymerisation of the RMs. In addition, controlled reaction of the residual RM amounts would be desirable. This would be simpler if the RM polymerised more rapidly and effectively than the compounds known to date.

A further problem that has been observed in the operation of PSA displays is the stability of the pretilt angle. Thus, it was observed that the pretilt angle, which was generated during display manufacture by polymerising the RM as described above, does not remain constant but can deteriorate after the display was subjected to voltage stress during its operation. This can negatively affect the display performance, e.g. by increasing the black state transmission and hence lowering the contrast.

Another problem to be solved is that the RMs of prior art do often have high melting points, and do only show limited solubility in many currently common LC mixtures, and therefore frequently tend to spontaneously crystallise out of the mixture. In addition, the risk of spontaneous polymerisation prevents the LC host mixture being warmed in order to dissolve the polymerisable component, meaning that the best possible solubility even at room temperature is necessary. In addition, there is a risk of separation, for example on introduction of the LC medium into the LC display (chromatography effect), which may greatly impair the homogeneity of the display. This is further increased by the fact that the LC media are usually introduced at low temperatures in order to reduce the risk of spontaneous polymerisation (see above), which in turn has an adverse effect on the solubility.

Another problem observed in prior art is that the use of conventional LC media in LC displays, including but not limited to displays of the PSA type, often leads to the occurrence of mura in the display, especially when the LC medium is filled in the display cell manufactured using the one drop filling (ODF) method. This phenomenon is also known as "ODF mura". It is therefore desirable to provide LC media which lead to little ODF mura.

Another problem observed in prior art is that LC media for use in PSA displays, including but not limited to displays of the PSA type, do often exhibit high viscosities and, as a consequence, long switching times. In order to reduce the viscosity and switching time of the LC medium, it has been suggested in prior art to add LC compounds with an alkenyl group. However, it was observed that LC media containing alkenyl compounds often show a decrease of the reliability and stability, and a decrease of the VHR especially after exposure to UV radiation. Especially for use in PSA displays this is a considerable disadvantage, because the photopolymerisation of the RMs in the PSA display is usually carried out by exposure to UV radiation, which may cause a VHR drop in the LC medium.

There is thus still a great demand for PSA displays and LC media and polymerisable compounds for use in such displays, which do not show the drawbacks as described above, or only do so to a small extent, and have improved properties.

In particular, there is a great demand for PSA displays, and LC media and polymerisable compounds for use in such PSA displays, which enable a high specific resistance at the same time as a large working-temperature range, short response times, even at low temperatures, and a low threshold voltage, a low pretilt angle, a multiplicity of grey shades, high contrast and a broad viewing angle, have high reliability and high values for the VHR after UV exposure, and, in case of the polymerisable compounds, have low melting points and a high solubility in the LC host mixtures. In PSA displays for mobile applications, it is especially desired to have available LC media that show low threshold voltage and high birefringence.

In the prior art several types of RMs have been reported for use in PSA displays, for example RMs having a biphenyl or terphenyl mesogenic core and attached thereto two or three polymerisable acrylate or methacrylate groups. Biphenyl RMs were shown to exhibit limited polymerisation speed but good reliability parameters, like high VHR or tilt stability, while terphenyl RMs were shown to exhibit fast polymerisation speed but limited reliability parameters. It is therefore desirable to have available RMs that exhibit both fast polymerisation speed and good reliability parameters.

The invention is based on the object of providing novel suitable materials, in particular RMs and LC media comprising the same, for use in PSA displays, which do not have the disadvantages indicated above or do so to a reduced extent.

In particular, the invention is based on the object of providing RMs, and LC media comprising them, for use in PSA displays, which enable very high specific resistance values, high VHR values, high reliability, low threshold voltages, short response times, high birefringence, show good UV absorption especially at longer wavelengths, enable quick and complete polymerisation of the RMs, allow the generation of a suitable tilt angle, preferably as quickly as possible, enable a high stability of the pretilt even after longer time and/or after UV exposure, reduce or prevent the occurrence of "image sticking" and "ODF mura" in the display, and in case of the RMs polymerise as rapidly and completely as possible and show a high solubility in the LC media which are typically used as host mixtures in PSA displays.

A further object of the invention is to provide RMs for use in PSA displays which exhibit both fast polymerisation speed and good reliability parameters, like high VHR or tilt stability.

A further object of the invention is the provision of novel RMs, in particular for optical, electro-optical and electronic applications, and of suitable processes and intermediates for the preparation thereof.

These objects have been achieved in accordance with the present invention by materials and processes as described in the present application. In particular, it has been found, surprisingly, that the use of RMs of formula I as described hereinafter in combination with self-alignment additives of formula II allows achieving the advantageous effects as mentioned above. The compounds of formula I are characterized in that they contain a mesogenic core with one or more benzene or naphthalene rings, one or more polymerisable reactive groups attached thereto, and one or more alkoxymethyl, preferably methoxymethyl, substituents attached thereto.

It was surprisingly found that the use of these RMs, and of LC media comprising them, in PSA displays facilitates a quick and complete UV-photopolymerisation reaction in particular at longer UV wavelengths in the range from 300-380 nm and especially above 320 nm, even without the addition of photoinitiator, leads to a fast generation of a suitable and stable pretilt angle, reduces image sticking and ODF mura in the display, leads to a high reliability and a high VHR value after UV photopolymerisation, especially in case of LC host mixtures containing LC compounds with an alkenyl group, and enables to achieve fast response times, a low threshold voltage and a high birefringence.

In addition, the RMs according to the invention have low melting points, good solubility in a wide range of LC media, especially in commercially available LC host mixtures for PSA use, and a low tendency to crystallisation. Besides, they show good absorption at longer UV wavelengths, in particular in the range from 300-380 nm, and enable a quick and complete polymerisation with small amounts of residual, unreacted RMs in the cell.

Also, it was surprisingly found that the RMs according to the present invention combine a fast polymerisation speed, which is similar to that of terphenyl RMs, with good reliability parameters similar to biphenyl RMs. This results in a superior overall performance compared to RMs of the state of the art.

WO 2014/142168 A1 discloses an LC aligning agent containing crosslinkable compounds with a photoreactive group, and explicitly discloses the following compound

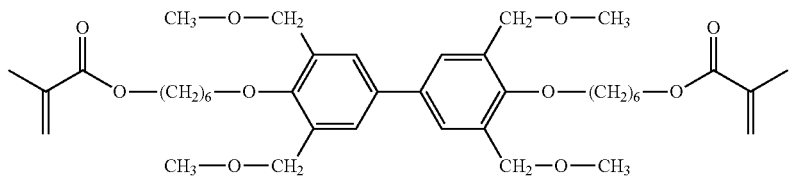

However, this document does neither disclose nor suggest RMs as disclosed and claimed hereinafter, or their use in PSA displays and the advantages thereby achieved.

SUMMARY OF THE INVENTION

The invention relates to an LC medium comprising
a polymerisable component A) comprising, preferably consisting of, one or more polymerisable compounds, at least one of which is a compound of formula I,
a liquid-crystalline (LC) component B), hereinafter also referred to as "LC host mixture", comprising, preferably consisting of, one or more mesogenic or liquid-crystalline compounds, and
one or more self-alignment additives for vertical alignment of formula II
wherein the formula I is defined as:

$$P\text{-}Sp\text{-}A^1\text{-}(Z^1\text{-}A^2)_z\text{-}R \qquad \qquad I$$

wherein the individual radicals, independently of each other and on each occurrence identically or differently, have the following meanings
P a polymerisable group,
Sp a spacer group or a single bond,
$A^1$, $A^2$ independently benzene or naphthalene, which are optionally substituted by one or more groups L, $L^{11}$ or P-Sp-,
  wherein at least one group $A^1$ or $A^2$ is substituted by at least one substituent $L^{11}$,
$Z^1$ —O—, —S—, —CO—, —CO—O—, —O—CO—, —O—CO—O—, —OCH$_2$—, —CH$_2$O—, —SCH$_2$—, —$CH_2S$—, —$CF_2O$—, —$OCF_2$—, —$CF_2S$—, —$SCF_2$—, —$(CH_2)_{n1}$—, —$CF_2CH_2$—, —$CH_2CF_2$—, —$(CF_2)_{n1}$—, —CH=CH—, —CF=CF—, —CH=CF—, —CF=CH—, —C≡C—, —CH=CH—CO—O—, —O—CO—CH=CH—, —$CH_2$—$CH_2$—CO—O—, —O—CO—$CH_2$—$CH_2$—, —$CR^0R^{00}$—, or a single bond, $R^0$, $R^{00}$ independently H or alkyl having 1 to 12 C atoms, $L^{11}$ —$CH_2$—O—$CH_3$, —$CH_2$—O—$C_2H_5$ or —$CH_2$—O—$C_3H_7$, preferably —$CH_2$—O—$CH_3$, R H, L, $L^{11}$, P-Sp- or -Sp(P)$_2$, L F, Cl, —CN, P-Sp- or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl, z 0, 1, 2 or 3, and n1 1, 2, 3 or 4;

and wherein the formula II is defined as:

$$\text{MES-}R^a \qquad \qquad \text{II}$$

in which

MES is a calamitic mesogenic group comprising two or more rings which are connected directly or indirectly to each other or which are condensed to each other, which rings are optionally substituted and which mesogenic group is optionally substituted additionally by one or more polymerizable groups which are connected to MES directly or via a spacer, and $R^a$ is a polar anchor group, residing in a terminal position of the calamitic mesogenic group MES, and the anchor group comprises at least one carbon atom and at least one group selected from —OH, —SH, —COOH, —CHO or primary or secondary amine function, preferably one or two OH groups, and which optionally contains one or two polymerizable groups P.

The liquid-crystalline component B) of an LC medium according to the present invention is hereinafter also referred to as "LC host mixture" or "LC component B)", and preferably comprises one or more, preferably at least two mesogenic or LC compounds selected from low-molecular-weight compounds which are unpolymerisable.

The invention furthermore relates to an LC medium or LC display as described above, wherein the compounds of formula I, or the polymerisable compounds of component A), are polymerised.

The invention furthermore relates to a process for preparing an LC medium as described above and below, comprising the steps of mixing one or more mesogenic or LC compounds, or an LC host mixture or LC component B) as described above and below, with one or more compounds of formula I, and optionally with further LC compounds and/or additives.

The invention furthermore relates to the use of LC media according to the invention in PSA displays, in particular the use in PSA displays containing an LC medium, for the production of a tilt angle in the LC medium by in-situ polymerisation of the compound(s) of the formula I in the PSA display, preferably in an electric or magnetic field.

The invention furthermore relates to an LC display comprising one or more compounds each of formula I and II or an LC medium according to the invention, in particular a PSA display, particularly preferably a PS-VA, PS-UB-FFS or PS-posi-VA display.

The invention furthermore relates to the use of compounds of formula I and LC media according to the invention in polymer stabilised SA-VA displays, and to a polymer stabilised SA-VA display comprising one or more compounds of formula I or an LC medium according to the invention.

The invention furthermore relates to an LC display comprising a polymer obtainable by polymerisation of an LC medium according to the invention, which is preferably a PSA display, very preferably a PS-VA, PS-UB-FFS, or polymer stabilised SA-VA display.

The invention furthermore relates to an LC display of the PSA type comprising two substrates, at least one which is transparent to light, an electrode provided on each substrate or two electrodes provided on only one of the substrates, and located between the substrates a layer of an LC medium that comprises an LC medium as described above and below, wherein the polymerisable compounds are polymerised between the substrates of the display.

The invention furthermore relates to a process for manufacturing an LC display as described above and below, comprising the steps of filling or otherwise providing an LC medium according to the invention as described above and below, between the substrates of the display, and polymerising the polymerisable compounds.

The PSA displays according to the invention have two electrodes, preferably in the form of transparent layers, which are applied to one or both of the substrates. In some displays, for example in PS-VA, or polymer stabilised SA-VA displays, one electrode is applied to each of the two substrates. In other displays, for example in PS-posi-VA or PS-IPS both electrodes are applied to only one of the two substrates.

In a preferred embodiment the polymerisable component is polymerised in the LC display while a voltage is applied to the electrodes of the display.

The polymerisable compounds of the polymerisable component are preferably polymerised by photopolymerisation, very preferably by UV photopolymerisation.

Prior art document WO 2014/142168 A1 discloses an LC aligning agent that is crosslinkable and photoreactive and contains benzyloxymethyl groups which are designated as crosslinkable groups. However in order to start a crosslinking reaction of such benzyloxymethyl groups the presence of a strong acid is required, in analogy to phenol formaldehyde resins. Such benzyloxymethyl groups do however not react under the polymerisation conditions as used for the compounds of formula I according to the present invention. Thus the $CH_2OCH_3$ group in this application is not considered to be within the meaning of the term "polymerisable group" as used herein.

The conditions for the polymerisation of compounds of formula I are preferably selected such that the $L^{11}$ (e.g. $CH_2OCH_3$) substituents do not participate in the polymerisation reaction. Preferably the LC media disclosed and claimed in the present application do not contain a photoacid or another additive that enables participation of the $L^{11}$ (e.g. $CH_2OCH_3$) group in a crosslinking reaction.

DETAILED DESCRIPTION OF THE INVENTION

The compounds of formula I show the following advantageous properties when used in vertically self-aligned PSA displays:

a suitable tilt generation which is inside a certain process window, fast polymerization leading to minimal residues of RM after the UV-process,
a high voltage-holding-ratio after the UV-process,
good tilt stability,
sufficient stability against heat,
sufficient solubility in organic solvents typically used in display manufacture.

In particular the compounds of formula I combine a fast polymerisation speed which is similar to terphenyl RMs with good reliability parameters similar to biphenyl RMs. This results in a superior overall performance of the compounds compared to RMs of the state of the art when used in PSA displays.

In the compounds of formula I the presence of one or more alkoxymethylene, preferably methoxymethylene, substituents $L^{11}$ on the benzene or naphthylene rings were found to enhance superior properties of the compounds, like fast polymerisation speed and good reliability. However, the substituents $L^{11}$ are not designated as a polymerisable or crosslinkable group that should participate in the polymerisation reaction of the compound.

A preferred embodiment of the present invention thus relates to the use of the compounds of formula I in a polymerisation reaction where the conditions for polymerisation of the groups P are selected such that the alkoxymethylene substituents, i.e., groups $L^{11}$, do not participate in the polymerisation reaction.

Unless stated otherwise, the compounds of formula I are preferably selected from achiral compounds.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

As used herein, the terms "reactive mesogen" and "RM" will be understood to mean a compound containing a mesogenic or liquid-crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

An SA-VA display according to the present invention will be of the polymer stabilised mode as it contains, or is manufactured by use of, an LC medium containing an RM of formula I. Consequently, as used herein, the term "SA-VA display", when referring to a display according to the present invention, will be understood to refer to a polymer stabilised SA-VA display even if not explicitly mentioned.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

The term "mesogenic group" as used herein is known to the person skilled in the art and described in the literature, and means a group which, due to the anisotropy of its attracting and repelling interactions, essentially contributes to causing a liquid crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

A "calamitic" mesogenic group as used herein is a rod-shaped mesogenic group, as opposed to disc-shaped (discotic group). It may have lateral and terminal substituents on the rod-shaped core. Terminal substituents are those located at the tips of the rodlike shape. The rod-shaped core is usually made up of an organic group, typically and preferably by a combination of two or more ring systems. In the case of three or more ring systems, these are connected in a substantially linear fashion which causes the rod-shape (e.g. a terphenyl). Rings can be connected by single bonds, by small organic groups (bridges) or can be fused rings, where single bonds are preferred.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

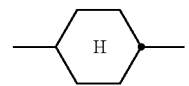

denotes a trans-1,4-cyclohexylene ring, and

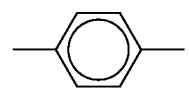

denotes a 1,4-phenylene ring.

In a group

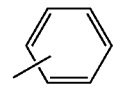

the single bond shown between the two ring atoms can be attached to any free position of the benzene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I, preferably F or Cl. —CO—, —C(=O)— and —C(O)— denote a carbonyl group, i.e.

A carbon or hydrocarbon group can be a saturated or unsaturated group.

Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by hetero atoms, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoro-n-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxy-ethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, n-decoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds.

Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted.

Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents of the above-mentioned cyclic groups are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents of the above-mentioned cyclic groups, hereinafter also referred to as "L", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P- or P-Sp-, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents $L^S$ are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

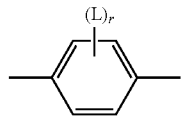

is preferably

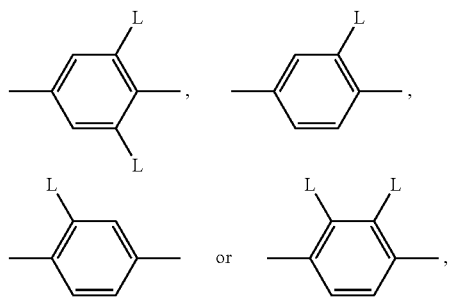

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2$=$CW^1$—CO—O— $CH_2$=$CW^1$—CO—,

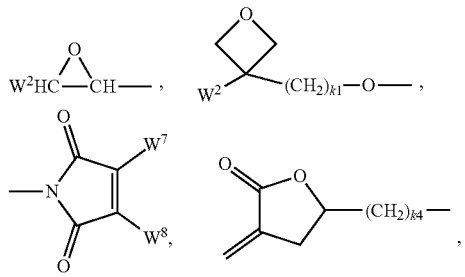

$CH_2$=$CW^2$—(O)$_{k3}$—, $CW^1$=CH—CO—(O)$_{k3}$—, $CW^1$=CH—CO—NH—, $CH_2$=$CW^1$—CO—NH—, $CH_3$—CH=CH—O—, ($CH_2$=CH)$_2$CH—OCO—, ($CH_2$=CH—$CH_2$)$_2$CH—OCO—, ($CH_2$=CH)$_2$CH—O—, ($CH_2$=CH—$CH_2$)$_2$N—, ($CH_2$=CH—$CH_2$)$_2$N—CO—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, $CH_2$=CH—(CO)$_{k1}$-Phe-(O)$_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1-CO-O-$, $CH_2=CW^1-CO-$,

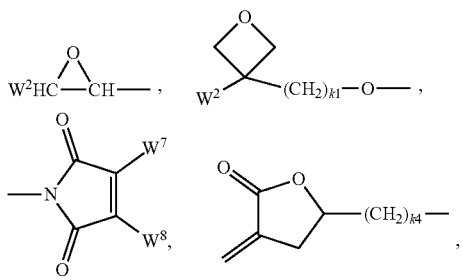

$CH_2=CW^2-O-$, $CH_2=CW^2-$, $CW^1=CH-CO-(O)_{k3}-$, $CW^1=CH-CO-NH-$, $CH_2=CW-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH— and $W^4W^5W^6Si-$, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

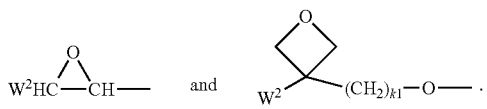

Further preferred polymerisable groups P are selected from the group consisting of vinyloxy, acrylate, methacrylate, fluoroacrylate, chloroacrylate, oxetane and epoxide, most preferably from acrylate and methacrylate.

If the spacer group Sp is different from a single bond, it is preferably of the formula Sp"-X", so that the respective radical P-Sp- conforms to the formula P-Sp"-X"—, wherein Sp" denotes linear or branched alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N($R^0$)—, —Si($R^0R^{00}$)—, —CO—, —CO—O—, —O—CO—, —O—CO—O—, —S—CO—, —CO—S—, —N($R^{00}$)—CO—O—, —O—CO—N($R^0$)—, —N($R^0$)—CO—N($R^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R)—, —N($R^0$)—CO—, —N($R^0$)—CO—N($R^{00}$)—, —OCH_2—, —CH_2O—, —SCH_2—, —CH_2S—, —CF_2O—, —OCF_2—, —CF_2S—, —SCF_2—, —CF_2CH_2—, —CH_2CF_2—, —CF_2CF_2—, —CH=N—, —N=CH—, —N=N—, —CH=CR^0—, —CY^2=CY^3—, —C≡C—, —CH=CH—CO—O—, —O—CO—CH=CH— or a single bond, $R^0$ and $R^{00}$ each, independently of one another, denote H or alkyl having 1 to 20 C atoms, and $Y^2$ and $Y^3$ each, independently of one another, denote H, F, Cl or CN.

X" is preferably —O—, —S—, —CO—, —COO—, —OCO—, —O—COO—, —CO—$NR^0$—, —$NR^0$—CO—, —$NR^0$—CO—$NR^0$— or a single bond.

Typical spacer groups Sp and -Sp"-X"— are, for example, —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, —$(CH_2CH_2O)_{q1}$—$CH_2CH_2$—, —$CH_2$—, —$CH_2$—S—$CH_2CH_2$—, —$CH_2CH_2$—NH—$CH_2CH_2$— or —$(SiR^0R^{00}$—O$)_{p1}$—, in which p1 is an integer from 1 to 12, q1 is an integer from 1 to 3, and $R^0$ and $R^{00}$ have the meanings indicated above.

Particularly preferred groups Sp and -Sp"-X"— are —$(CH_2)_{p1}$—, —$(CH_2)_{p1}$—O—, —$(CH_2)_{p1}$—O—CO—, —$(CH_2)_{p1}$—CO—O—, —$(CH_2)_{p1}$—O—CO—O—, in which p1 and q1 have the meanings indicated above.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a preferred embodiment of the invention the compounds of formula I and its subformulae contain a group R=Sp(P)$_2$. Very preferred compounds of formula I according to this preferred embodiment contain a group R selected from the following formulae:

| | |
|---|---|
| —X-alkyl-CHPP | S1 |
| —X-alkyl-CH(($CH_2)_{aa}$P)(($CH_2)_{bb}$P) | S2 |
| —X—N(($CH_2)_{aa}$P)(($CH_2)_{bb}$P) | S3 |
| —X-alkyl-CHP—$CH_2$—$CH_2$P | S4 |
| —X-alkyl-C($CH_2$P)($CH_2$P)—$C_{aa}H_{2aa+1}$ | S5 |
| —X-alkyl-CHP—$CH_2$P | S6 |
| —X-alkyl-CPP—$C_{aa}H_{2aa+1}$ | S7 |
| —X-alkyl-CHPCHP—$C_{aa}H_{2aa+1}$ | S8 | in which P is as defined in formula I, alkyl denotes a single bond or straight-chain or branched alkylene having 1 to 12 C atoms which is unsubstituted or mono- or polysubstituted by F, Cl or CN and in which one or more non-adjacent $CH_2$ groups may each, independently of one another, be replaced by —C($R^0$)=C($R^0$)—, —C≡C—, —N(R⁰)—, —O—, —S—, —CO—, —CO—O—, —O—CO—, —O—CO—O— in such a way that O and/or S atoms are not linked directly to one another, where R⁰ has the meaning indicated above, aa and bb each, independently of one another, denote 0, 1, 2, 3, 4, 5 or 6, X has one of the meanings indicated for X", and is preferably O, CO, SO₂, O—CO—, CO—O or a single bond.

Preferred spacer groups Sp(P)₂ are selected from formulae S1, S2 and S3.

Very preferred spacer groups Sp(P)₂ are selected from the following subformulae:

| | |
|---|---|
| —CHPP | S1a |
| —O—CHPP | S1b |
| —CH₂—CHPP | S1c |
| —OCH₂—CHPP | S1d |
| —CH(CH₂—P)(CH₂—P) | S2a |
| —OCH(CH₂—P)(CH₂—P) | S2b |
| —CH₂—CH(CH₂—P)(CH₂—P) | S2c |
| —OCH₂—CH(CH₂—P)(CH₂—P) | S2d |
| —CO—NH((CH₂)₂P)((CH₂)₂P) | S3a |

In the compounds of formulae I and II and their subformulae as described above and below, P is preferably selected from the group consisting of vinyloxy, acrylate, methacrylate, fluoroacrylate, chloroacrylate, oxetane and epoxide, most preferably from acrylate and methacrylate.

Further preferred are compounds of formula I and its subformulae as described above and below, wherein all polymerisable groups P that are present in the compound have the same meaning, and very preferably denote acrylate or methacrylate, most preferably methacrylate.

In the compounds of formula I and its subformulae as described above and below, R preferably denotes P-Sp- or -Sp(P)₂, most preferably -Sp-P.

Further preferred are compounds of formula I and its subformulae as described above and below, wherein Sp denotes a single bond or —(CH₂)$_{p1}$—, —O—(CH₂)$_{p1}$—, —O—CO—(CH₂)$_{p1}$, or —CO—O—(CH₂)$_{p1}$, wherein p1 is 2, 3, 4, 5 or 6, and, if Sp is —O—(CH₂)$_{p1}$—, —O—CO—(CH₂)$_{p1}$ or —CO—O—(CH₂)$_{p1}$ the O-atom or CO-group, respectively, is linked to the benzene ring.

Further preferred are compounds of formula I and its subformulae as described above and below, wherein A¹-(Z¹-A²)$_z$ denotes biphenyl and the compound contains two or more groups P-Sp-, then at least one of the groups Sp that are present in the compound is a single bond. Further preferred are compounds of formula I in general and its subformulae as described above and below, wherein at least one group Sp is a single bond.

Further preferred are compounds of formula I and its subformulae as described above and below, wherein at least one group Sp is different from a single bond, and is preferably selected from —(CH₂)$_{p1}$—, —O—(CH₂)$_{p1}$—, —O—CO(CH₂)$_{p1}$, or —CO—O—(CH₂)$_{p1}$, wherein p1 is 2, 3, 4, 5 or 6, and, if Sp is —O(CH₂)$_{p1}$—, —O—CO—(CH₂)$_{p1}$ or —CO—O—(CH₂)$_{p1}$ the O-atom or CO-group, respectively, is linked to the benzene ring.

In the compounds of formula and its subformulae A¹ and A² are preferably selected from phenylene-1,4-diyl, phenylene-1,3-diyl, and naphthalene 2,6-diyl, all of which are optionally substituted by one or more groups L, L¹¹ or P—Sp- as defined in formula I.

Preferred compounds of formula I and its subformulae are those wherein z is 1 and A¹ and A² are selected from phenylene-1,4-diyl and naphthalene 2,6-diyl, all of which are optionally substituted by one or more groups L, L¹¹ or P—Sp- as defined in formula I.

Further preferred compounds of formula I and its subformulae are those wherein z is 2 and A¹ and A² are selected from phenylene-1,4-diyl, phenylene-1,3-diyl and naphthalene 2,6-diyl, all of which are optionally substituted by one or more groups L, L¹¹ or P-Sp- as defined in formula I.

Very preferred groups for the partial group -A¹-(Z-A²)$_z$- in formula I are selected from the following formulae

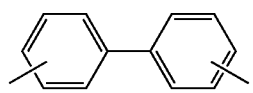
A1

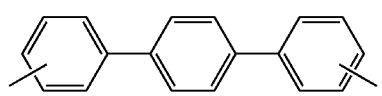
A2

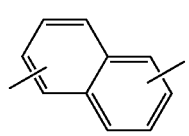
A3

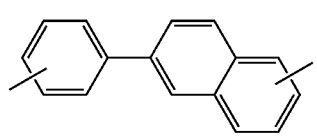
A4

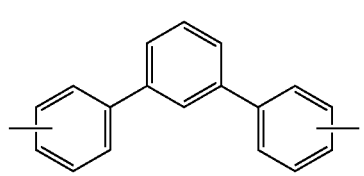
A5 wherein at least one ring is substituted by at least one group L¹¹ and the benzene rings are optionally further substituted by one or more groups L or P-Sp-.

Preferred compounds of formula I are selected from the following subformulae

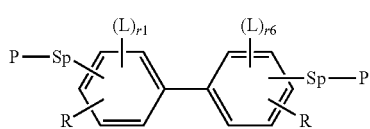
I1

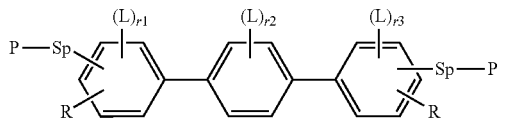
I2 wherein P, Sp, R and L have the meanings given in formula I, r1, r3 are independently of each other 0, 1, 2 or 3, r2 is 0, 1, 2, 3 or 4, r4, r5, are independently of each other 0, 1 or 2, wherein r1+r6≥1, r1+r2+r3≥1, r4+r5≥1, r1+r3+r4≥1, and at least one group L denotes —CH$_2$—O—CH$_3$, —CH$_2$—O—C$_2$H$_5$ or —CH$_2$—O—C$_3$H$_7$, preferably —CH$_2$—O—CH$_3$, and wherein in formula I1 at least one of the groups Sp is a single bond.

Preferred are compounds of formula I1-I5 wherein one of the two groups R is H and the other is P-Sp.

Further preferred are compounds of formula I1-I5 wherein both groups R denote H.

Further preferred are compounds of formula I1-I5 wherein both groups R denote P-Sp.

Very preferred are compounds of formula I1, I2 and I5.

Very preferred compounds of formula I and I1-I5 are selected from the following subformulae:

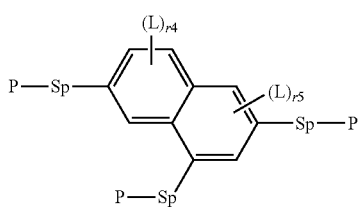
I3-4

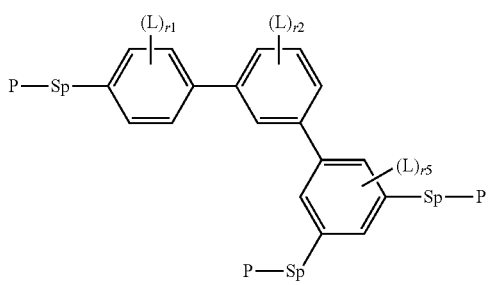
I3-5 wherein P, Sp, P(Sp)$_2$, L have the meanings given in formula I and above, r1-r6 have the meanings given for formulae I1 to I5,
and at least one group L, preferably one or two, more preferably one group L denotes —CH$_2$—O—CH$_3$, —CH$_2$—O—C$_2$H$_5$ or —CH$_2$—O—C$_3$H$_7$, preferably —CH$_2$—O—CH$_3$.

Preferred compounds of formula I1 to I5 and I1-1 to I5-5 are those wherein all groups Sp denote a single bond.

Very preferred compounds of formula I are selected from the following subformulae:

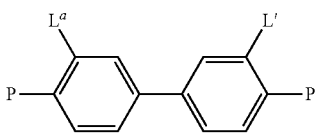
I1-1-1

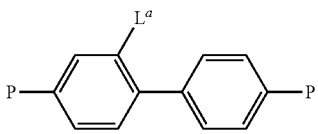
I1-1-2

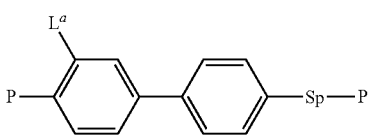
I1-1-3

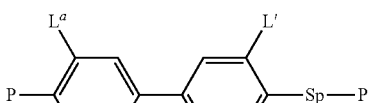
I1-1-4

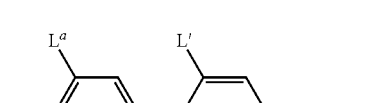
I1-1-5

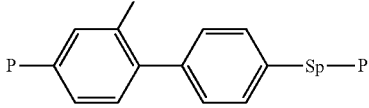
I1-1-6

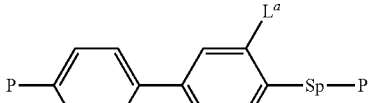
I1-1-7

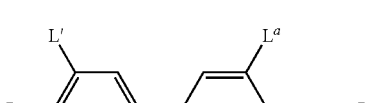
I1-1-8

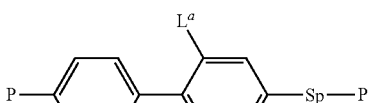
I1-1-9

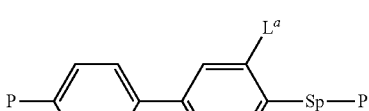
I1-1-10

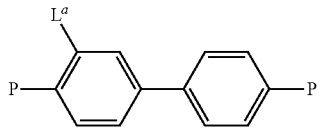
I1-1-11

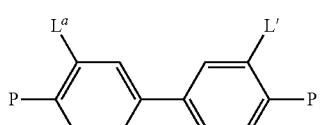
I1-1-12

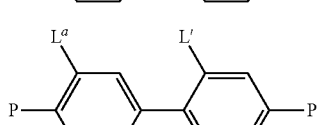
I1-1-13

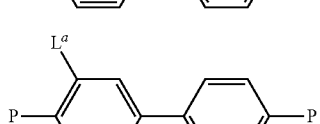
I1-1-14

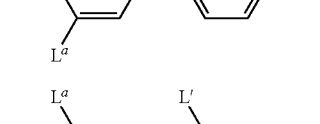
I1-1-15

I1-1-16

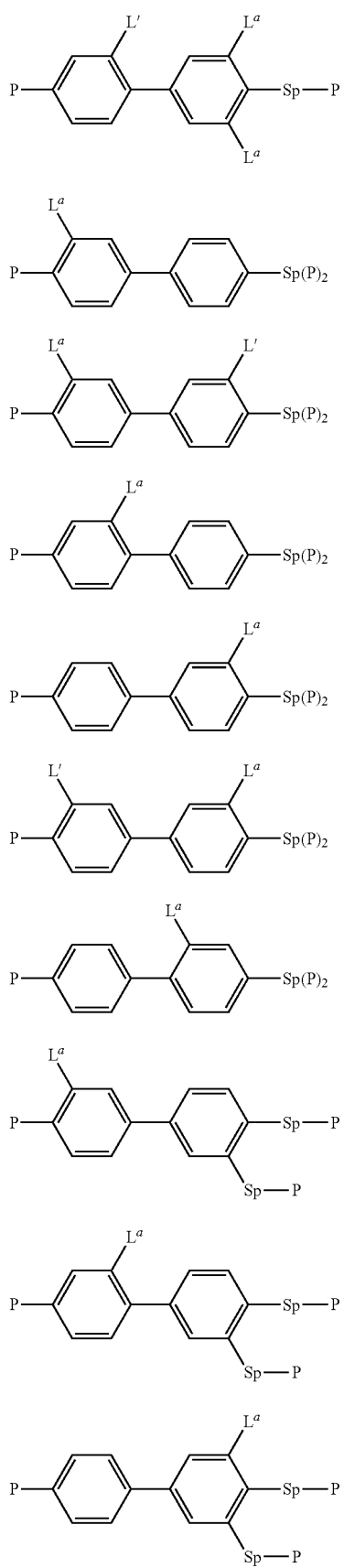
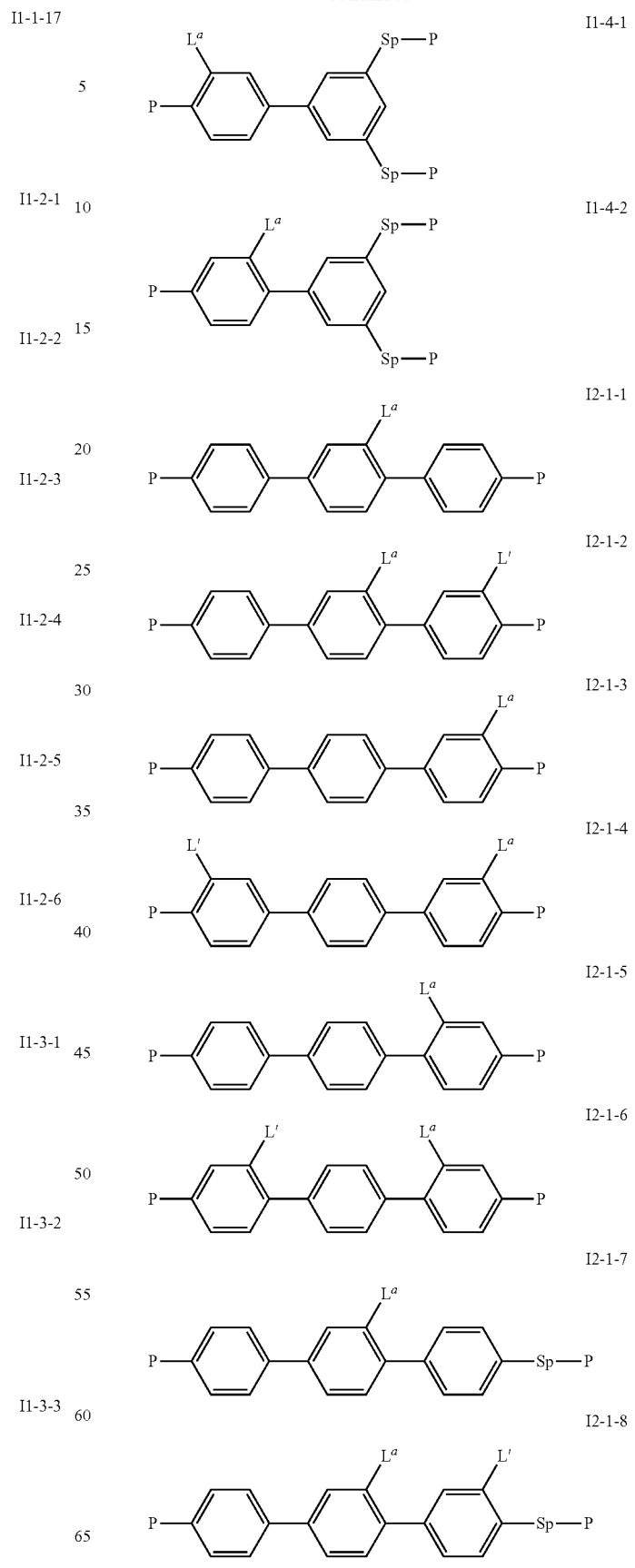

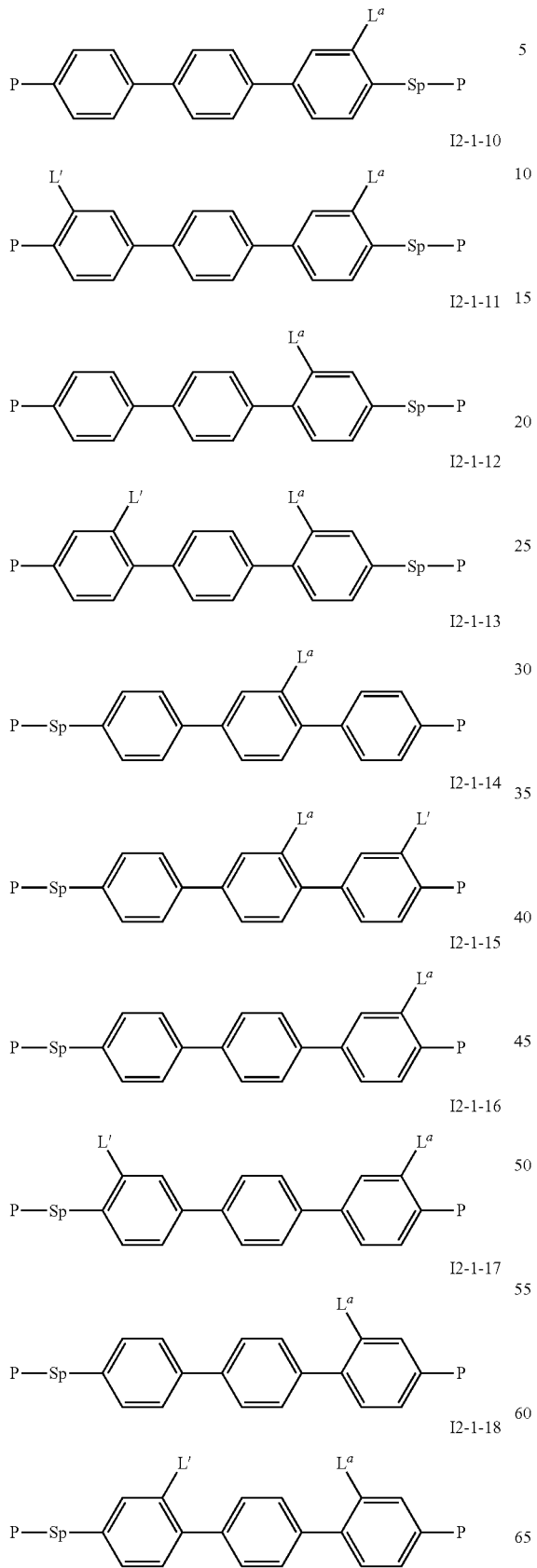
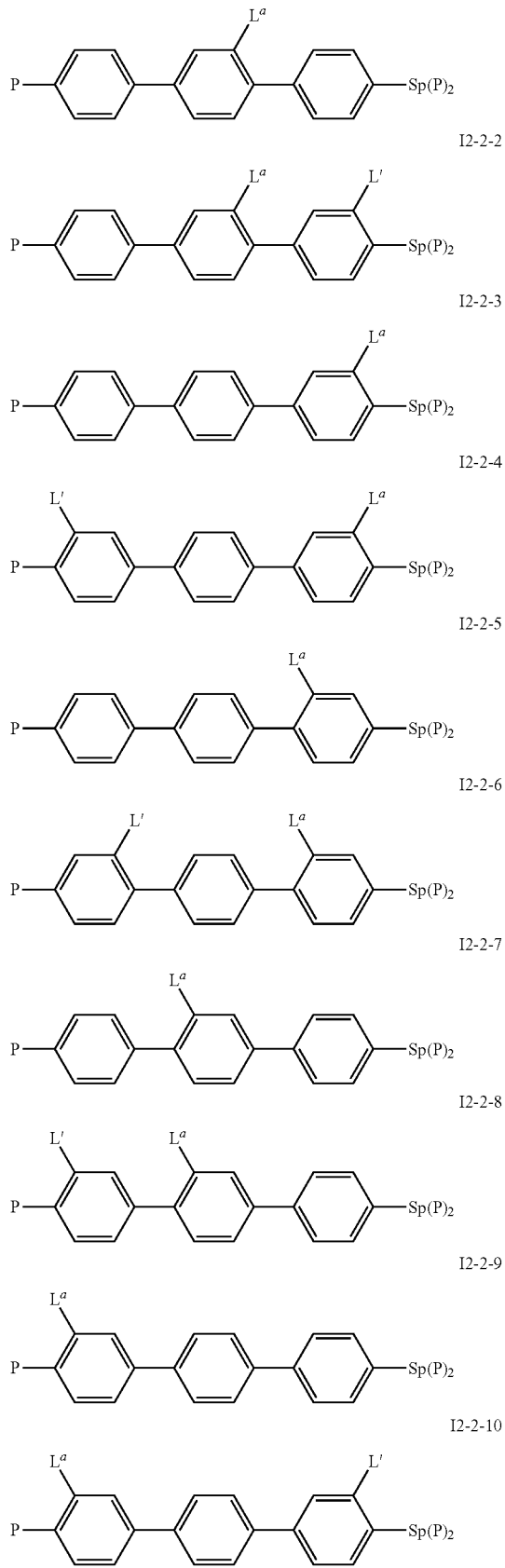

I2-2-11
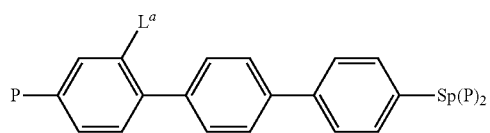
I2-2-12
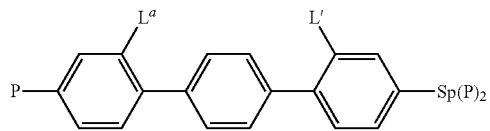
I2-3-1
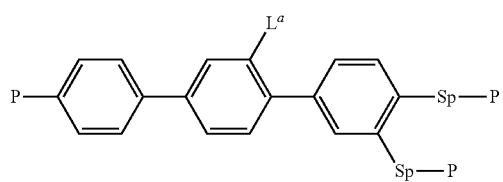
I2-3-2
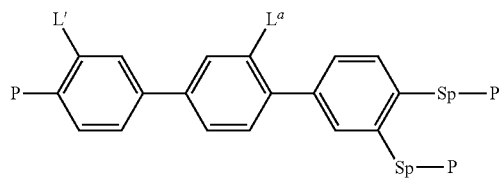
I2-3-3
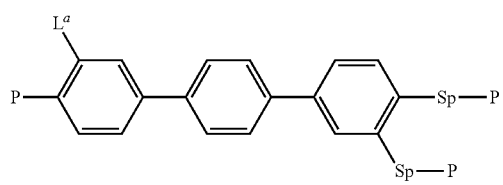
I2-3-4
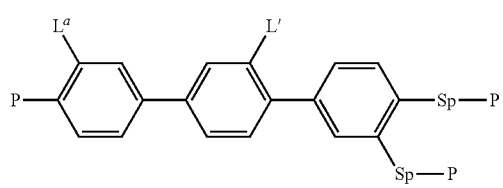
I2-3-5
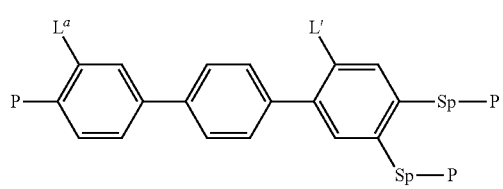
I2-3-6
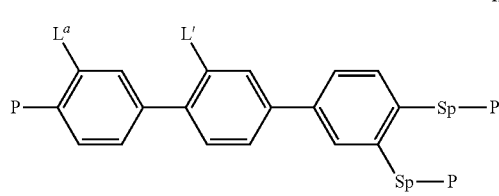
I2-3-7
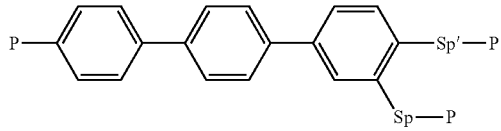
I2-3-8
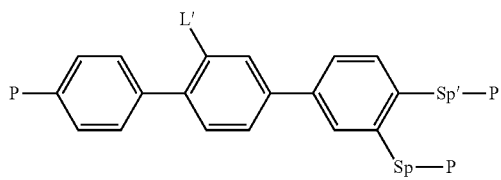
I2-4-1
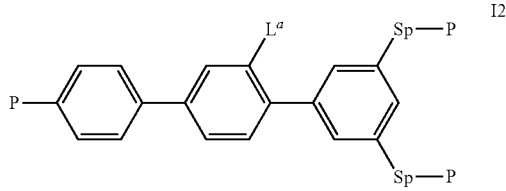
I2-4-2
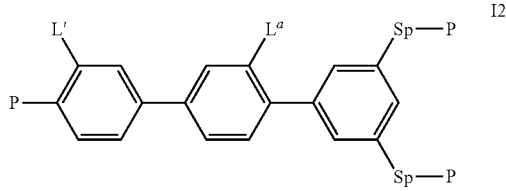
I2-4-3
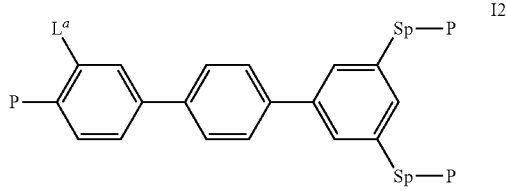
I2-4-4
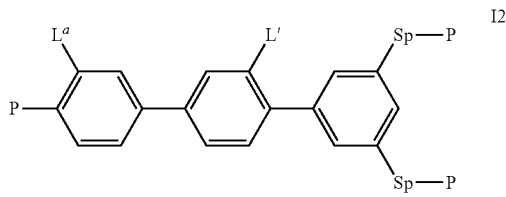
I2-4-5
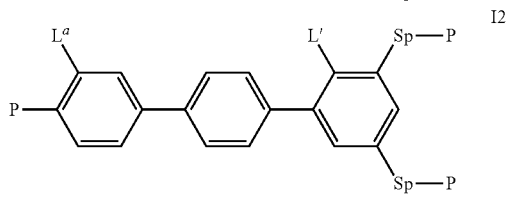
I2-4-6
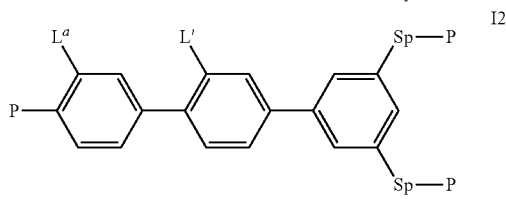
wherein $L^a$ is —CH$_2$—O—CH$_3$, —CH$_2$—O—C$_2$H$_5$ or —CH$_2$—O—C$_3$H$_7$, preferably —CH$_2$—O—CH$_3$, P, Sp and Sp(P)$_2$ have the meanings given above or below, with Sp preferably being different from a single bond, and L' has one of the meanings given for L above or below that is preferably different from $L^a$. L' preferably denotes F.

Preferred compounds of formula I and their subformulae are selected from the following preferred embodiments, including any combination thereof:

All groups P in the compound have the same meaning,
$A^1$-$(Z$-$A^2)_z$- is selected from formulae A1, A2 and A5,
the compounds contain one, two or three groups $L^{11}$,
the compounds contain exactly two polymerizable groups (represented by the groups P),
the compounds contain exactly three polymerizable groups (represented by the groups P),
P is selected from the group consisting of acrylate, methacrylate and oxetane, very preferably acrylate or methacrylate,
P is methacrylate,
all groups Sp are a single bond,
at least one of the groups Sp is a single bond and at least one of the groups Sp is different from a single bond,
Sp, when being different from a single bond, is —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring,
Sp is a single bond or denotes —$(CH_2)_{p2}$—, —$(CH_2)_{p2}$—O—, —$(CH_2)_{p2}$—CO—O—, —$(CH_2)_{p2}$—O—CO—, wherein p2 is 2, 3, 4, 5 or 6, and the O-atom or the CO-group, respectively, is connected to the benzene ring,
$Sp(P)_2$ is selected from subformulae S11-S31,
R denotes P-Sp-,
R does not denote or contain a polymerizable group,
R does not denote or contain a polymerizable group and denotes straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl or $L^a$,
L or L', when being different from $L^{11}$, denote F, Cl or CN,
L' is F,
r1, r2 and r3 denote 0 or 1,
r1, r2, r3, r4, r5 and r6 denote 0 or 1,
one of r1 and r6 is 0 and the other is 1,
r1 is 1, and r2 and r3 are 0,
r3 is 1 and r1 and r2 are 0,
one of r4 and r5 is 0 and the other is 1,
r1 and r4 are 0 and r3 is 1,
r1 and r3 are 0 and r4 is 1,
r3 and r4 are 0 and r1 is 1.

Particularly preferred compounds are selected from the following:

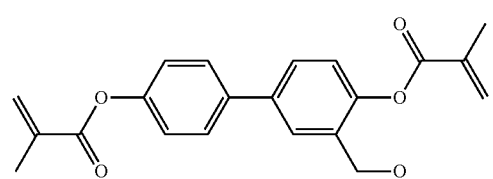

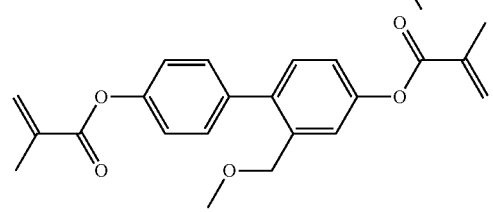

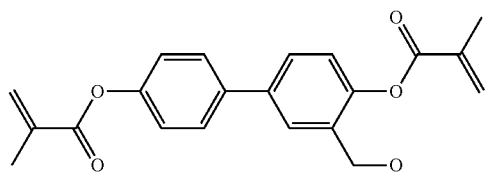

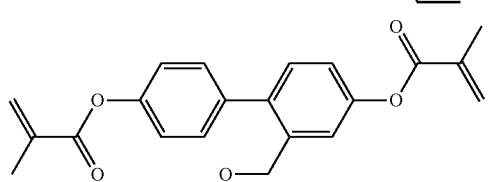

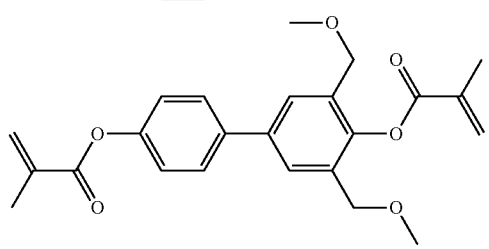

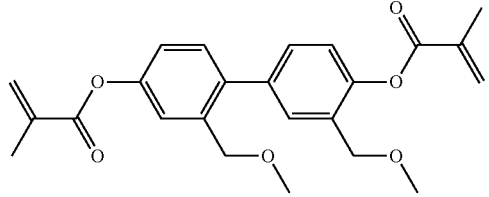

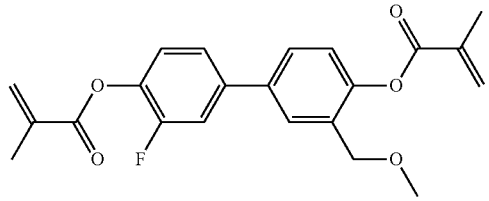

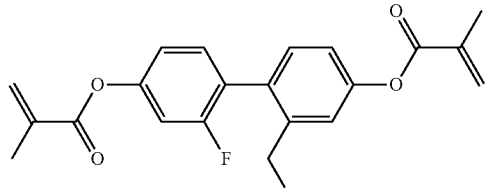

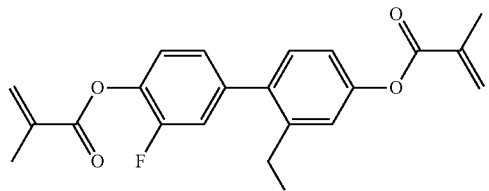

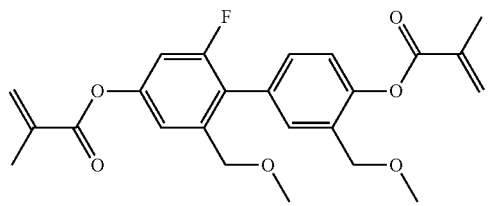

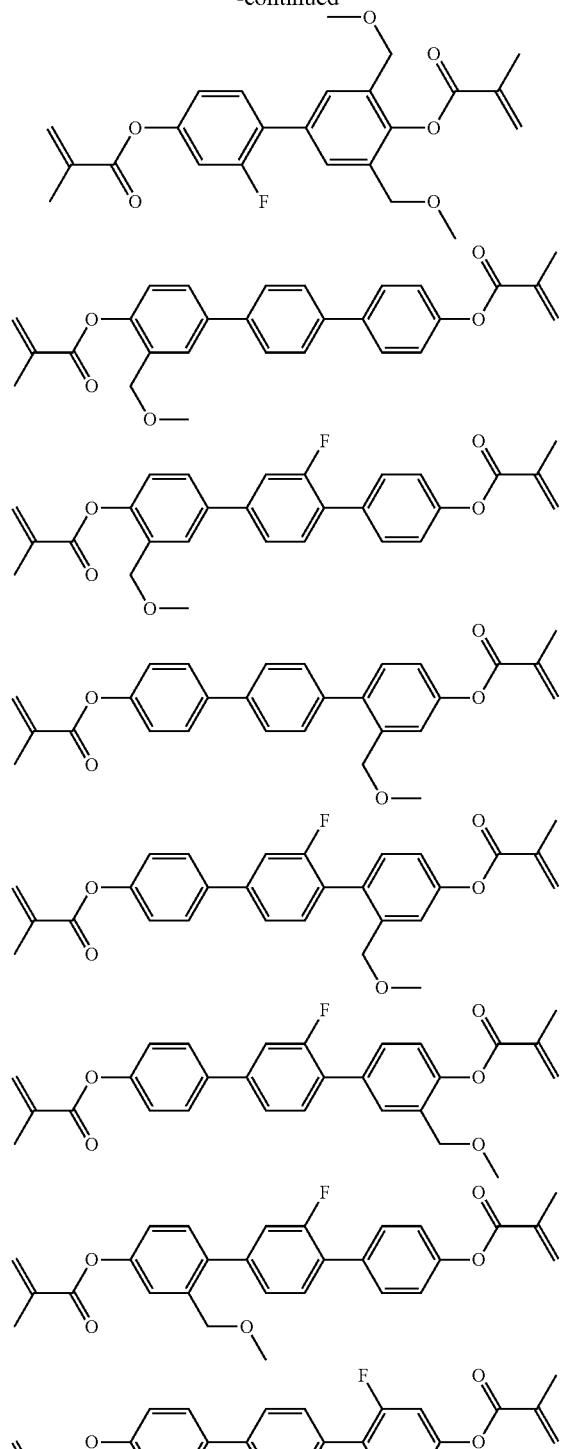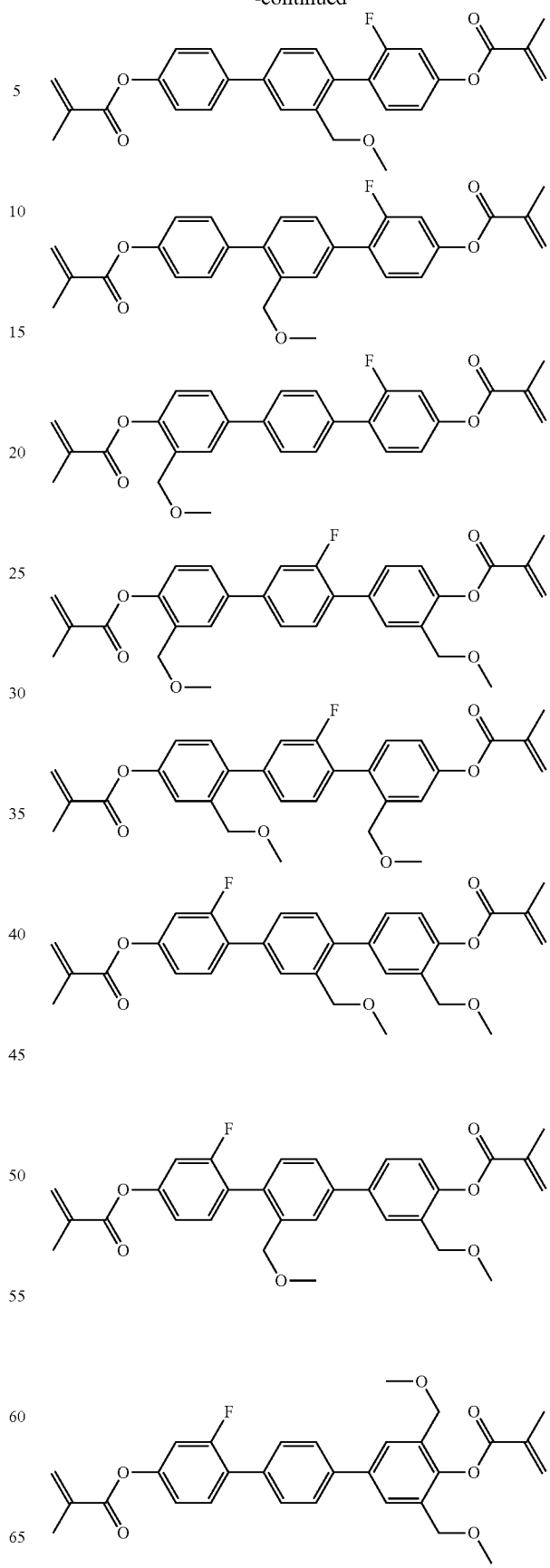

-continued

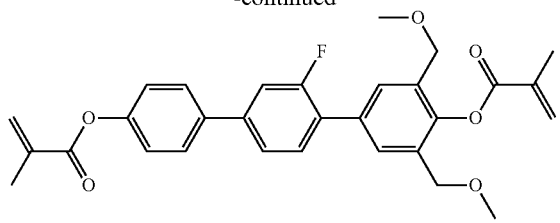

Self-alignment additives can be polymerised in the LC medium under similar conditions as applied for the RMs in the PSA process.

Suitable SA additives to induce homeotropic alignment, especially for use in SA-VA mode displays, are disclosed for example in US 2013/0182202, A1, US 2014/0838581 A1, US 2015/0166890 A1 and US 2015/0252265 A1.

In formula II the group MES preferably contains rings, which are selected from aromatic, alicyclic and hereroycyclic groups, as defined above, including their preferred meanings. Most preferred rings are 1,4-phenylene, which may be substituted by $L^1$ and -Sp-P as defined below, or 1,4-cyclohexylene.

In formula II the group MES preferably is a group selected from the following structures, which may be mono- or polysubstituted by any of the substituents $L^1$ and -Sp-P:

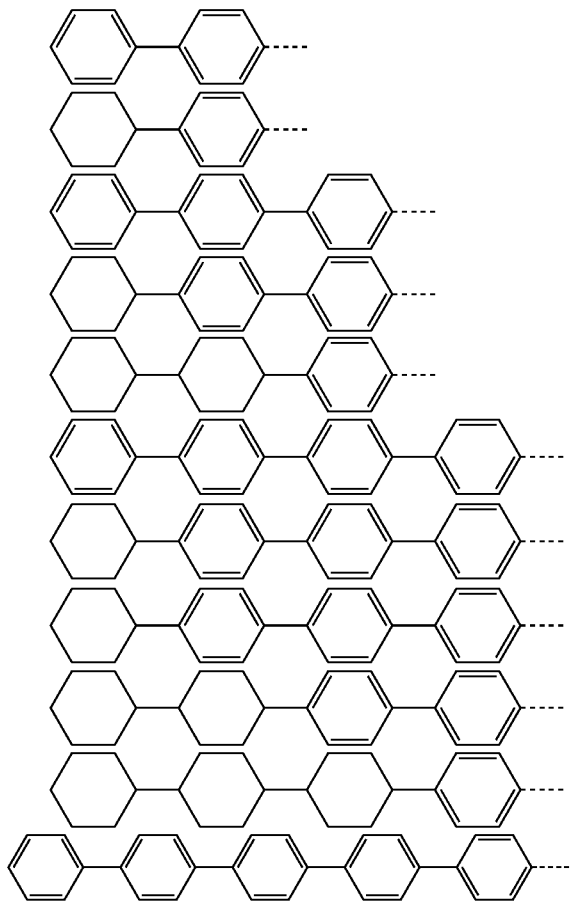

wherein
$L^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, and Sp denotes a spacer group or a single bond, and the dotted line indicates the attachment point of the polar anchor group R$^a$.

Preferably the self-alignment additive for vertical alignment is selected from formula IIa $$R^1\text{-}[A^2\text{-}Z^2]_m\text{-}A^1\text{-}R^a \qquad \text{IIa}$$

in which $A^1$, $A^2$ each, independently of one another, denote an aromatic, heteroaromatic, alicyclic or heterocyclic group, which may also contain fused rings, and which may also be mono- or polysubstituted by a group $L^1$ or -Sp-P, $L^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, Sp denotes a spacer group or a single bond, $Z^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(-Sp-P)—, —CH$_2$CH(-Sp-P)—, or —CH(-Sp-P)CH(-Sp-P)—, n1 denotes 1, 2, 3 or 4, m denotes 1, 2, 3, 4, 5 or 6, $R^0$ in each case, independently of one another, denotes alkyl having 1 to 12 C atoms, $R^{00}$ in each case, independently of one another, denotes H or alkyl having 1 to 12 C atoms, $R^1$ independently of one another, denotes H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, and $R^a$ is defined as above, preferably denotes a polar anchor group further defined by having at least one group selected from —OH, —NH$_2$, NHR$^{11}$, C(O)OH and —CHO, where R$^{11}$ denotes alkyl having 1 to 12 C atoms.

In another preferred embodiment an LC medium or a polymer stabilised SA-VA display according to the present invention contains one or more self-alignment additives selected from Table G below.

The anchor group $R^a$ of the self-alignment additive is more preferably defined as $R^a$ an anchor group of the formula

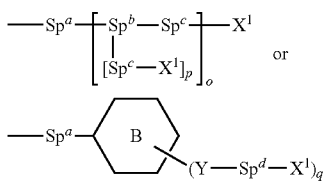

or wherein p denotes 1 or 2, q denotes 2 or 3,

B denotes a substituted or unsubstituted ring system or condensed ring system, preferably a ring system selected from benzene, pyridine, cyclohexane, dioxane or tetrahydropyran, Y, independently of one another, denotes —O—, —S—, —C(O)—, —C(O)O—, —OC(O)—, —NR$^{11}$— or a single bond, o denotes 0 or 1, $X^1$, independently of one another, denotes H, alkyl, fluoroalkyl, OH, NH$_2$, NHR$^{11}$, NR$^{11}$$_2$, OR$^{11}$, C(O)OH, or —CHO, where at least one group $X^1$ denotes a radical selected from —OH, —NH$_2$, NHR$^{11}$, C(O)OH and —CHO, R$^{11}$ denotes alkyl having 1 to 12 C atoms, Sp$^a$, Sp$^c$, Sp$^d$ each, independently of one another, denote a spacer group or a single bond, and Sp$^b$ denotes a tri- or tetravalent group, preferably CH, N or C.

Formulae II and IIa optionally include polymerizable compounds. Within this disclosure the "medium comprising a compound of formula II/IIa" refers to both, the medium comprising the compound of formula II/IIa and, alternatively, to the medium comprising the compound in its polymerized form.

For the case the one or more compounds of formula II are substituted with one or more polymerizable groups (-Sp-P), the LC medium according to the invention comprises a polymerisable component A) comprising, preferably consisting of, polymerisable compounds, at least one of which is a compound of formula I and at least one of which is of formula II, a liquid-crystalline component B), hereinafter also referred to as "LC host mixture", comprising, preferably consisting of, one or more mesogenic or liquid-crystalline compounds.

In the compounds of the formulae IIa, and subformulae thereof, $Z^1$ and $Z^2$ preferably denote a single bond, —C$_2$H$_4$—, —CF$_2$O— or —CH$_2$O—. In a specifically preferred embodiment $Z^1$ and $Z^2$ each independently denote a single bond.

In the compounds of the formula IIa, the group L, in each case independently, preferably denotes F or alkyl, preferably CH$_3$, C$_2$H$_5$ or C$_3$H$_7$.

Preferred compounds of the formula IIa are illustrated by the following subformulae II-A to II-D

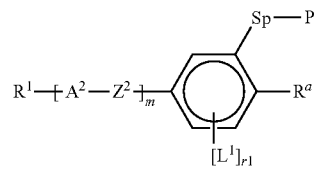

II-A

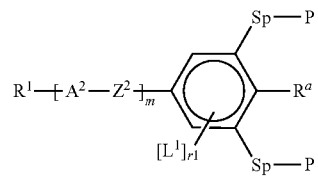

II-B

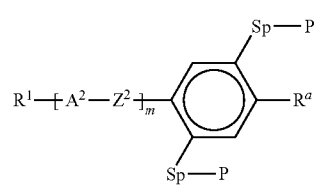

II-C

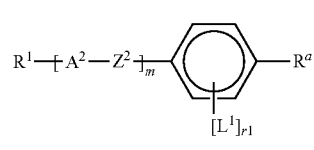

II-D in which R$^1$, R$^a$, A$^2$, Z$^2$, Sp, P and L$^1$ have the meanings as defined for formula IIa above, m independently is 1, 2 or 3, and r1 independently is 0, 1, 2, 3, or 4, preferably 0, 1 or 2.

In the compounds of the formulae II-A to II-D, L$^1$ preferably denotes F or alkyl, preferably CH$_3$, C$_2$H$_5$ or C$_3$H$_7$.

In a preferred embodiment r1 denotes 0.

The polymerizable group P of formulae II, IIa, II-A to II-D preferably is methacrylate, acrylate or another substituted acrylate, most preferably methacrylate.

In the above and below formulae IIa or II-A to II-D and their subformulae Z$^1$ preferably independently denotes a single bond or —CH$_2$CH$_2$—, and very particularly a single bond.

R$^a$ denotes preferably

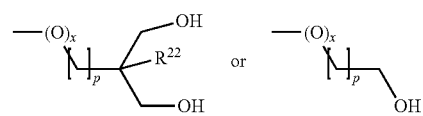

wherein p=1, 2, 3, 4, 5 or 6, x=1 or 0, preferably 1, and

R$^{22}$ is H, methyl, ethyl, n-propyl, i-propyl, n-butyl, tert-butyl, n-pentyl, or —CH$_2$CH$_2$-tert-butyl in particular

—O(CH$_2$)$_2$—OH, —O(CH$_2$)$_3$—OH,

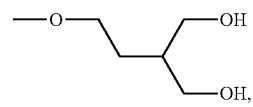

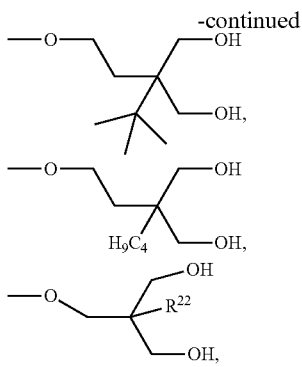

wherein R²² is H, methyl, ethyl, n-propyl, i-propyl, n-butyl, tert-butyl, n-pentyl, or —CH₂CH₂-tert-butyl, or

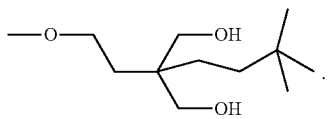

In the formula IIa and in the sub-formulae of the formula IIa $R^1$ preferably denotes a straight-chain alkyl or branched alkyl radical having 1-8 C atoms, preferably a straight-chain alkyl radical. In the compounds of the formulae IIa or II-A to II-D $R^1$ more preferably denotes $CH_3$, $C_2H_5$, n-$C_3H_7$, n-$C_4H_9$, n-$C_5H_{11}$, n-$C_6H_{13}$ or $CH_2CH(C_2H_5)C_4H_9$. $R^1$ furthermore may denote alkenyloxy, in particular $OCH_2CH=CH_2$, $OCH_2CH=CHCH_3$, $OCH_2CH=CHC_2H_5$, or alkoxy, in particular $OC_2H_5$, $OC_3H_7$, $OC_4H_9$, $OC_5H_{11}$ and $OC_6H_{13}$. Particularly preferable $R^1$ denotes a straight chain alkyl residue, preferably $C_5H_{11}$.

In a preferred embodiment of the invention the LC medium comprises a compound of formula II, which is polymerizable. The following combinations of polmerizable additives of formula I and II are preferred:

The LC medium comprises one or more compounds of formula I1-1 and one or more compounds of formula II;
the LC medium comprises one or more compounds of formula I1-1-1 and one or more compounds of formula II-A or II-B;
the LC medium comprises one or more compounds of formula I1-1-1 and one or more compounds of formula II-B; or
the LC medium comprises one or more compounds of formula

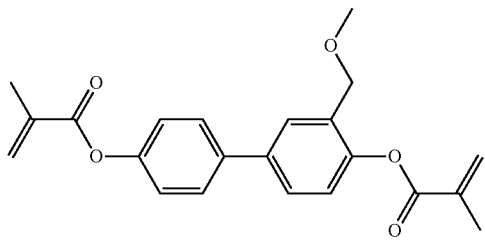 [SMILES: C=C(C)C(=O)Oc1ccc(-c2ccc(OC(=O)C(=C)C)c(COC)c2)cc1]

and one or more compounds of formula II-A or II-B.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, compounds of formula I can be synthesised by esterification or etherification of intermediates, wherein the group Sp-P on both ends denotes OH, using corresponding acids, acid derivatives, or halogenated compounds containing a polymerisable group P.

For example, acrylic or methacrylic esters can be prepared by esterification of the corresponding alcohols with acid derivatives like, for example, (meth)acryloyl chloride or (meth)acrylic anhydride in the presence of a base like pyridine or triethyl amine, and 4-(N,N-dimethylamino)pyridine (DMAP).

Alternatively the esters can be prepared by esterification of the alcohols with (meth)acrylic acid in the presence of a dehydrating reagent, for example according to Steglich with dicyclohexylcarbodiimide (DCC), N-(3-dimethylaminopropyl)-N'-ethylcarbodiimide (EDC) or N-(3-dimethylaminopropyl)-N'-ethylcarbodiimide hydrochloride and DMAP.

Further suitable methods are shown in the examples.

For the production of PSA displays, the polymerisable compounds contained in the LC medium are polymerised or crosslinked (if one compound contains two or more polymerisable groups) by in-situ polymerisation in the LC medium between the substrates of the LC display, optionally while a voltage is applied to the electrodes.

The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:
  a first substrate including a pixel electrode defining pixel areas, the pixel electrode being connected to a switching element disposed in each pixel area and optionally including a micro-slit pattern, and optionally a first alignment layer disposed on the pixel electrode,
  a second substrate including a common electrode layer, which may be disposed on the entire portion of the second substrate facing the first substrate, and optionally a second alignment layer,
  an LC layer disposed between the first and second substrates and including an LC medium according to the invention as described above and below, wherein the polymerisable component (A) may also be polymerised.

The self-alignment additive contained in the medium initiates vertical alignment of the LC layer (perpendicular to the surfaces) or tilted vertical alignment.

The LC layer with the LC medium can be deposited between the substrates of the display by methods that are conventionally used by display manufacturers, for example the so-called one-drop-filling (ODF) method. The polymerisable component of the LC medium is then polymerised for example by UV photopolymerisation. The polymerisation can be carried out in one step or in two or more steps.

The PSA display may comprise further elements, like a colour filter, a black matrix, a passivation layer, optical retardation layers, transistor elements for addressing the individual pixels, etc., all of which are well known to the person skilled in the art.

The electrode structure can be designed by the skilled person depending on the individual display type. For example for PS-VA displays a multi-domain orientation of the LC molecules can be induced by providing electrodes having slits and/or bumps or protrusions in order to create two, four or more different tilt alignment directions.

Upon polymerisation the polymerisable compounds form a crosslinked polymer, which causes a certain pretilt of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes. Microscopic measurement data (like SEM and AFM) have confirmed that at least a part of the formed polymer accumulates at the LC/substrate interface.

The polymerisation can be carried out in one step. It is also possible firstly to carry out the polymerisation, optionally while applying a voltage, in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Optionally one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocurel 173® (Ciba AG). If a polymerisation initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus does not contain a polymerisation initiator.

The LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component (component A), is preferably 10-500,000 ppm, particularly preferably 50-50,000 ppm.

The polymerisable compounds of formula I do in particular show good UV absorption in, and are therefore especially suitable for, a process of preparing a PSA display including one or more of the following features:

the polymerisable medium is exposed to UV light in the display in a 2-step process, including a first UV exposure step ("UV-1 step") to generate the tilt angle, and a second UV exposure step ("UV-2 step") to finish polymerization, the polymerisable medium is exposed to UV light in the display generated by an energy-saving UV lamp (also known as "green UV lamps"). These lamps are characterized by a relative low intensity (1/100-1/10 of a conventional UV1 lamp) in their absorption spectra from 300-380 nm, and are preferably used in the UV2 step, but are optionally also used in the UV1 step when avoiding high intensity is necessary for the process.

the polymerisable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:

the polymerisable LC medium is exposed to UV light in a 2-step process, including a first UV exposure step ("UV-1 step") to generate the tilt angle, and a second UV exposure step ("UV-2 step") to finish polymerization, the polymerisable LC medium is exposed to UV light generated by a UV lamp having an intensity of from 0.5 mW/cm$^2$ to 10 mW/cm$^2$ in the wavelength range from 300-380 nm, preferably used in the UV2 step, and optionally also in the UV1 step, the polymerisable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV exposure can be carried out using a cut-off filter being substantially transmissive for wavelengths λ>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is in general from 6 to 100 J/cm$^2$, depending on the production process conditions.

Preferably the LC medium according to the present invention does essentially consist of a polymerisable component A), and one or more polymerisable compounds of formula II, and an LC component B) or LC host mixture, as described above and below. However, the LC medium may additionally comprise one or more further components or additives, preferably selected from the list including but not limited to co-monomers, chiral dopants, polymerisation initiators, inhibitors, stabilisers, surfactants, wetting agents, lubricating agents, dispersing agents, hydrophobing agents, adhesive agents, spreading agents, flow improvers, defoaming agents, deaerators, diluents, reactive diluents, auxiliaries, colourants, dyes, pigments and nanoparticles.

Particular preference is given to LC media comprising one, two or three polymerisable compounds of formula I.

Preference is furthermore given to LC media in which the polymerisable component A) comprises exclusively polymerisable compounds of formula I.

Preference is furthermore given to LC media in which the liquid-crystalline component B) or the LC host mixture has a nematic LC phase, and preferably has no chiral liquid crystal phase.

The LC component B), or LC host mixture, is preferably a nematic LC mixture.

Preference is furthermore given to achiral compounds of formula I, and to LC media in which the compounds of component A and/or B are selected exclusively from the group consisting of achiral compounds.

Preferably the proportion of the polymerisable component A) in the LC medium is from >0.3 to <5%, very preferably from >0.4 to <2%, most preferably from 0.5 to 2.5%.

Preferably the proportion of compounds of formula I in the LC medium is from >0 to <5%, very preferably from >0 to <1%, most preferably from 0.01 to 0.5%.

Preferably the proportion of compounds of formula II in the LC medium is from >0.1 to <5%, very preferably from >0.2 to <3%, most preferably from 0.2 to 1.5%.

Preferably the proportion of the LC component B) in the LC medium is from 95 to <100%, very preferably from 99 to <100%.

In another preferred embodiment the polymerisable component A) comprises, in addition to the compounds of formula I and optionally II, one or more further polymerisable compounds ("co-monomers"), preferably selected from RMs.

Suitable and preferred mesogenic co-monomers are selected from the following formulae:

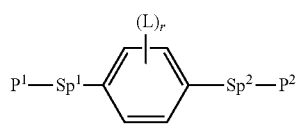

M1

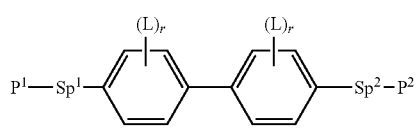

M2

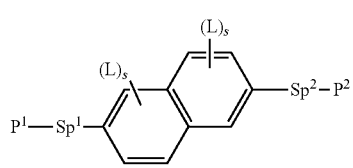

M3

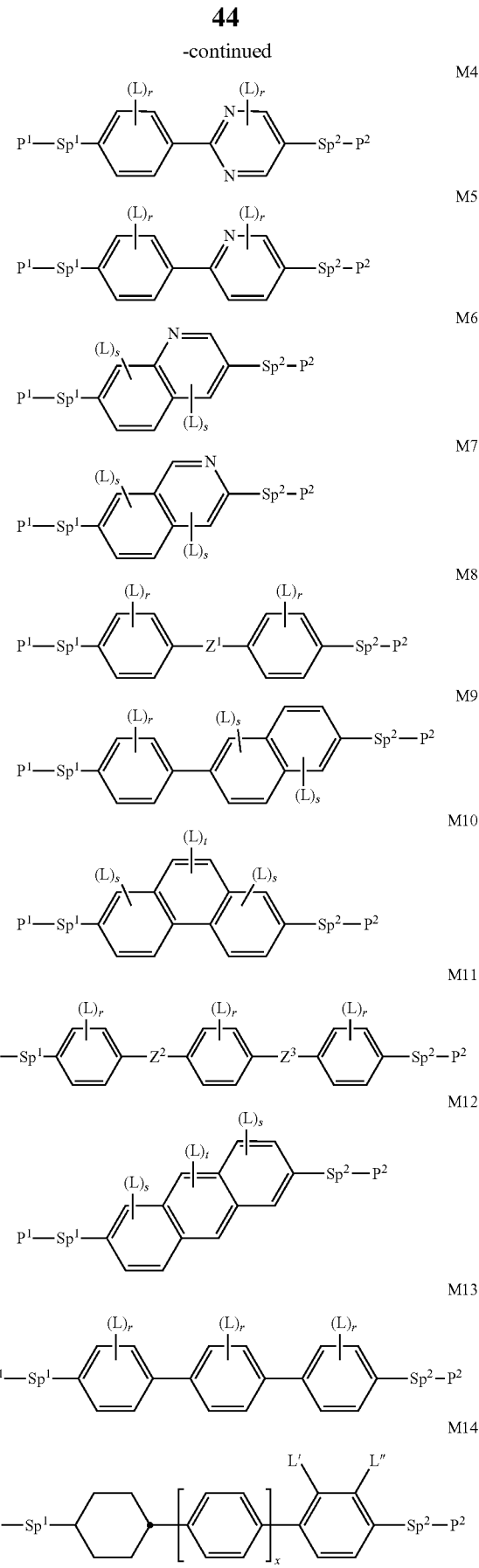

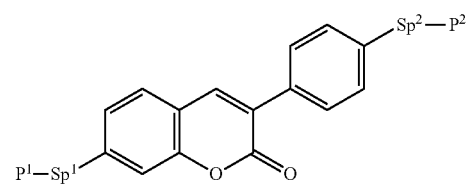 M15
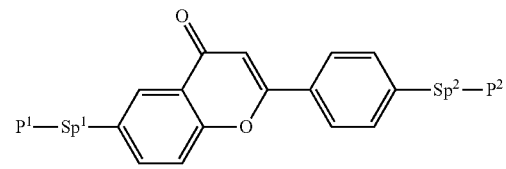 M16
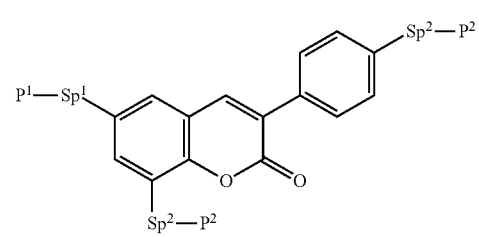 M17
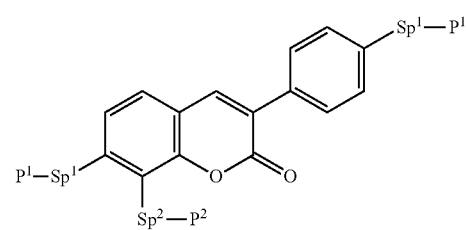 M18
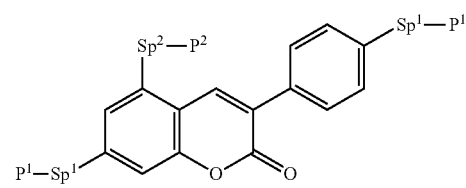 M19
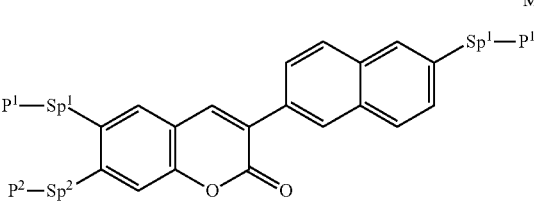 M20
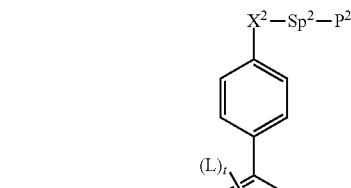 M21
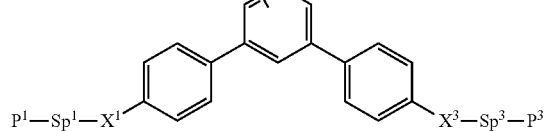 M22
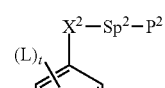 M23
 M24
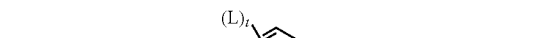 M25
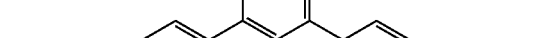 M26
 M27
 M28
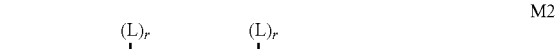 M29
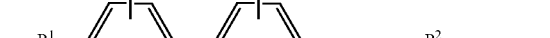
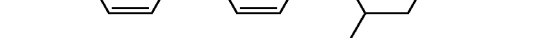

M30

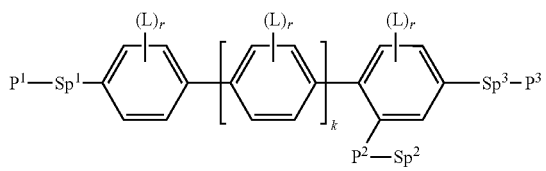

M31

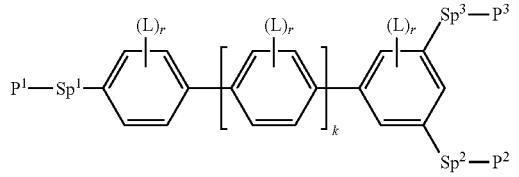

M32

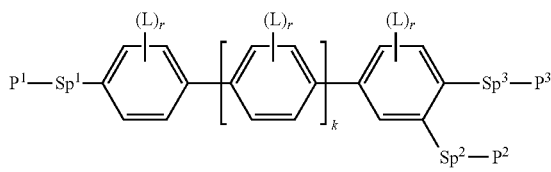

in which the individual radicals have the following meanings:

P¹, P² and P³ each, independently of one another, denote an acrylate or methacrylate group, Sp¹, Sp² and Sp³ each, independently of one another, denote a single bond or a spacer group having one of the meanings indicated above and below for Sp, and particularly preferably denote —(CH$_2$)$_{p1}$—, —(CH$_2$)$_{p1}$—O—, —(CH$_2$)$_{p1}$—CO—O—, —(CH$_2$)$_{p1}$—O—CO— or —(CH$_2$)$_{p1}$—O—COO—, in which p1 is an integer from 1 to 12, where, in addition, one or more of the radicals P¹-Sp¹-, P¹-Sp²- and P³-Sp³- may denote R$^{aa}$, with the proviso that at least one of the radicals P¹-Sp¹-, P²-Sp² and P³-Sp³- present is different from R$^{aa}$, R$^{aa}$ denotes H, F, Cl, CN or straight-chain or branched alkyl having 1 to 25 C atoms, in which, in addition, one or more non-adjacent CH$_2$ groups may each be replaced, independently of one another, by C(R$^0$)=C(R$^{00}$)—, —C≡C—, —N(R$^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or P¹-Sp¹-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), R$^0$, R$^{00}$ each, independently of one another and identically or differently on each occurrence, denote H or alkyl having 1 to 12 C atoms, R$^y$ and R$^z$ each, independently of one another, denote H, F, CH$_3$ or CF$_3$, X¹, X² and X³ each, independently of one another, denote —CO—O—, —O—CO— or a single bond, Z¹ denotes —O—, —CO—, —C(R$^y$R$^z$)— or —CF$_2$CF$_2$—, Z² and Z³ each, independently of one another, denote —CO—O—, —O—CO—, —CH$_2$O—, —OCH$_2$—, —CF$_2$O—, —OCF$_2$— or —(CH$_2$)$_n$—, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L'' each, independently of one another, denote H, F or Cl, k denotes 0 or 1, r denotes 0, 1, 2, 3 or 4, s denotes 0, 1, 2 or 3, t denotes 0, 1 or 2, x denotes 0 or 1.

Especially preferred are compounds of formulae M2, M13, M17, M22, M23, M24, M30, M31 and M32.

Further preferred are trireactive compounds M15 to M30, in particular M17, M18, M19, M22, M23, M24, M25, M26, M30, M31 and M32.

In the compounds of formulae M1 to M32 the group

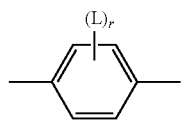

is preferably

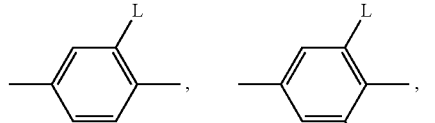
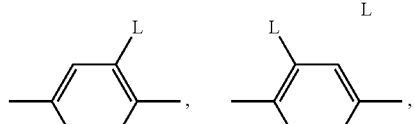
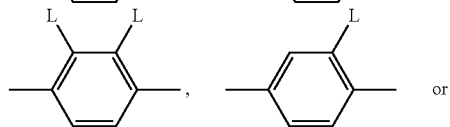
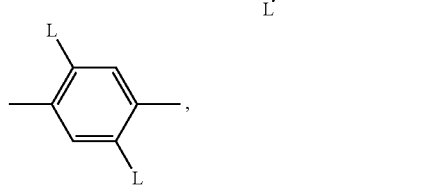 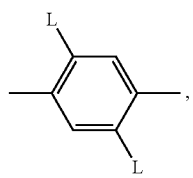

wherein L on each occurrence, identically or differently, has one of the meanings given above or below, and is preferably F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, very preferably F, Cl, CN, CH$_3$, C$_2$H$_5$, OCH$_3$, COCH$_3$, OCF$_3$ or P-Sp-, more preferably F, Cl, CH$_3$, OCH$_3$, COCH$_3$ oder OCF$_3$, especially F or CH$_3$.

Besides the polymerisable compounds described above, the LC media for use in the LC displays according to the invention comprise an LC mixture ("host mixture") comprising one or more, preferably two or more LC compounds which are selected from low-molecular-weight compounds that are unpolymerisable. These LC compounds are selected such that they stable and/or unreactive to a polymerisation reaction under the conditions applied to the polymerisation of the polymerisable compounds.

In principle, any LC mixture which is suitable for use in conventional displays is suitable as host mixture. Suitable LC mixtures are known to the person skilled in the art and are described in the literature, for example mixtures in VA displays in EP 1 378 557 A1.

In a preferred embodiment the LC medium contains an LC component B), or LC host mixture, based on compounds with negative dielectric anisotropy.

Such LC media are especially suitable for use in PS-VA and PS-UB-FFS displays. Particularly preferred embodiments of such an LC medium are those of sections a)-z) below:
a) LC medium wherein the LC component B) or LC host mixture comprises one or more compounds selected from formulae CY and PY:

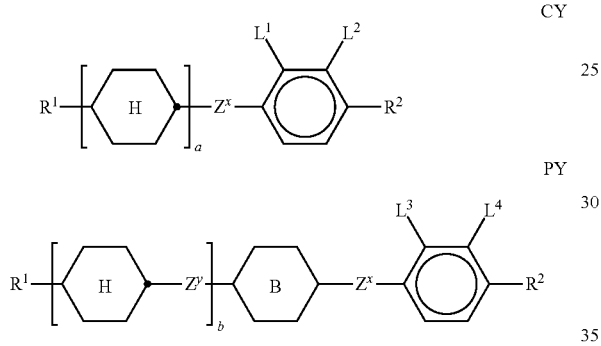

wherein
a denotes 1 or 2,
b denotes 0 or 1,

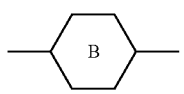

denotes

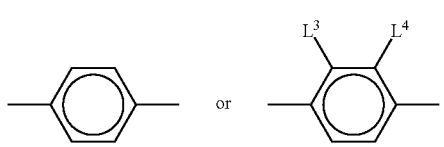

$R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $Z^x$ and $Z^y$ each, independently of one another, denote —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond, $L^{1-4}$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, or both $L^3$ and $L^4$ denote F or one of $L^3$ and $L^4$ denotes F and the other denotes Cl.

The compounds of the formula CY are preferably selected from the group consisting of the following sub-formulae:

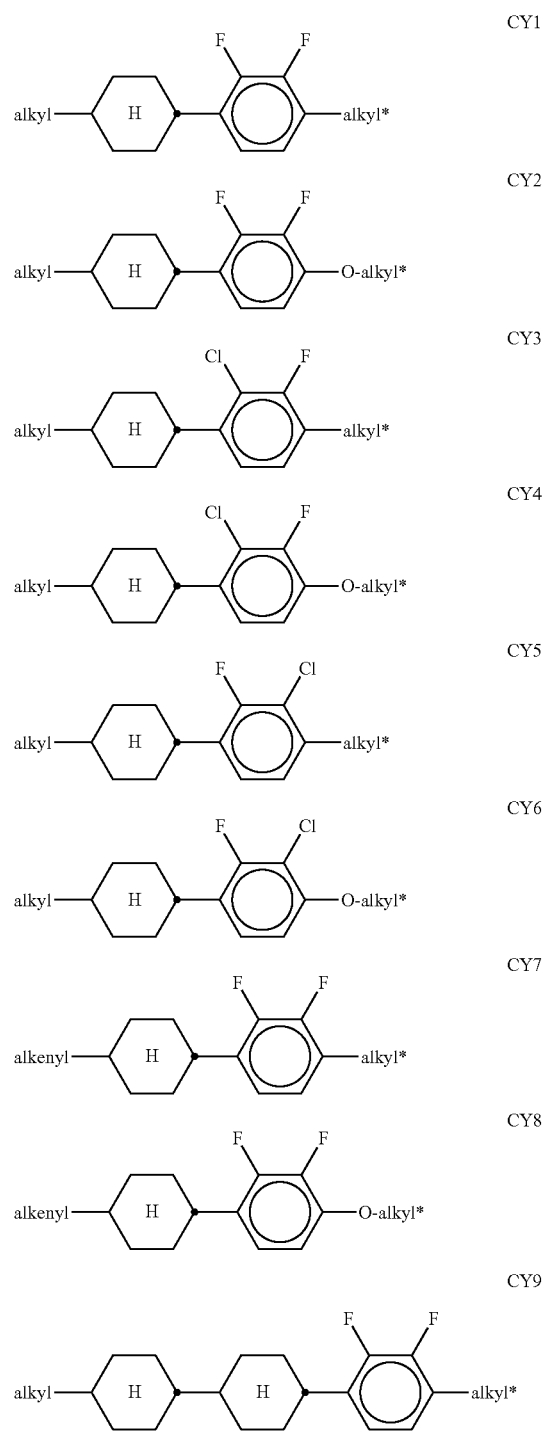

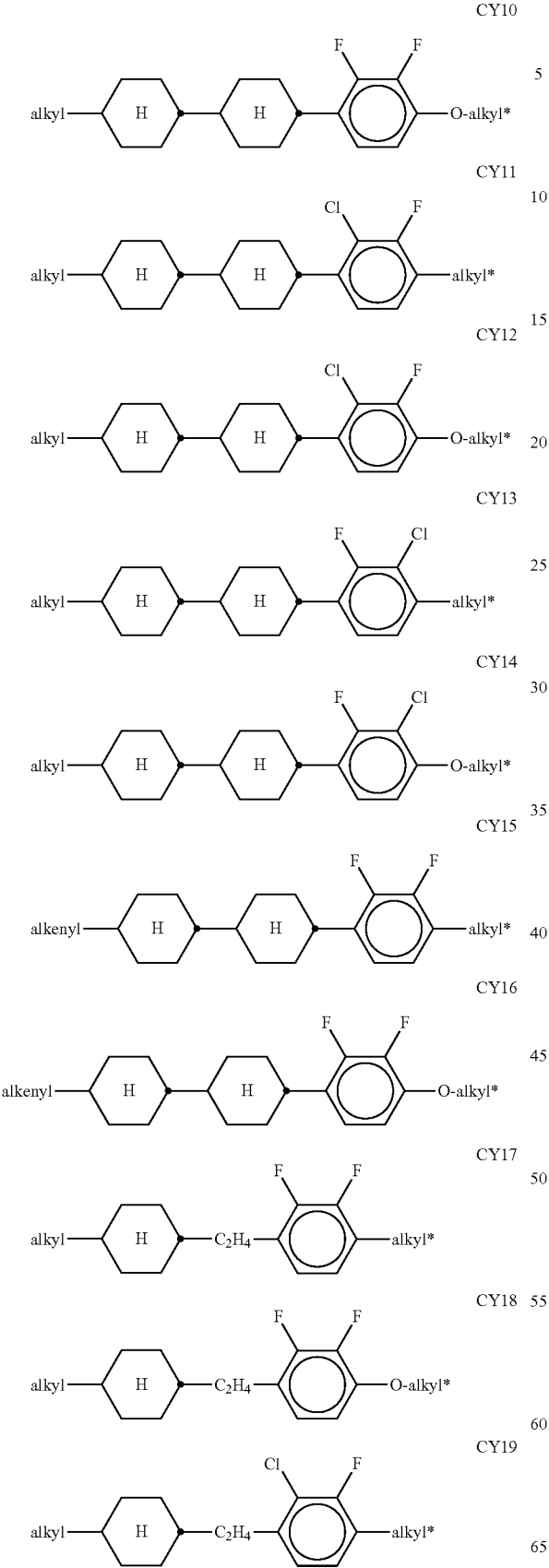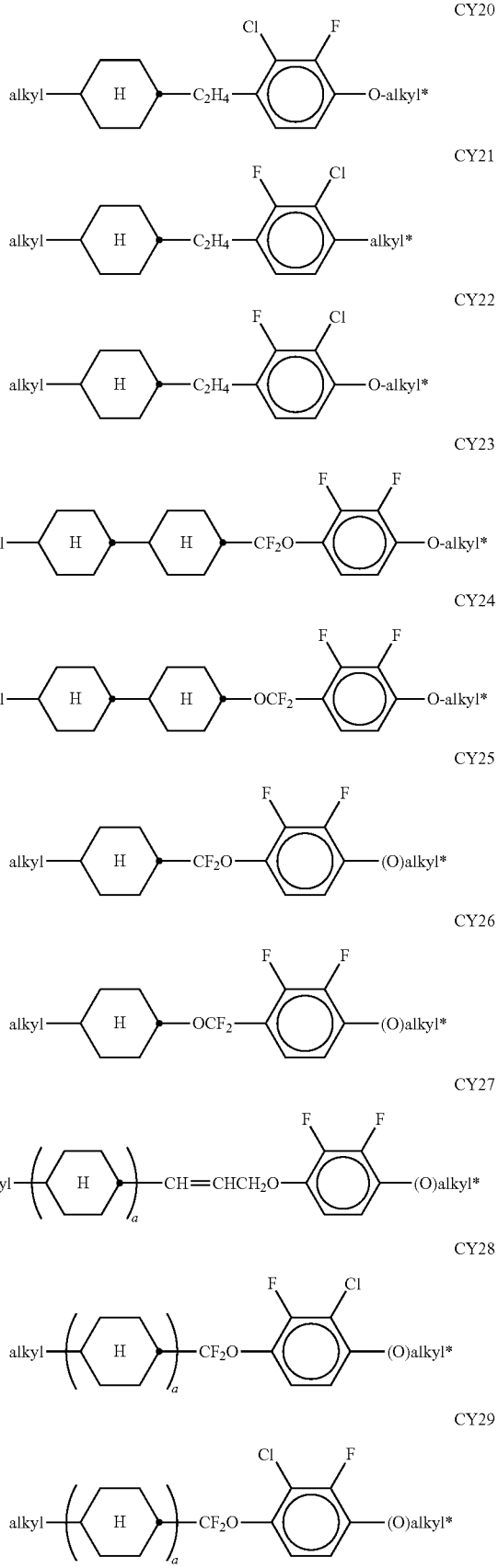

CY30

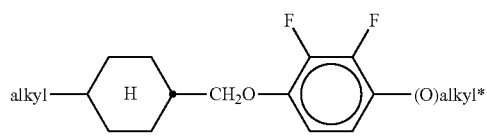

CY31

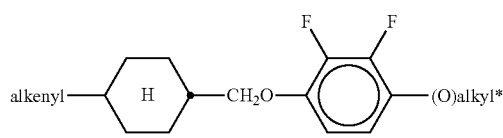

CY32

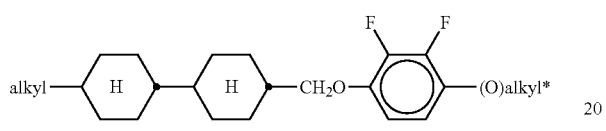

CY33

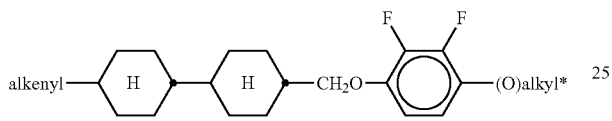

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH—$, $CH_2=CHCH_2CH_2—$, $CH_3—CH=CH—$, $CH_3—CH_2—CH=CH—$, $CH_3—CH_2—CH=CH—$, $CH_3—(CH_2)_2—CH=CH—$, $CH_3—(CH_2)_3—CH=CH—$ or $CH_3—CH=CH—(CH_2)_2—$.

The compounds of the formula PY are preferably selected from the group consisting of the following sub-formulae:

PY1

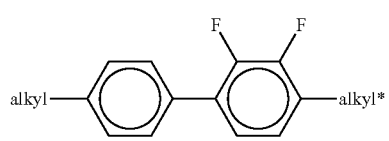

PY2

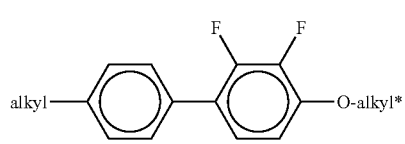

PY3

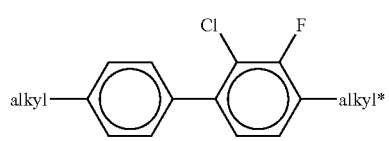

PY4

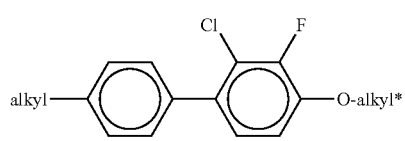

PY5

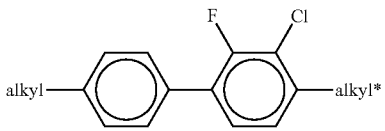

PY6

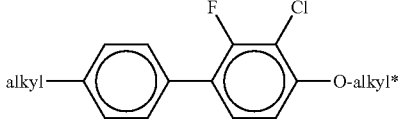

PY7

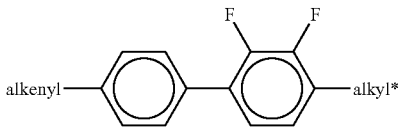

PY8

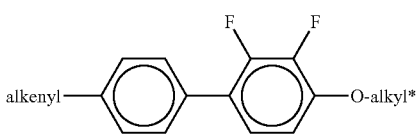

PY9

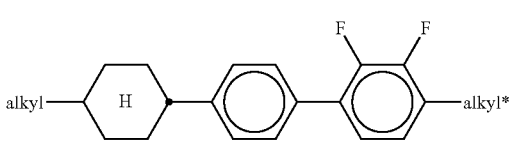

PY10

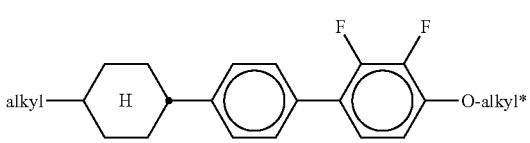

PY11

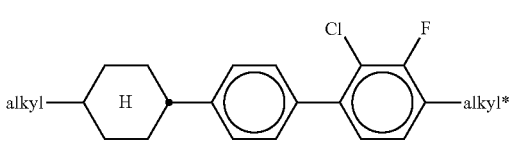

PY12

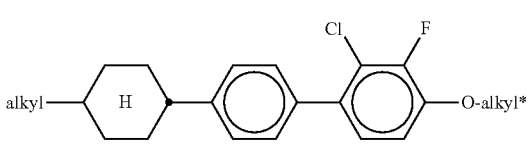

PY13

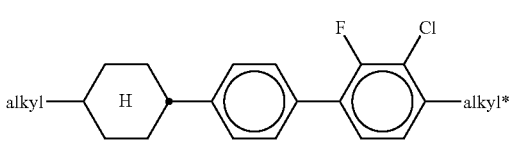

PY14

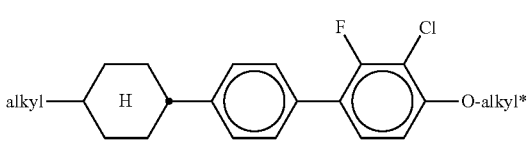

-continued

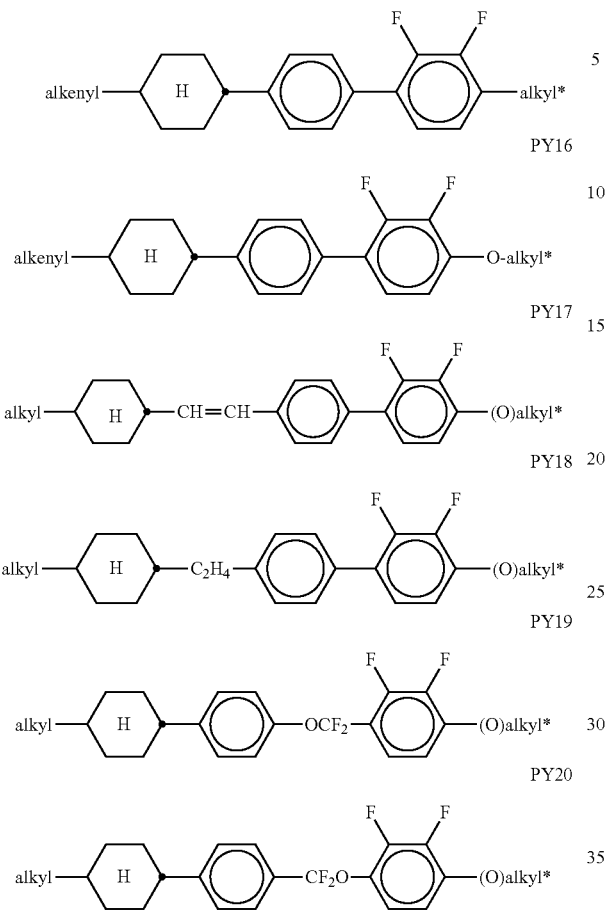

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium wherein the LC component B) or LC host mixture comprises one or more compounds of the following formula:

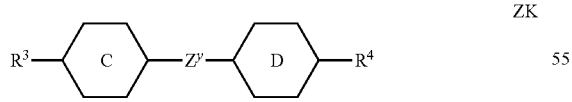

in which the individual radicals have the following meanings:

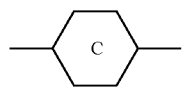

denotes

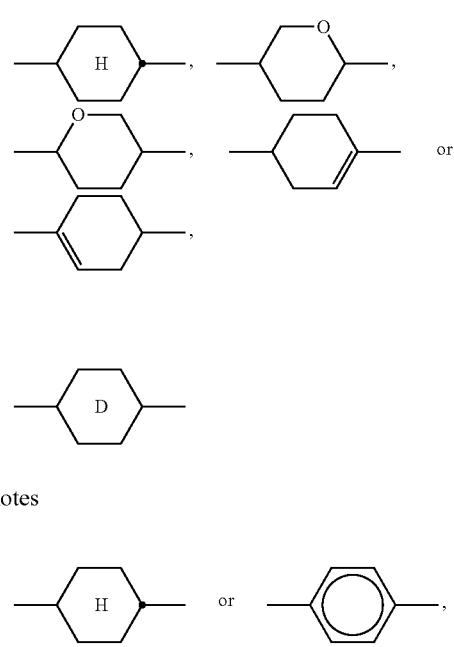

denotes

—⬡H— or —◯—, $R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

ZK1
alkyl—⬡H—⬡H—alkyl*

ZK2
alkyl—⬡H—⬡H—O-alkyl*

ZK3
alkenyl—⬡H—⬡H—alkyl

ZK4
alkenyl—⬡H—⬡H—alkenyl*

ZK5
alkyl—⬡H—◯—alkyl*

ZK6
alkyl—⬡H—◯—O-alkyl*

-continued

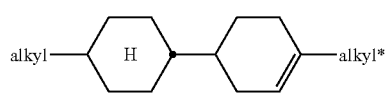
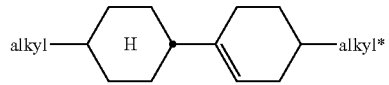
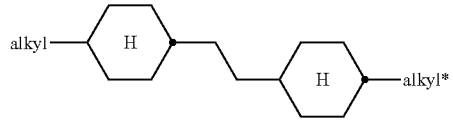
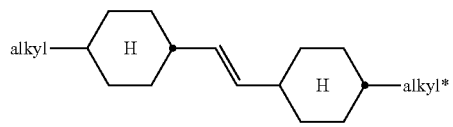

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds of formula ZK1.
Particularly preferred compounds of formula ZK are selected from the following sub-formulae:

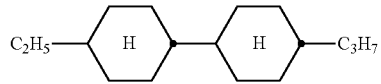
ZK1a

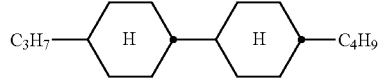
ZK1b

ZK1c

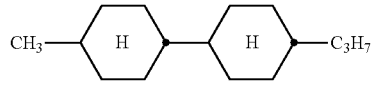
ZK1d

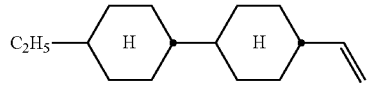
ZK3a

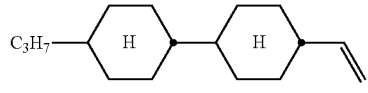
ZK3b

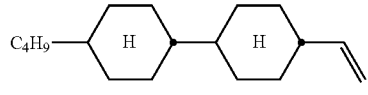
ZK3c

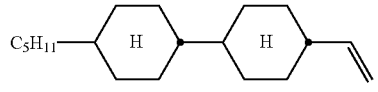
ZK3d

-continued

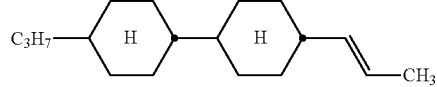
ZK3e

ZK7
ZK8
ZK9
ZK10 wherein the propyl, butyl and pentyl groups are straight-chain groups.

Most preferred are compounds of formula ZK1a and ZK3b.

c) LC medium wherein LC component B) or the LC host mixture additionally comprises one or more compounds of the following formula:

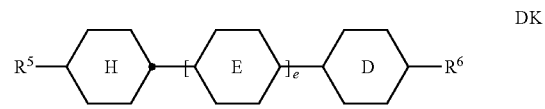
DK in which the individual radicals on each occurrence, identically or differently, have the following meanings:
R$^5$ and R$^6$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms,

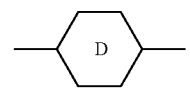

denotes

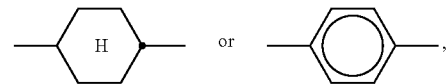

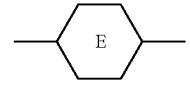

denotes

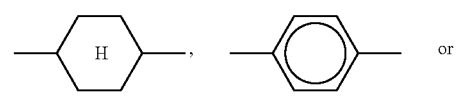

and
e denotes 1 or 2.

The compounds of the formula DK are preferably selected from the group consisting of the following sub-formulae:

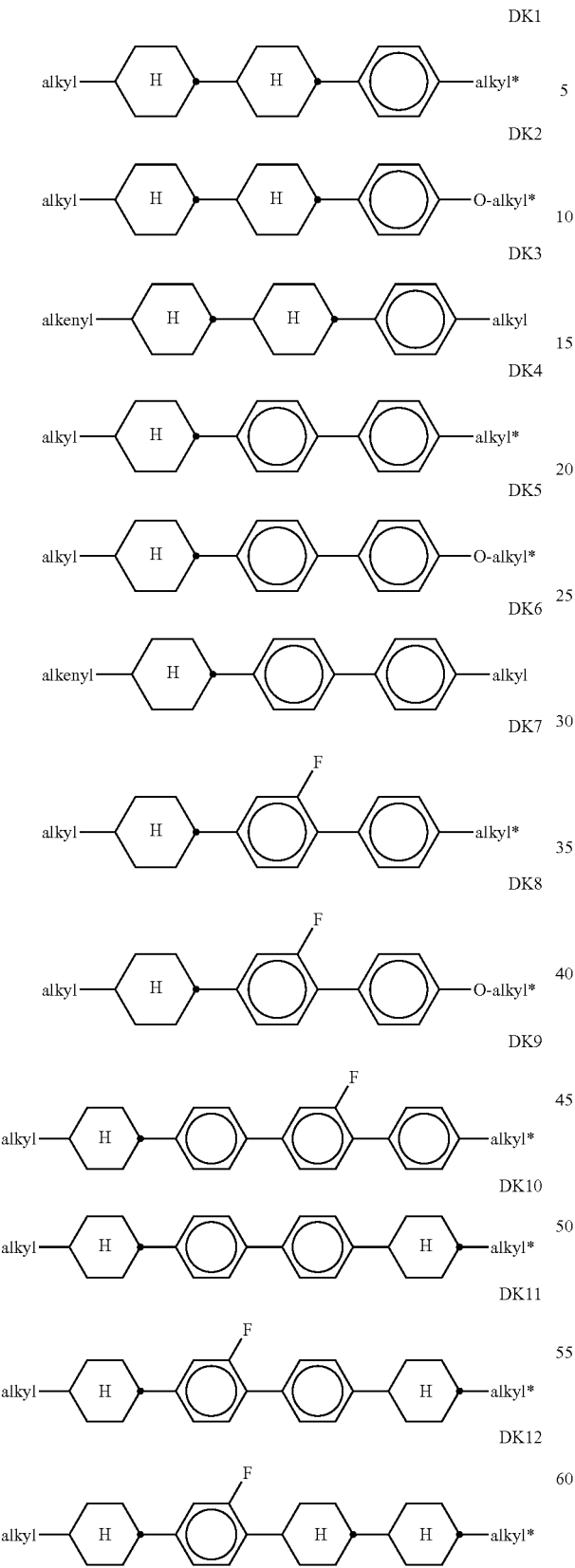

in which alkyl and alkyl* each, independently of one another, denote a straight-chain alkyl radical having 1-6

C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

d) LC medium wherein LC component B) or the LC host mixture additionally comprises one or more compounds of the following formula:

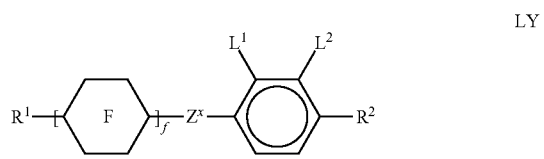
LY in which the individual radicals have the following meanings:

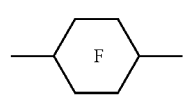

denotes

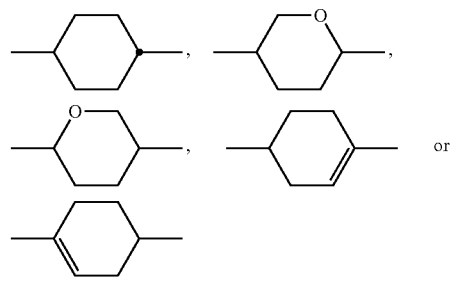

with at least one ring F being different from cyclohexylene, f denotes 1 or 2,

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

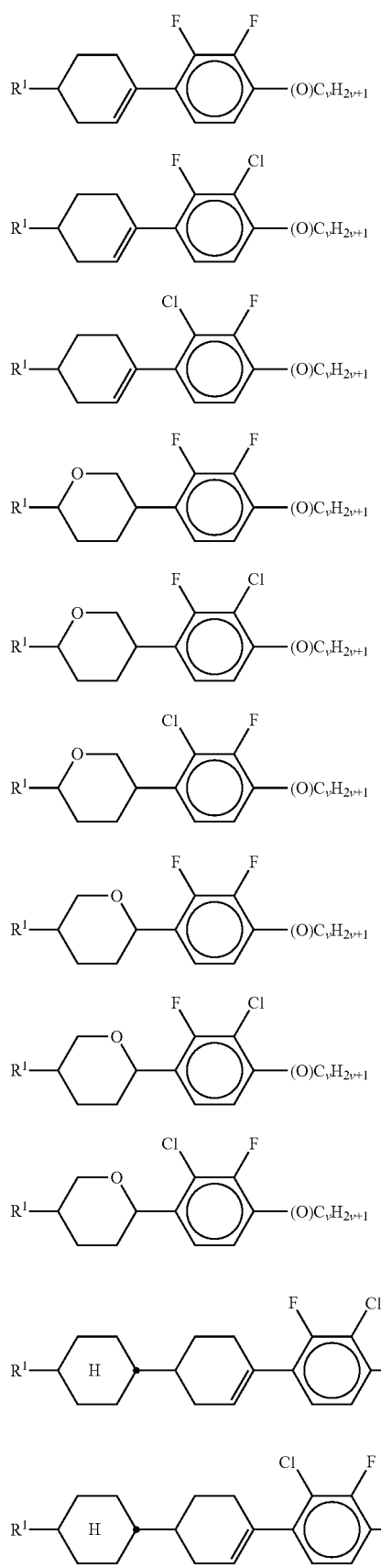
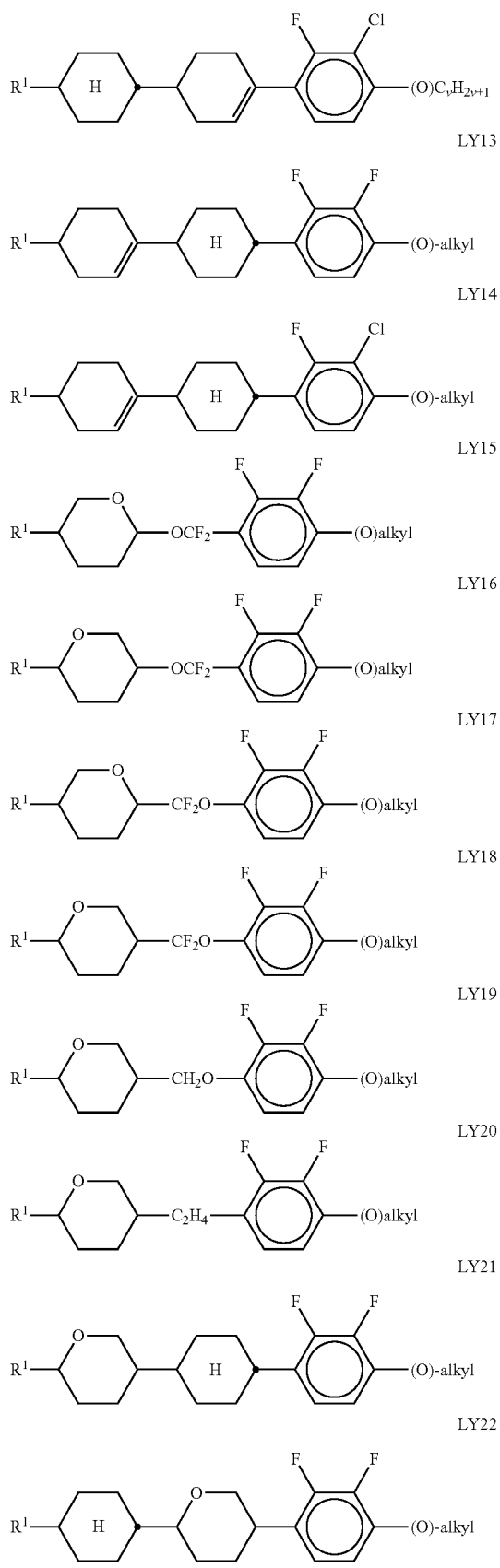

-continued

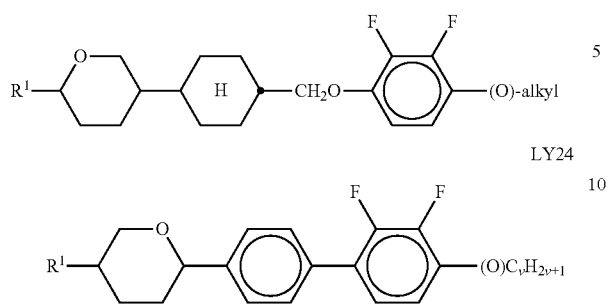

LY23

LY24 in which R¹ has the meaning indicated above, alkyl denotes a straight-chain alkyl radical having 1-6 C atoms, (O) denotes an oxygen atom or a single bond, and v denotes an integer from 1 to 6. R¹ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

e) LC medium wherein LC component B) or the LC host mixture additionally comprises one or more compounds selected from the group consisting of the following formulae:

G1

G2

G3

G4 in which alkyl denotes $C_{1-6}$-alkyl, $L^x$ denotes H or F, and X denotes F, Cl, $OCF_3$, $OCHF_2$ or OCH=$CF_2$. Particular preference is given to compounds of the formula G1 in which X denotes F.

f) LC medium wherein LC component B) or the LC host mixture additionally comprises one or more compounds selected from the group consisting of the following formulae:

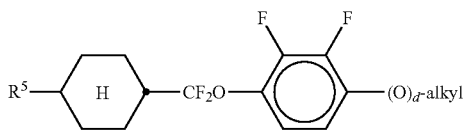

Y1

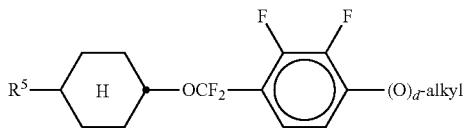

Y2

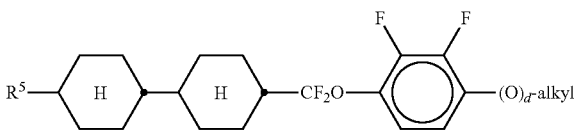

Y3

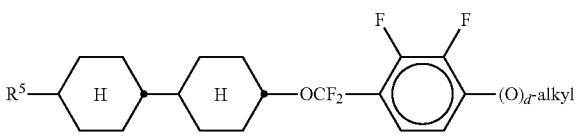

Y4

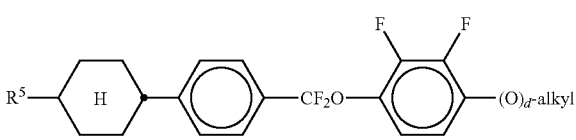

Y5

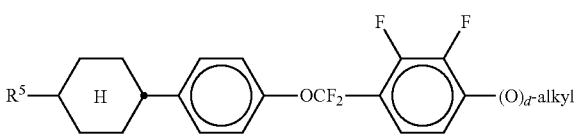

Y6

Y7

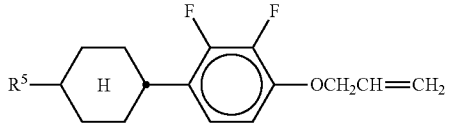

Y8

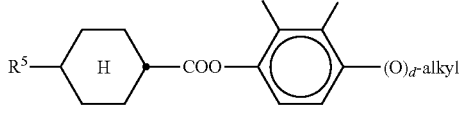

Y9

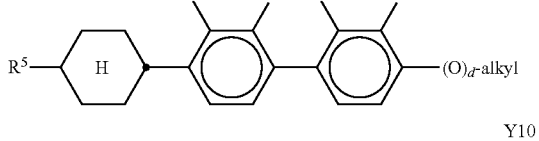

Y10

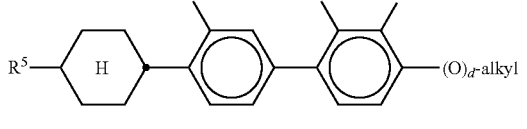

-continued

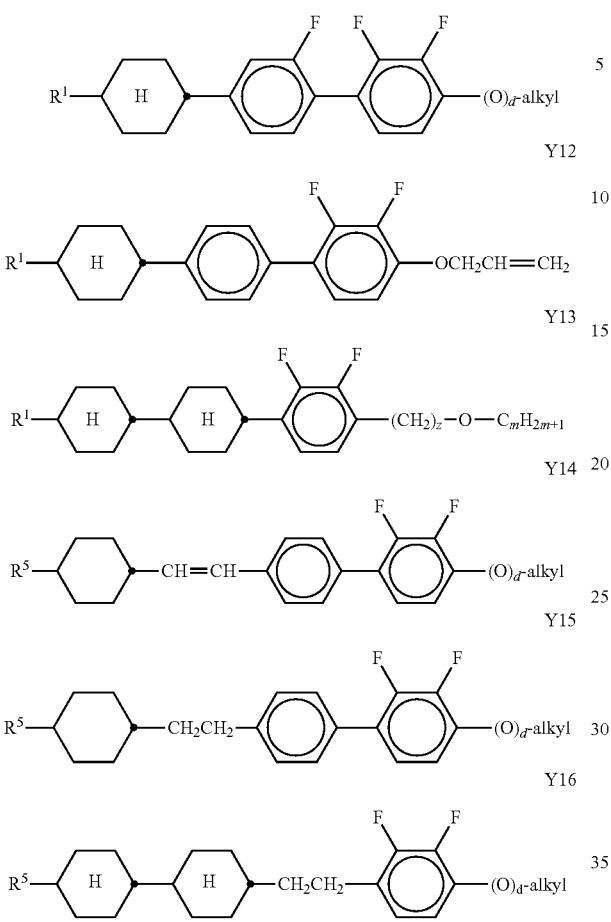

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium wherein LC component B) or the LC host mixture additionally comprises one or more biphenyl compounds selected from the group consisting of the following formulae:

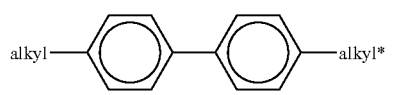

B1

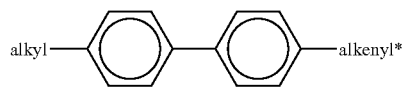

B2

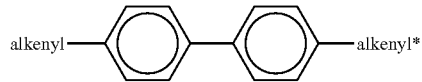

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The proportion of the biphenyls of the formulae B1 to B3 in the LC host mixture is preferably at least 3% by weight, in particular ≥5% by weight.

The compounds of the formula B2 are particularly preferred.

The compounds of the formulae B1 to B3 are preferably selected from the group consisting of the following sub-formulae:

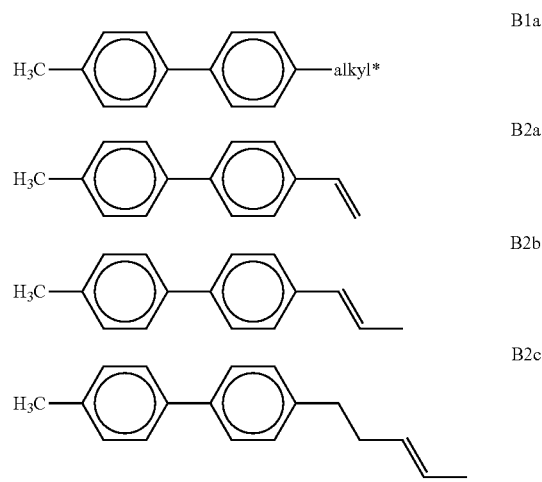

in which alkyl* denotes an alkyl radical having 1-6 C atoms. The medium according to the invention particularly preferably comprises one or more compounds of the formulae B1a and/or B2c.

h) LC medium wherein LC component B) or the LC host mixture additionally comprises one or more terphenyl compounds of the following formula:

in which $R^5$ and $R^6$ each, independently of one another, have one of the meanings indicated above, and

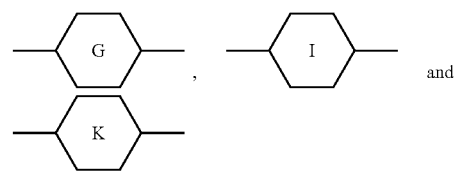

each, independently of one another, denote
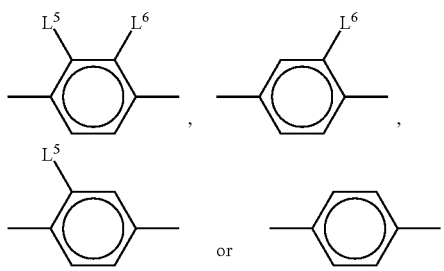
in which $L^5$ denotes F or Cl, preferably F, and $L^6$ denotes F, Cl, $OCF_3$, $CF_3$, $CH_3$, $CH_2F$ or $CHF_2$, preferably F.
The compounds of the formula T are preferably selected from the group consisting of the following sub-formulae:
T1
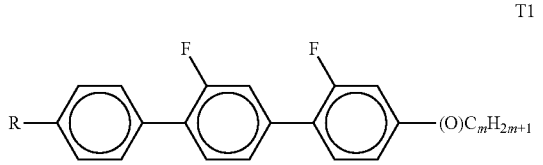
T2
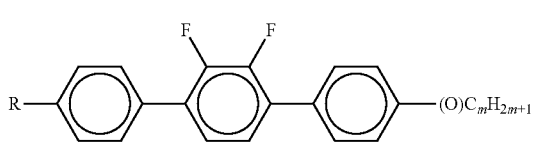
T3
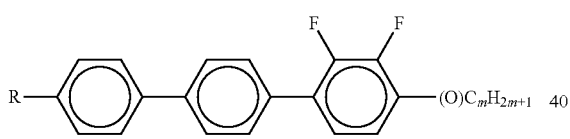
T4
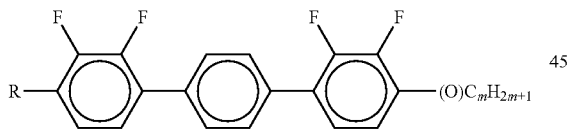
T5
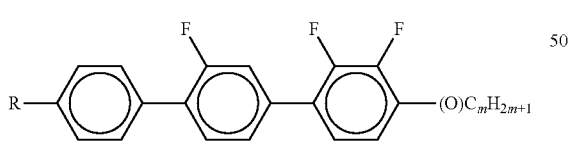
T6
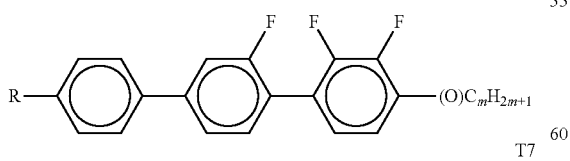
T7
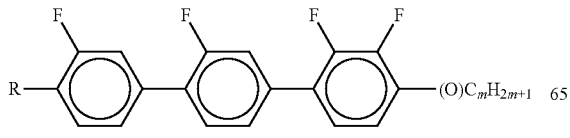
-continued
T8
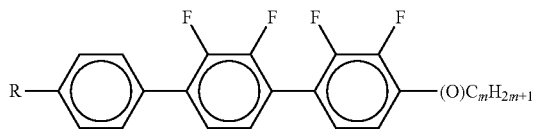
T9
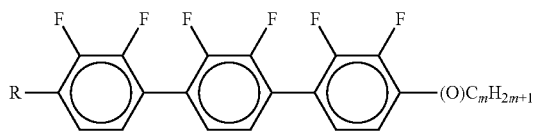
T10
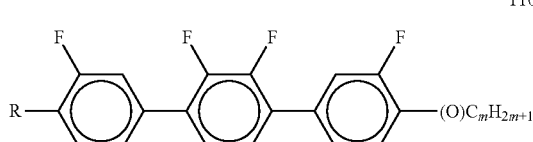
T11
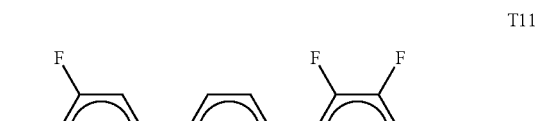
T12
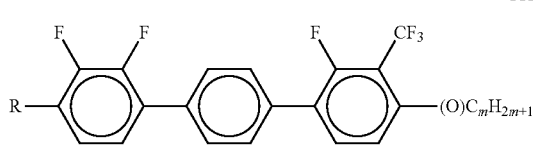
T13
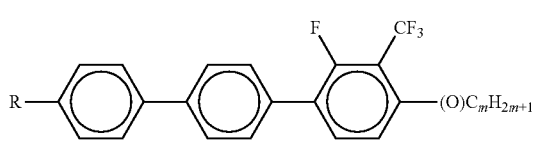
T14
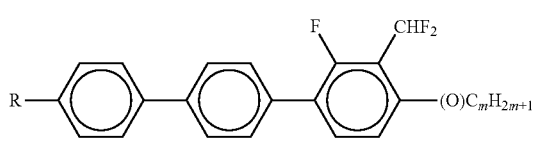
T15
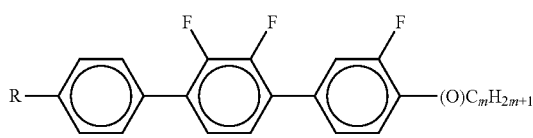
T16
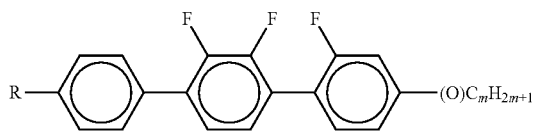
T17
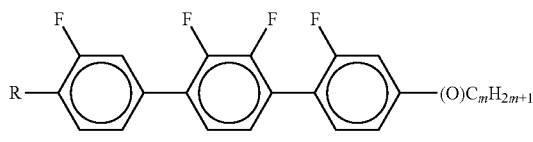

-continued

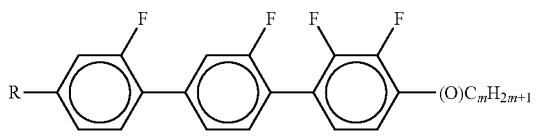

T18

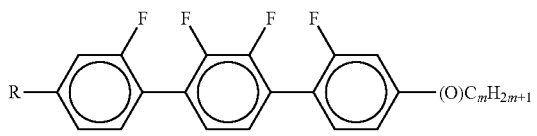

T19

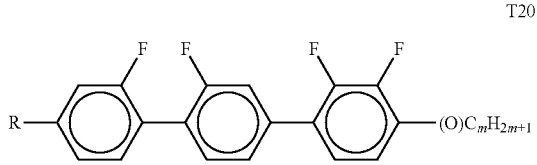

T20

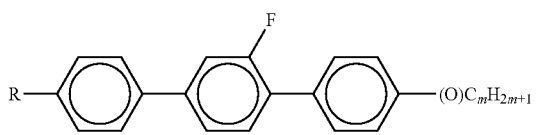

T21

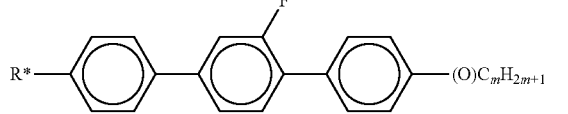

T22

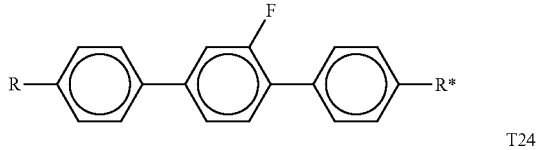

T23

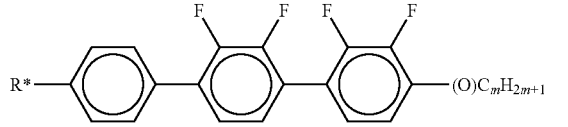

T24 in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T22.

i) LC medium wherein LC component B) or the LC host mixture additionally comprises one or more quaterphenyl compounds selected from the group consisting of the following formulae:

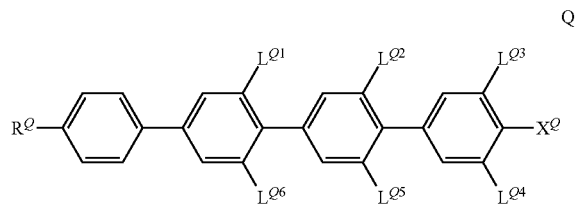

Q wherein $R^Q$ is alkyl, alkoxy, oxaalkyl or alkoxyalkyl having 1 to 9 C atoms or alkenyl or alkenyloxy having 2 to 9 C atoms, all of which are optionally fluorinated, $X^Q$ is F, Cl, halogenated alkyl or alkoxy having 1 to 6 C atoms or halogenated alkenyl or alkenyloxy having 2 to 6 C atoms, $L^{Q1}$ to $L^{Q6}$ independently of each other are H or F, with at least one of $L^{Q1}$ to $L^{Q6}$ being F.

Preferred compounds of formula Q are those wherein $R^Q$ denotes straight-chain alkyl with 2 to 6 C-atoms, very preferably ethyl, n-propyl or n-butyl.

Preferred compounds of formula Q are those wherein $L^{Q3}$ and $L^{Q4}$ are F. Further preferred compounds of formula Q are those wherein $L^{Q3}$, $L^{Q4}$ and one or two of $L^{Q1}$ and $L^{Q2}$ are F.

Preferred compounds of formula Q are those wherein $X^Q$ denotes F or $OCF_3$, very preferably F.

The compounds of formula Q are preferably selected from the following subformulae

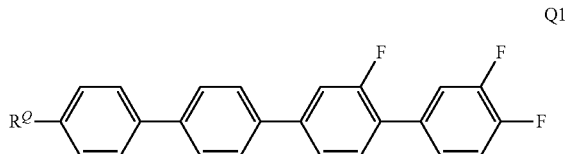

Q1

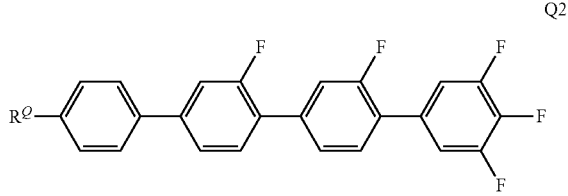

Q2 wherein $R^Q$ has one of the meanings of formula Q or one of its preferred meanings given above and below, and is preferably ethyl, n-propyl or n-butyl.

Especially preferred are compounds of formula Q1, in particular those wherein $R^Q$ is n-propyl.

Preferably the proportion of compounds of formula Q in the LC host mixture is from >0 to ≤5% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerisation, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking.

k) LC medium wherein LC component B) or the LC host mixture additionally comprises one or more compounds of formula C:

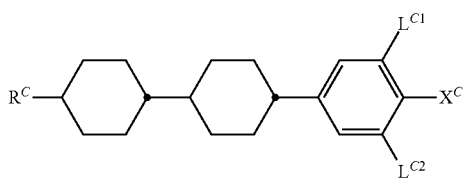

C wherein
- $R^C$ denotes alkyl, alkoxy, oxaalkyl or alkoxyalkyl having 1 to 9 C atoms or alkenyl or alkenyloxy having 2 to 9 C atoms, all of which are optionally fluorinated,
- $X^C$ denotes F, Cl, halogenated alkyl or alkoxy having 1 to 6 C atoms or halogenated alkenyl or alkenyloxy having 2 to 6 C atoms,
- $L^{C1}$, $L^{C2}$ independently of each other denote H or F, with at least one of $L^{C1}$ and $L^{C2}$ being F.

Preferred compounds of formula C are those wherein $R^C$ denotes straight-chain alkyl with 2 to 6 C-atoms, very preferably ethyl, n-propyl or n-butyl.

Preferred compounds of formula C are those wherein $L^{C1}$ and $L^{C2}$ are F.

Preferred compounds of formula C are those wherein $X^C$ denotes F or $OCF_3$, very preferably F.

Preferred compounds of formula C are selected from the following formula

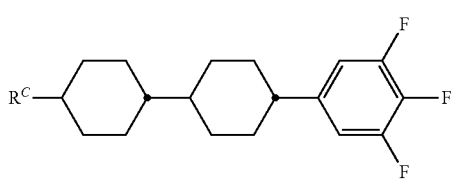

C1 wherein $R^C$ has one of the meanings of formula C or one of its preferred meanings given above and below, and is preferably ethyl, n-propyl or n-butyl, very preferably n-propyl.

Preferably the proportion of compounds of formula C in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula C.

The addition of compounds of formula C, which have positive dielectric anisotropy, to the LC medium with negative dielectric anisotropy allows a better control of the values of the dielectric constants $\varepsilon_\parallel$ and $\varepsilon_\perp$, and in particular enables to achieve a high value of the dielectric constant $\varepsilon_\parallel$ while keeping the dielectric anisotropy $\Delta\varepsilon$ constant, thereby reducing the kick-back voltage and reducing image sticking. Besides, the addition of compounds of formula C enables to reduce the viscosity and the response time of the LC medium.

l) LC medium wherein LC component B) or the LC host mixture additionally comprises one or more compounds selected from the group consisting of the following formulae:

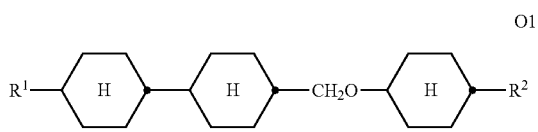

O1

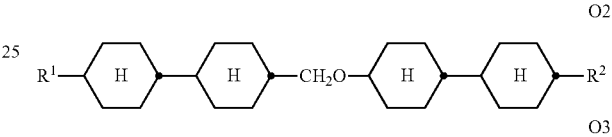

O2

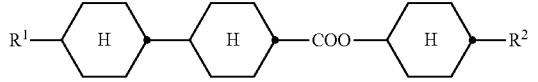

O3

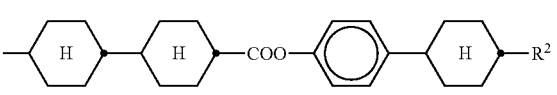

O4

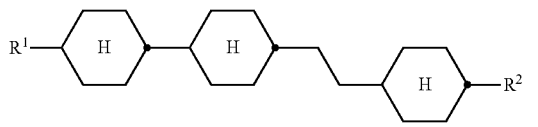

O5

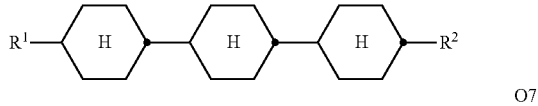

O6

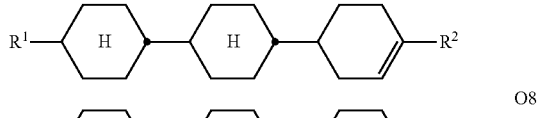

O7

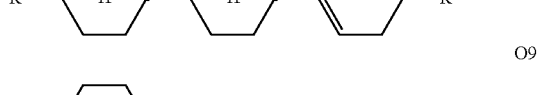

O8

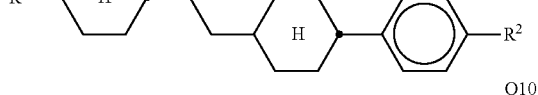

O9

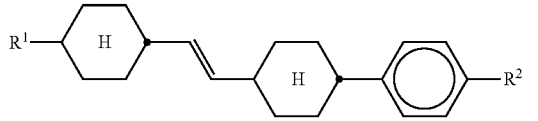

O10

O11

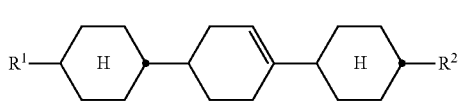

in which R¹ and R² have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

m) LC medium wherein LC component B) or the LC host mixture additionally comprises one or more compounds of the following formula:

FI

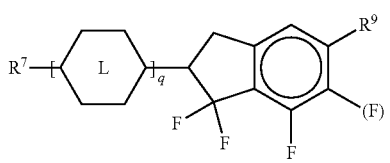

in which

denotes

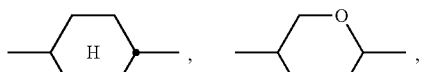
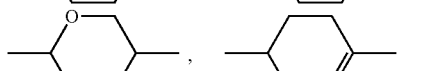
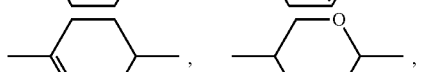
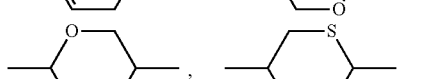

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≤5% by weight and very particularly preferably 5-30% by weight.

Particularly preferred compounds of the formula FI are selected from the group consisting of the following sub-formulae:

FI1
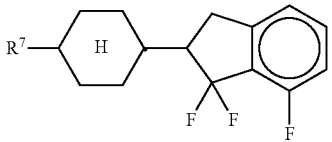

FI2
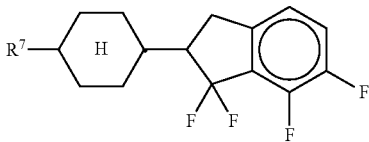

FI3
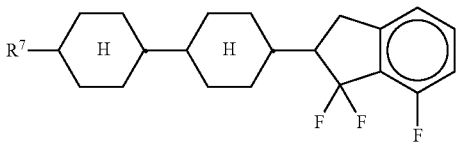

FI4
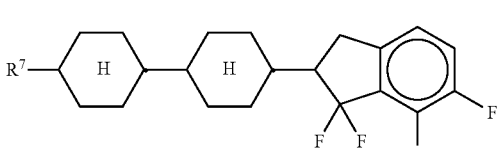

FI5
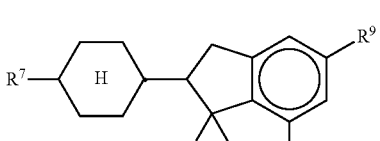

FI6
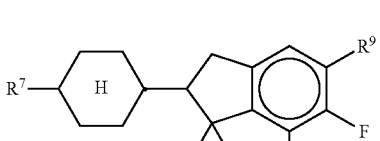

FI7
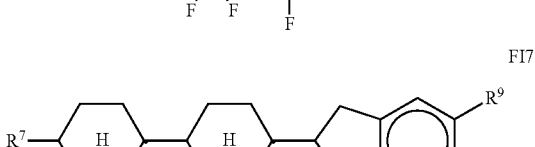

FI8
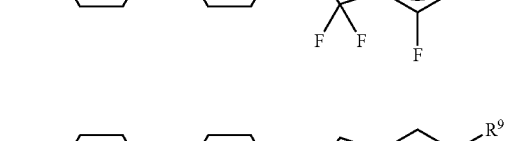

in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

n) LC medium wherein LC component B) or the LC host mixture additionally comprises one or more compounds selected from the group consisting of the following formulae:

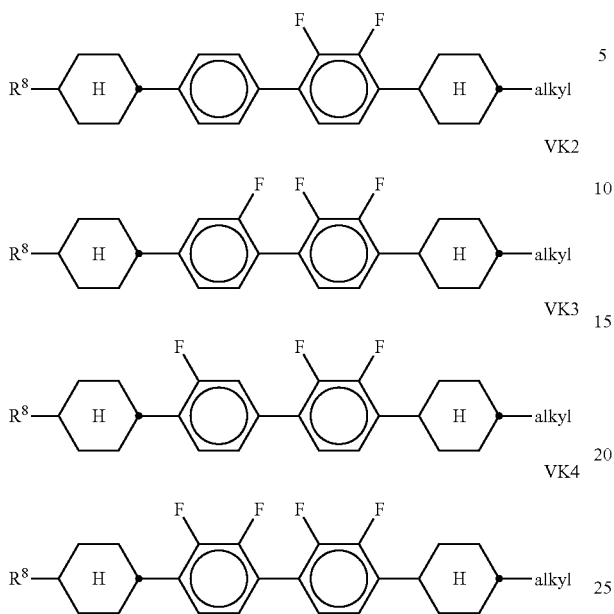

in which R⁸ has the meaning indicated for $R^1$, and alkyl denotes a straight-chain alkyl radical having 1-6 C atoms.

o) LC medium wherein LC component B) or the LC host mixture additionally comprises one or more compounds which contain a tetrahydronaphthyl or naphthyl unit, such as, for example, the compounds selected from the group consisting of the following formulae:

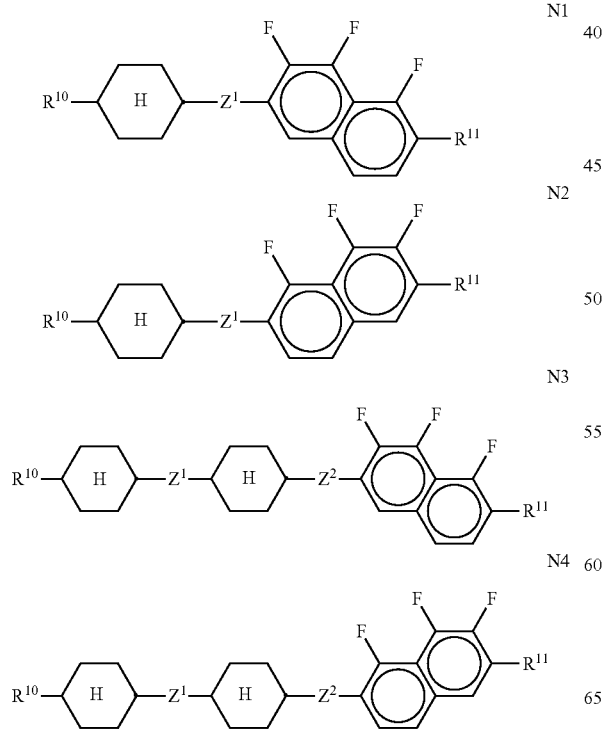

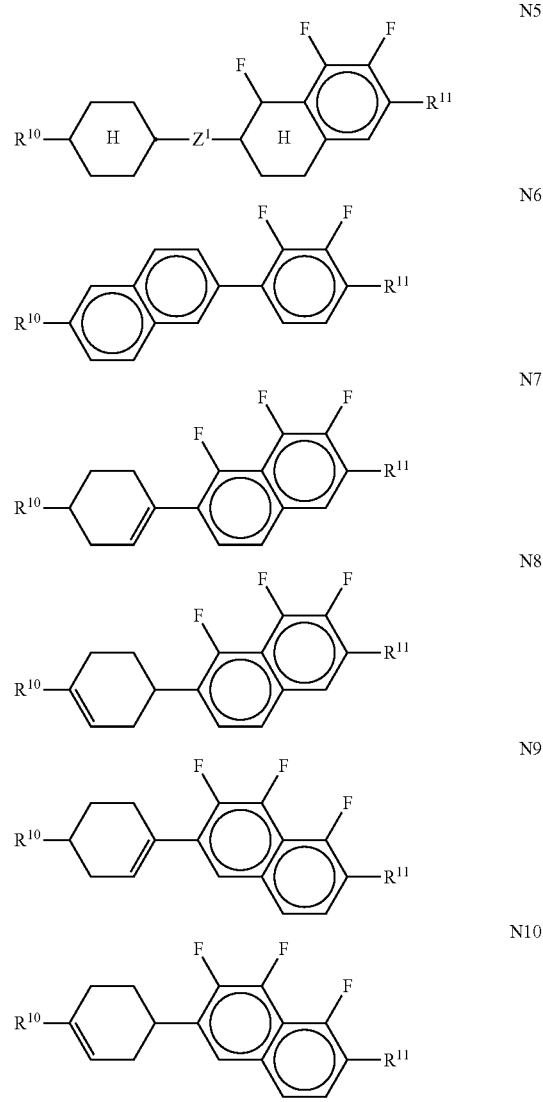

in which
$R^{10}$ and $R^{11}$ each, independently of one another, denote alkyl having 1 to 12 C atoms, where, in addition, one or two non-adjacent CH₂ groups may be replaced by —O—, —CH=CH—, —CO—, —OCO— or —COO— in such a way that O atoms are not linked directly to one another, preferably alkyl or alkoxy having 1 to 6 C atoms,
and $R^{10}$ and $R^{11}$ preferably denote straight-chain alkyl or alkoxy having 1 to 6 C atoms or straight-chain alkenyl having 2 to 6 C atoms, and
$Z^1$ and $Z^2$ each, independently of one another, denote —C₂H₄—, —CH=CH—, —(CH₂)₄—, —(CH₂)₃O—, —O(CH₂)₃—, —CH=CH—CH₂CH₂—, —CH₂CH₂CH=CH—, —CH₂O—, —OCH₂—, —CO—O—, —O—CO—, —C₂F₄—, —CF=CF—, —CF=CH—, —CH=CF—, —CH₂— or a single bond.

p) LC medium wherein LC component B) or the LC host mixture additionally comprises one or more difluorodibenzochromans and/or chromans of the following formulae:

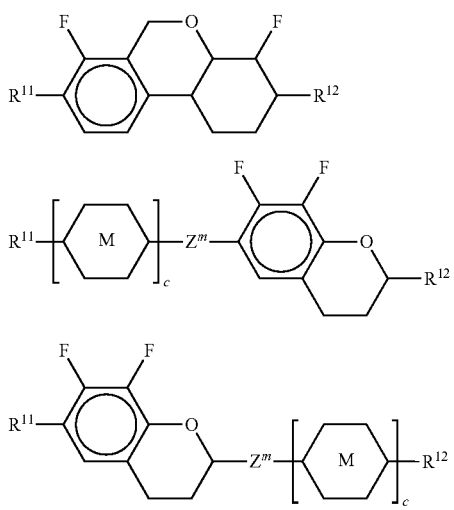

BC

CR

RC in which

R¹¹ and R¹² each, independently of one another, have one of the meanings indicated above for R¹¹, ring M is trans-1,4-cyclohexylene or 1,4-phenylene, $Z^m$ —C$_2$H$_4$—, —CH$_2$O—, —OCH$_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

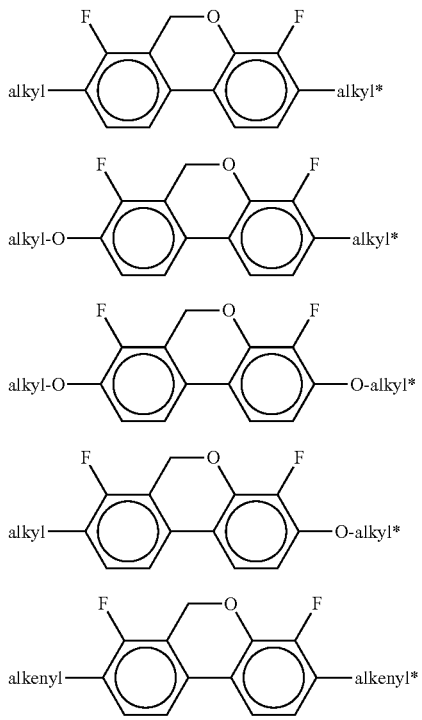

BC1

BC2

BC3

BC4

BC5

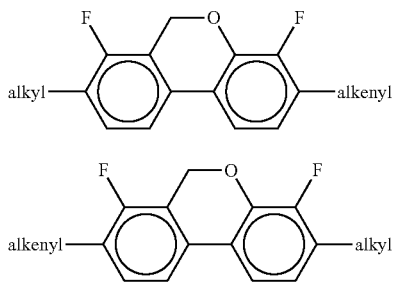

BC6

BC7

CR1

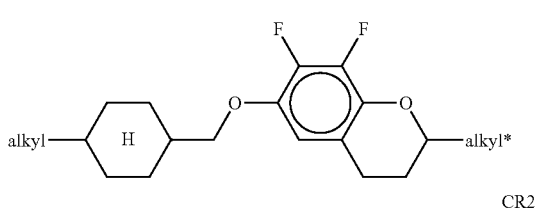

CR2

CR3

CR4

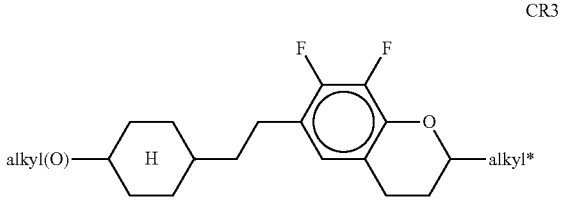

CR5

CR6

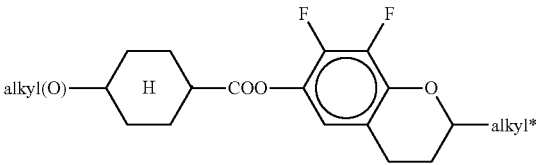

CR7

-continued

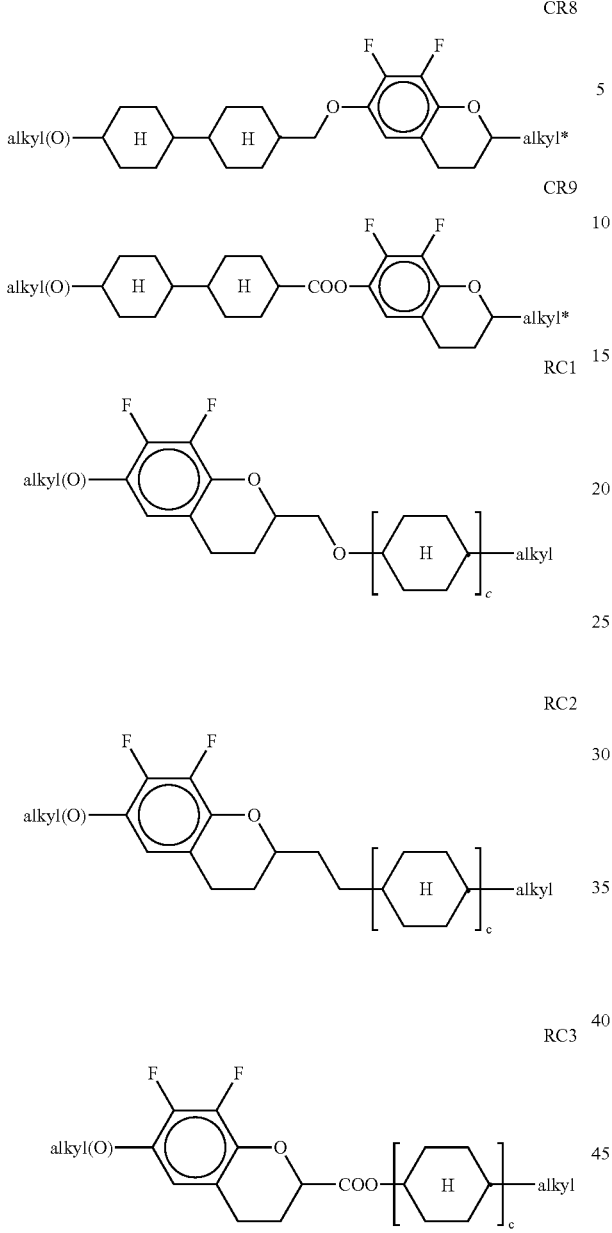

CR8

CR9

RC1

RC2

RC3 in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to LC host mixtures comprising one, two or three compounds of the formula BC-2.

q) LC medium wherein LC component B) or the LC host mixture additionally comprises one or more fluorinated phenanthrenes and/or dibenzofurans of the following formulae:

PH

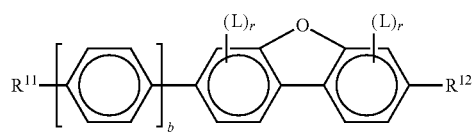

BF in which R$^{11}$ and R$^{12}$ each, independently of one another, have one of the meanings indicated above for R$^{11}$, b denotes 0 or 1, L denotes F, and r denotes 1, 2 or 3.

Particularly preferred compounds of the formulae PH and BF are selected from the group consisting of the following sub-formulae:

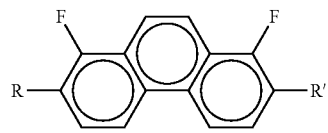

PH1

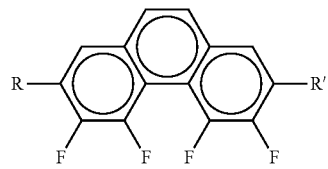

PH2

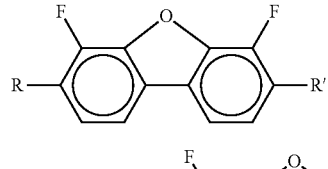

BF1

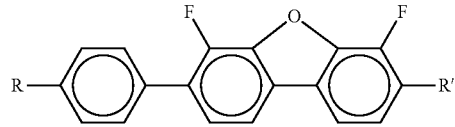

BF2 in which R and R' each, independently of one another, denote a straight-chain alkyl or alkoxy radical having 1-7 C atoms.

r) LC medium wherein LC component B) or the LC host mixture additionally comprises one or more monocyclic compounds of the following formula

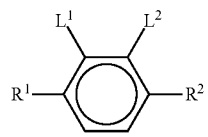

Y wherein

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

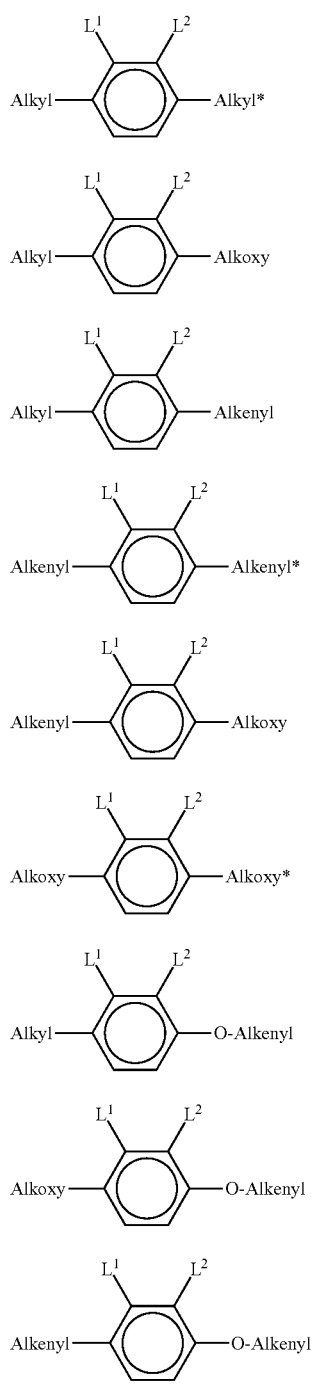

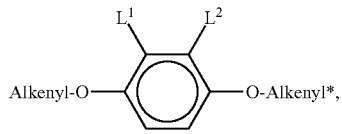

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

Particularly preferred compounds of the formula Y are selected from the group consisting of the following sub-formulae:

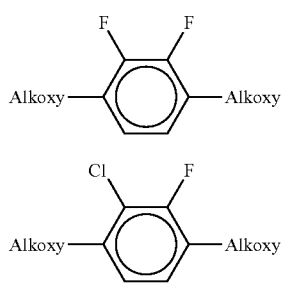

wherein Alkoxy preferably denotes straight-chain alkoxy with 3, 4, or 5 C atoms.

s) LC medium which, apart from the polymerisable compounds as described above and below, does not contain a compound which contains a terminal vinyloxy group (—O—CH=$CH_2$).

t) LC medium wherein LC component B) or the LC host mixture comprises 1 to 8, preferably 1 to 5, compounds of the formulae CY1, CY2, PY1 and/or PY2. The proportion of these compounds in the LC host mixture as a whole is preferably 5 to 60%, particularly preferably 10 to 35%. The content of these individual compounds is preferably in each case 2 to 20%.

u) LC medium wherein LC component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

v) LC medium wherein LC component B) or the LC host mixture comprises 1 to 10, preferably 1 to 8, compounds of the formula ZK, in particular compounds of the formulae ZK1, ZK2 and/or ZK3. The proportion of these compounds in the LC host mixture as a whole is preferably 3 to 25%, particularly preferably 5 to 45%. The content of these individual compounds is preferably in each case 2 to 25%.

w) LC medium in which the proportion of compounds of the formulae CY, PY and ZK in the LC host mixture as a whole is greater than 70%, preferably greater than 80%.

x) LC medium wherein LC component B) or the LC host mixture contains one or more, preferably 1 to 5, compounds selected of formula PY1 PY8, very preferably of formula PY2. The proportion of these compounds in the LC host mixture as a whole is preferably 1 to 30%, particularly preferably 2 to 20%. The content of these individual compounds is preferably in each case 1 to 20%.

y) LC medium wherein LC component B) or the LC host mixture contains one or more, preferably 1, 2 or 3, compounds selected from formulae T1, T2 and T5, very preferably from formula T2. The content of these compounds in the LC host mixture as a whole is preferably 1 to 20%.

z) LC medium in which the LC host mixture contains one or more compounds selected from formulae CY and PY, one or more compounds selected from formulae ZK, and one or more compounds selected from formulae T and Q.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The LC media and LC host mixtures of the present invention preferably have a nematic phase range of at least 80 K, particularly preferably at least 100 K, and a rotational viscosity ≤250 mPa·s, preferably ≤200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PS-VA, PS-UB-FFS and SA-VA type, have a negative dielectric anisotropy Δε, preferably from −0.5 to −10, in particular from −2.5 to −7.5, at 20° C. and 1 kHz.

The birefringence Δn in LC media according to the invention for use in displays of the PS-VA, PS-UB-FFS and SA-VA type is preferably below 0.16, particularly preferably from 0.06 to 0.14, very particularly preferably from 0.07 to 0.12.

The LC media according to the invention may also comprise further additives which are known to the person skilled in the art and are described in the literature, such as, for example, polymerisation initiators, inhibitors, stabilisers, surface-active substances or chiral dopants. These may be polymerisable or non-polymerisable. Polymerisable additives are accordingly ascribed to the polymerisable component or component A). Non-polymerisable additives are accordingly ascribed to the non-polymerisable component or LC component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table E below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutylammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

Preferred mixture components are shown in Table D below.

In the present invention and in particular in the following examples, the structures of the mesogenic compounds are indicated by abbreviations, which are also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl respectively, preferably 1-E-alkenyl, in each case having n, m or l C atoms respectively. Table A shows the codes used for the ring elements of the core structures of the compounds, while Table B shows the linking groups. Table C indicates the meanings of the codes for the end groups of the left-hand or right-hand side. The acronyms are composed of the codes for the ring elements with optional linking groups, followed by a first hyphen and the codes for the left-hand end group, and a second hyphen and the codes for the right-hand end group. Table D shows illustrative structures of compounds with their respective abbreviations.

TABLE A

| Ring elements | |
|---|---|
| C | cyclohexane-1,4-diyl |
| P | 1,4-phenylene |
| D | 1,3-dioxane-2,5-diyl |
| D1 | 1,3-dioxane-2,5-diyl (isomer) |
| A | tetrahydropyran-2,5-diyl |
| A1 | tetrahydropyran-2,5-diyl (isomer) |
| G | 2-fluoro-1,4-phenylene |
| G1 | 3-fluoro-1,4-phenylene |
| U | 2,3-difluoro-1,4-phenylene |
| U1 | 2,5-difluoro-1,4-phenylene |
| M | pyrimidine-2,5-diyl |

TABLE A-continued

| Ring elements | |
|---|---|
| M1 | pyrimidine-2,5-diyl (isomer) |
| N | pyridine-2,5-diyl |
| N1 | pyridine-2,5-diyl (isomer) |
| Y | 2,3-difluoro-1,4-phenylene |
| P(F, Cl)Y | 2-fluoro-3-chloro-1,4-phenylene |
| P(Cl, F)Y | 2-chloro-3-fluoro-1,4-phenylene |
| Np | naphthalene-2,6-diyl |
| dH | decahydronaphthalene-2,6-diyl |
| n3f | trifluoronaphthalene-2,6-diyl |
| n3f1 | trifluoronaphthalene-2,6-diyl (isomer) |
| tH | tetrahydronaphthalene-2,6-diyl |

TABLE A-continued

| Ring elements | |
|---|---|
| tH1 | (2-methyl-tetrahydronaphthalene ring structure) |
| tH2f | (difluoro-tetrahydronaphthalene structure) |
| tH2fl | (difluoro-tetrahydronaphthalene structure) |
| o2f | (difluoro-chromane structure) |
| o2fl | (difluoro-chromane structure) |
| dh | (decahydronaphthalene structure) |
| B | (difluoro-dibenzofuran structure) |
| K | (trifluoro-indane structure with methyl) |
| Kl | (trifluoro-indane structure) |
| L | (cyclohexene ring) |
| Ll | (cyclohexene ring) |
| F | (fluoro-cyclohexene) |
| Fl | (fluoro-cyclohexene) |
| Nf | (fluoro-pyridine) |
| Nfl | (fluoro-pyridine) |

TABLE B

| Bridging members | |  |  |
|---|---|---|---|
| E | —CH$_2$—CH$_2$— | | |
| V | —CH=CH— | | |
| T | —C≡C— | | |
| W | —CF$_2$—CF$_2$— | | |
| B | —CF=CF— | | |
| Z | —CO—O— | Zl | —O—CO— |
| X | —CF=CH— | Xl | —CH=CF— |
| O | —CH$_2$—O— | Ol | —O—CH$_2$— |
| Q | —CF$_2$—O— | Ql | —O—CF$_2$— |

TABLE C

| End groups | | | |
|---|---|---|---|
| On the left individually or in combination | | On the right individually or in combination | |
| -n- | C$_n$H$_{2n+1}$— | -n | —C$_n$H$_{2n+1}$ |
| -nO- | C$_n$H$_{2n+1}$—O— | -On | —O—C$_n$H$_{2n+1}$ |
| -V- | CH$_2$=CH— | -V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |

TABLE C-continued

| End groups | | | |
|---|---|---|---|
| -N- | N≡C— | -N | —C≡N |
| -S- | S=C=N— | -S | —N=C=S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| | | -OXF | —O—CH=CF2 |

| On the left only in combination | | On the right only in combination | |
|---|---|---|---|
| -...n...- | —C$_n$H$_{2n}$— | -...n... | —C$_n$H$_{2n}$— |
| -...M...- | —CFH— | -...M... | —CFH— |
| -...D...- | —CF$_2$— | -...D... | —CF$_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— |
| | | -...X... | —CH=CF— | in which n and m are each integers and the three dots "..." are placeholders for other abbreviations from this table.

The following table shows illustrative structures together with their respective abbreviations. These are shown in order to demonstrate the meaning of the rules for the abbreviations. Besides the compounds of the formula I, the mixtures according to the invention preferably comprise one or more compounds of the compounds mentioned below.

The following abbreviations are used:
(n, m and z, independently of one another, in each case an integer, preferably 1 to 6).

TABLE D

Illustrative structures

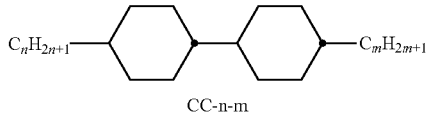

CC-n-m

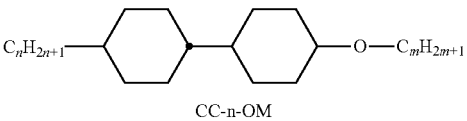

CC-n-OM

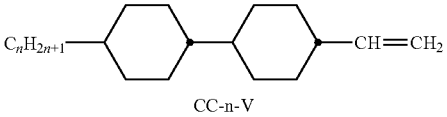

CC-n-V

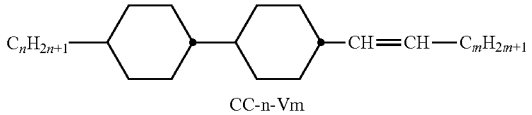

CC-n-Vm

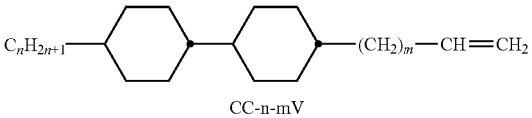

CC-n-mV

TABLE D-continued

Illustrative structures $C_nH_{2n+1}$—⬡—⬡—$(CH_2)_m$—CH=CH—$C_lH_{2l+1}$
CC-n-mVl $H_2C$=CH—⬡—⬡—CH=$CH_2$
CC-V-V $CH_2$=CH—⬡—⬡—$(CH_2)_m$—CH=$CH_2$
CC-V-mV $CH_2$=CH—⬡—⬡—CH=CH—$C_mH_{2m+1}$
CC-V-Vm $CH_2$=CH—$(CH_2)_n$—⬡—⬡—$(CH_2)_m$—CH=$CH_2$
CC-Vn-mV $C_nH_{2n+1}$—CH=CH—⬡—⬡—$(CH_2)_m$—CH=$CH_2$
CC-nV-mV $C_nH_{2n+1}$—CH=CH—⬡—⬡—CH=CH—$C_mH_{2m+1}$
CC-nV-Vm $C_nH_{2n+1}$—⬡—⬢—$C_mH_{2m+1}$
CP-n-m $C_nH_{2n+1}$—⬡—⬢—O—$C_mH_{2m+1}$
CP-n-Om $C_nH_{2n+1}$—⬢—⬢—$C_mH_{2m+1}$
PP-n-m $C_nH_{2n+1}$—⬢—⬢—O—$C_mH_{2m+1}$
PP-n-Om TABLE D-continued
Illustrative structures
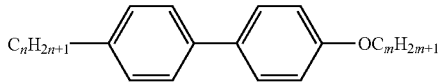
PP-n-Om
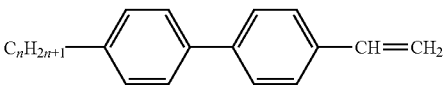
PP-n-V
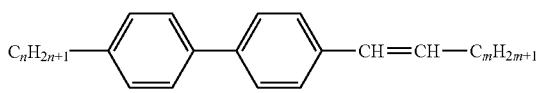
PP-n-Vm
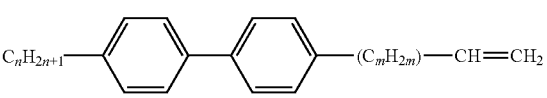
PP-n-mV
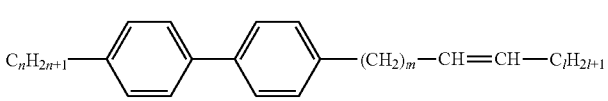
PP-n-mVl
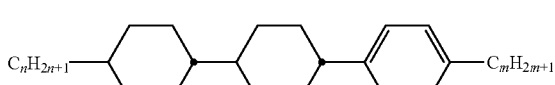
CCP-n-m
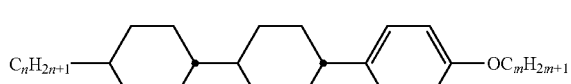
CCP-n-Om
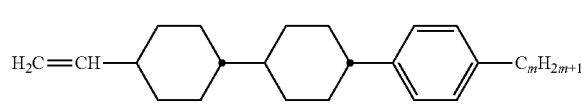
CCP-V-m
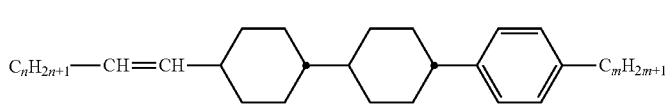
CCP-nV-m
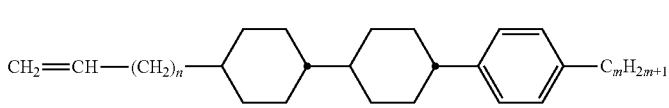
CCP-Vn-m
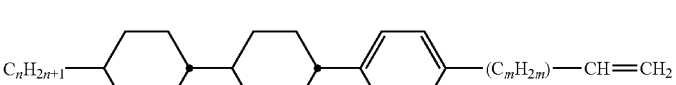
CCP-n-mV TABLE D-continued Illustrative structures $C_nH_{2n+1}$—CH=CH—$(CH_2)_m$—[Cy]—[Cy]—[Ph]—$C_lH_{2l+1}$
CCP-nVm-l $C_nH_{2n+1}$—[Cy]—[Ph]—[Ph]—$C_mH_{2m+1}$
CPP-n-m $C_nH_{2n+1}$—[Cy]—[Ph(F)]—[Ph]—$C_mH_{2m+1}$
CGP-n-m $C_nH_{2n+1}$—[Cy]—[Ph]—[Ph(F)]—$C_mH_{2m+1}$
CPG-n-m $C_nH_{2n+1}O$—[Cy]—[Ph]—[Ph]—$C_mH_{2m+1}$
CPP-nO-m $C_nH_{2n+1}$—[Cy]—[Ph]—[Ph]—$OC_mH_{2m+1}$
CPP-n-Om $H_2C$=CH—[Cy]—[Ph]—[Ph]—$C_mH_{2m+1}$
CPP-V-m $C_nH_{2n+1}$—CH=CH—[Cy]—[Ph]—[Ph]—$C_mH_{2m+1}$
CPP-nV-m $CH_2$=CH—$(C_nH_{2n})$—[Cy]—[Ph]—[Ph]—$C_mH_{2m+1}$
CPP-Vn-m $C_nH_{2n+1}$—CH=CH—$(C_mH_{2m})$—[Cy]—[Ph]—[Ph]—$C_lH_{2l+1}$
CPP-nVm-l $C_nH_{2n+1}$—[Ph]—[Ph(F)]—[Ph]—$C_mH_{2m+1}$
PGP-n-m TABLE D-continued
Illustrative structures
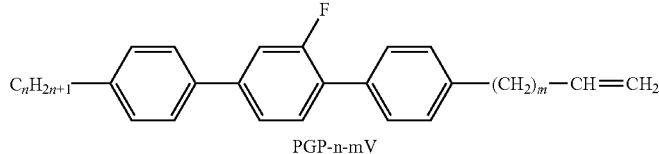
PGP-n-mV
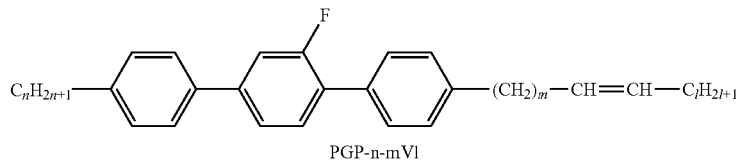
PGP-n-mVl
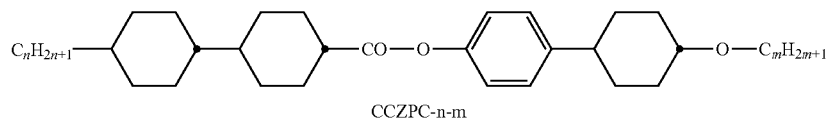
CCZPC-n-m
CPPC-n-m
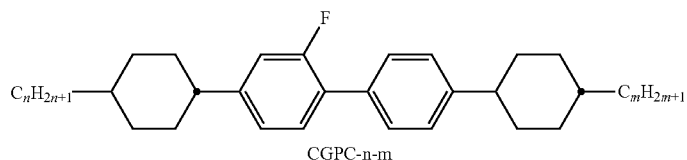
CGPC-n-m
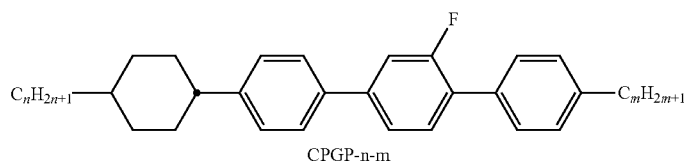
CPGP-n-m
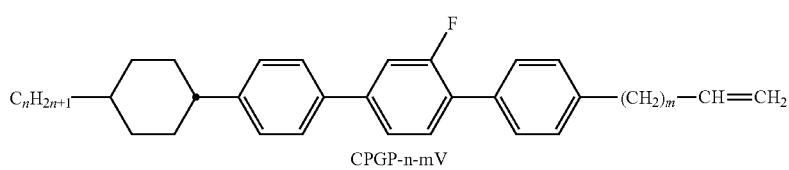
CPGP-n-mV
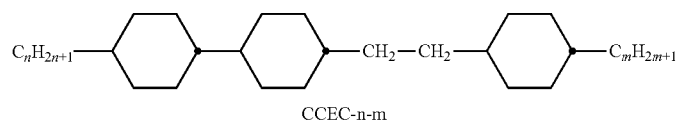
CCEC-n-m
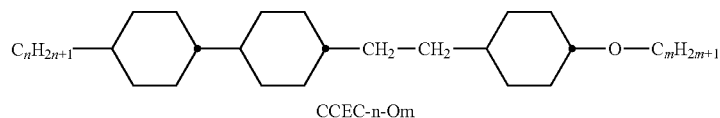
CCEC-n-Om
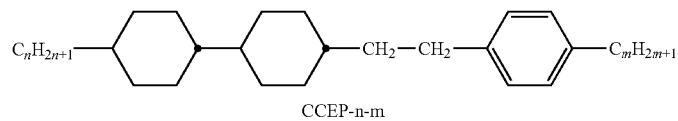
CCEP-n-m TABLE D-continued
Illustrative structures
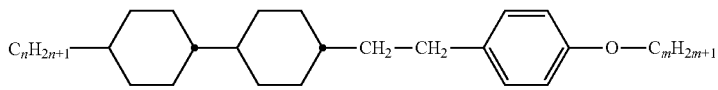
CCEP-n-Om
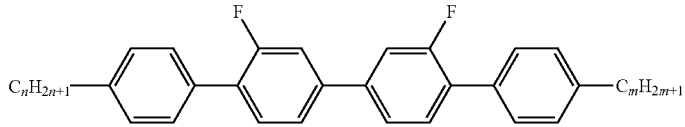
PGlPG-n-m
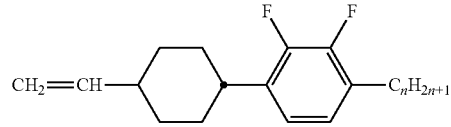
CY-V-n
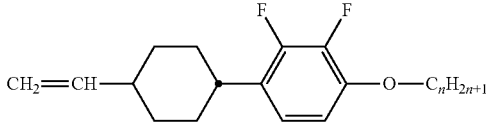
CY-V-On
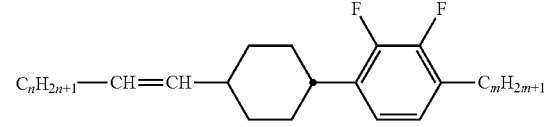
CY-nV-m
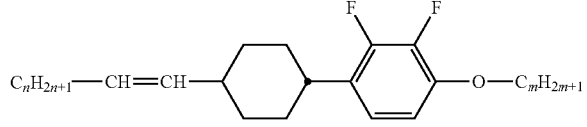
CY-nV-Om
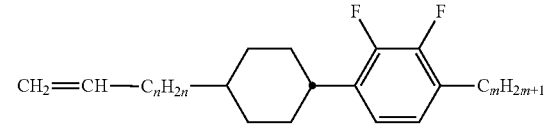
CY-Vn-m
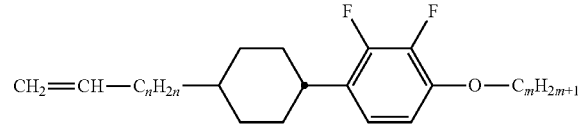
CY-Vn-Om
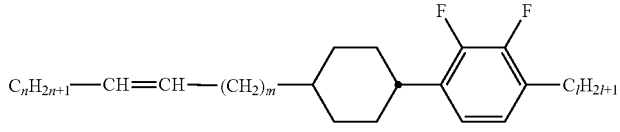
CY-nVm-l TABLE D-continued Illustrative structures $C_nH_{2n+1}$—CH=CH—$(CH_2)_m$—[cyclohexyl]—[2,3-difluorophenyl]—O—$C_lH_{2l+1}$
CY-nVm-Ol $CH_2$=CH—[phenyl]—[2,3-difluorophenyl]—$C_nH_{2n+1}$
PY-V-n $CH_2$=CH—[phenyl]—[2,3-difluorophenyl]—O—$C_nH_{2n+1}$
PY-V-On $C_nH_{2n+1}$—CH=CH—[phenyl]—[2,3-difluorophenyl]—$C_mH_{2m+1}$
PY-nV-m $C_nH_{2n+1}$—CH=CH—[phenyl]—[2,3-difluorophenyl]—O—$C_mH_{2m+1}$
PY-nV-Om $CH_2$=CH—$C_nH_{2n}$—[phenyl]—[2,3-difluorophenyl]—$C_mH_{2m+1}$
PY-Vn-m $CH_2$=CH—$C_nH_{2n}$—[phenyl]—[2,3-difluorophenyl]—O—$C_mH_{2m+1}$
PY-Vn-Om $C_nH_{2n+1}$—CH=CH—$(CH_2)_m$—[phenyl]—[2,3-difluorophenyl]—$C_lH_{2l+1}$
PY-nVm-l $C_nH_{2n+1}$—CH=CH—$(CH_2)_m$—[phenyl]—[2,3-difluorophenyl]—O—$C_lH_{2l+1}$
PY-nVm-Ol TABLE D-continued
Illustrative structures
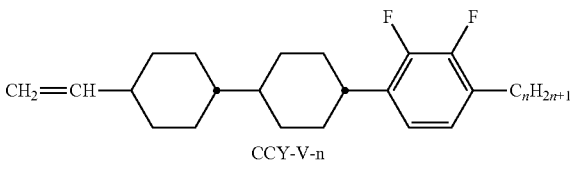
CCY-V-n
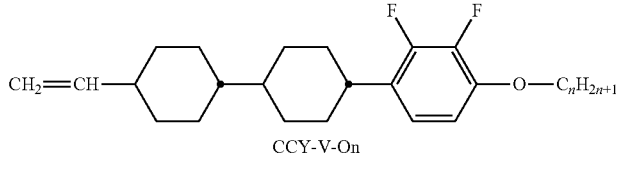
CCY-V-On
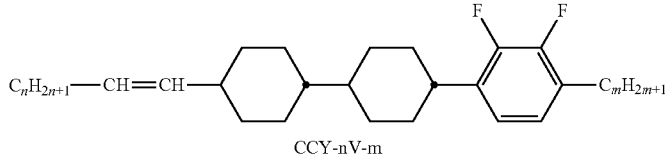
CCY-nV-m
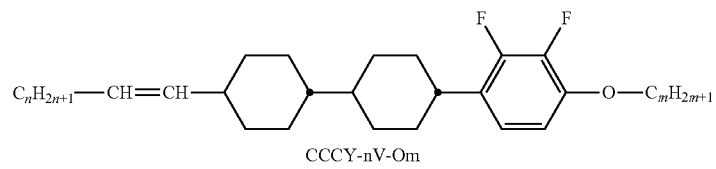
CCCY-nV-Om
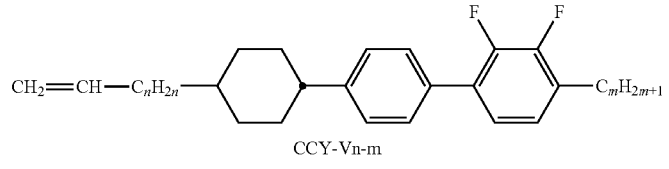
CCY-Vn-m
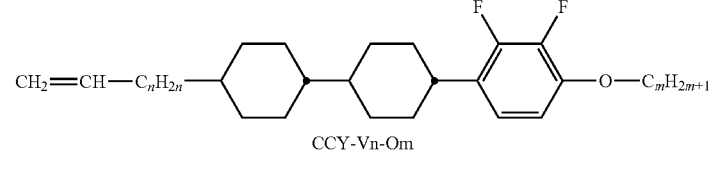
CCY-Vn-Om
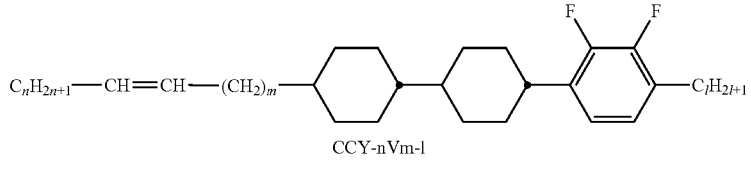
CCY-nVm-l
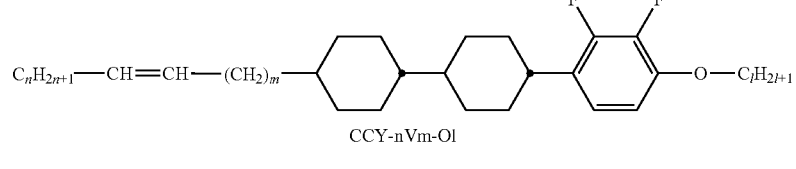
CCY-nVm-Ol
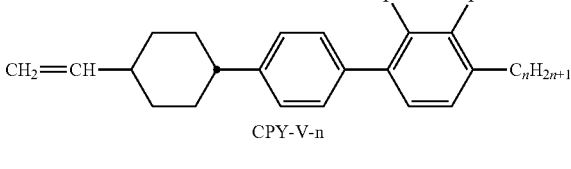
CPY-V-n TABLE D-continued
Illustrative structures
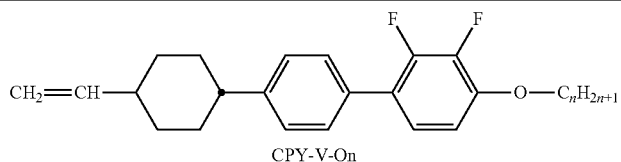
CPY-V-On
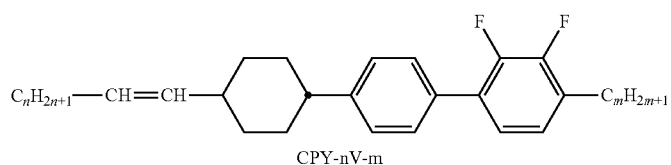
CPY-nV-m
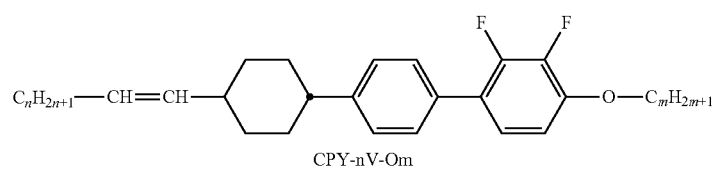
CPY-nV-Om
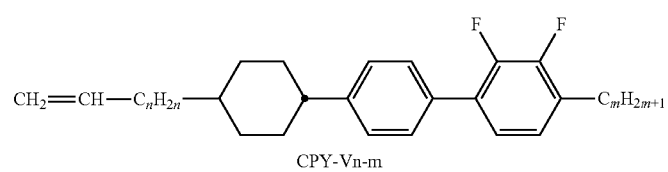
CPY-Vn-m
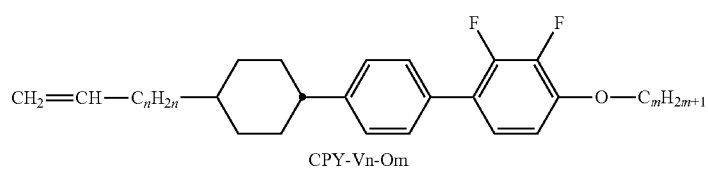
CPY-Vn-Om
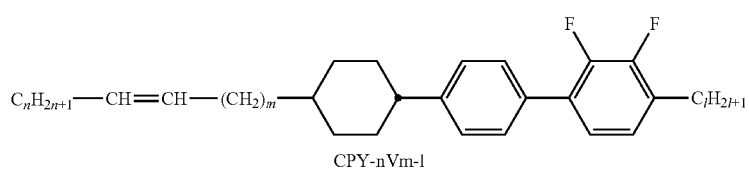
CPY-nVm-l
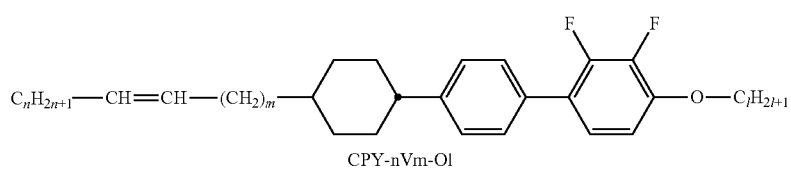
CPY-nVm-Ol
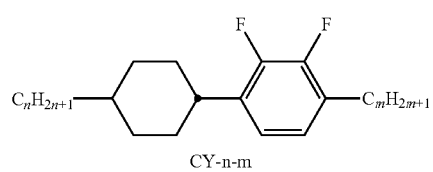
CY-n-m
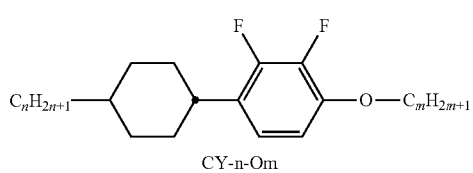
CY-n-Om TABLE D-continued
Illustrative structures
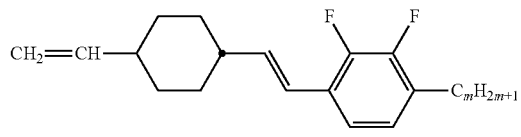
CVY-n-m
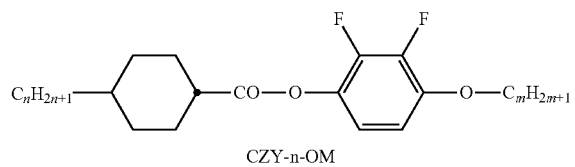
CZY-n-Om
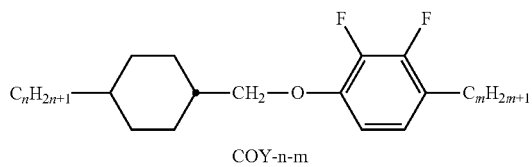
COY-n-m
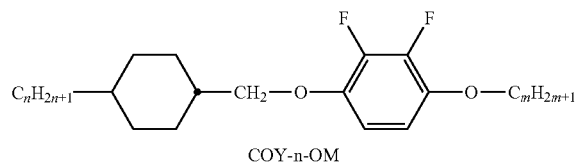
COY-n-Om
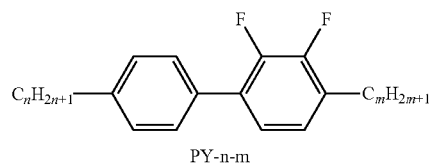
PY-n-m
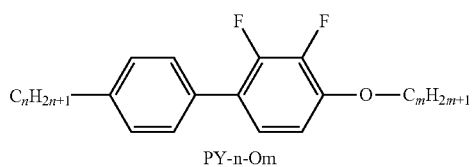
PY-n-Om
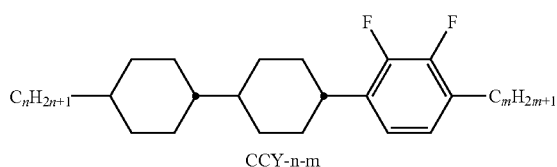
CCY-n-m
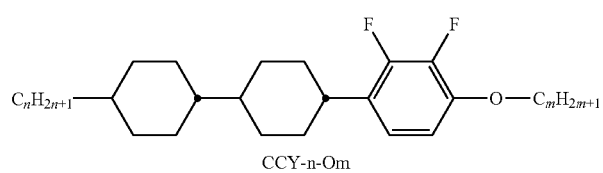
CCY-n-Om
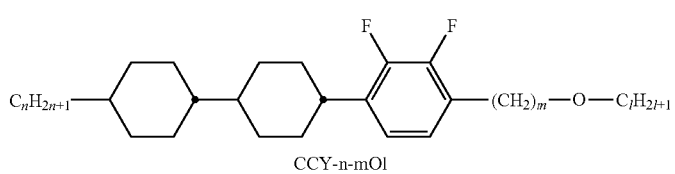
CCY-n-mOl TABLE D-continued
Illustrative structures
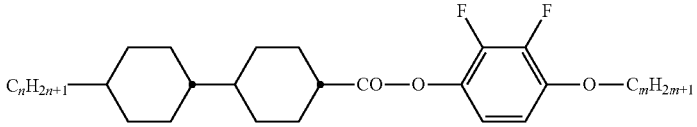
CCZY-n-Om
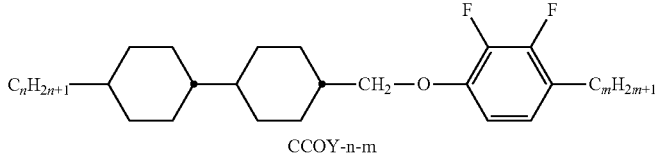
CCOY-n-m
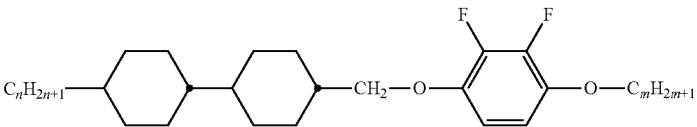
CCOY-n-Om
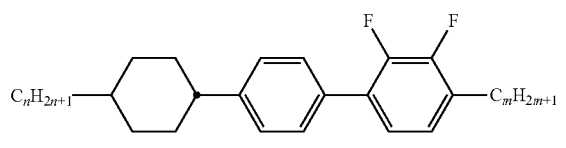
CPY-n-m
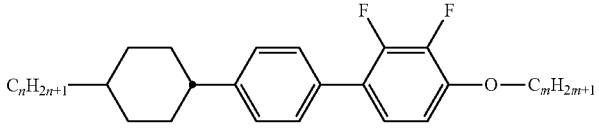
CPY-n-Om
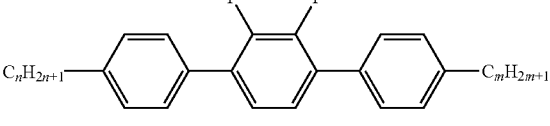
PYP-n-m
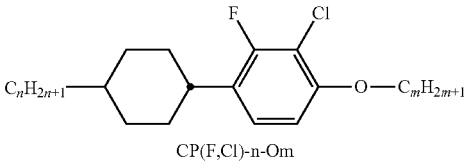
CP(F,Cl)-n-Om
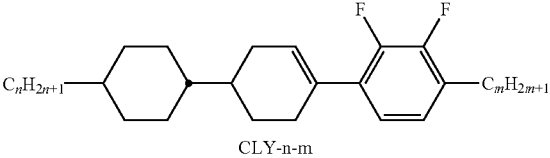
CLY-n-m
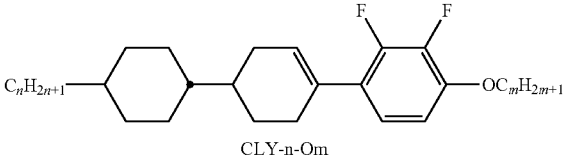
CLY-n-Om TABLE D-continued
Illustrative structures
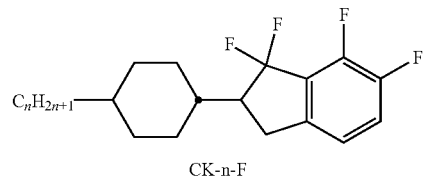
CK-n-F
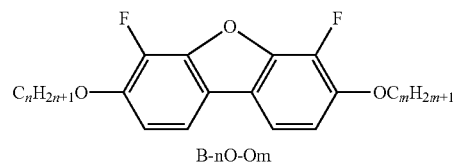
B-nO-Om
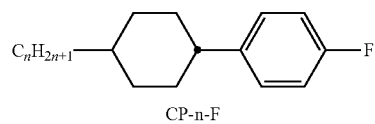
CP-n-F
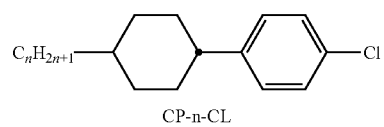
CP-n-CL
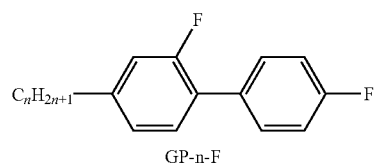
GP-n-F
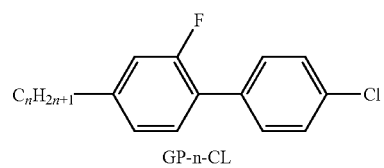
GP-n-CL
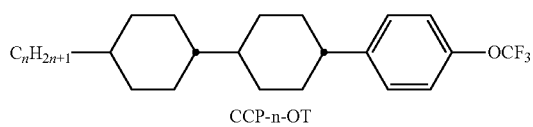
CCP-n-OT
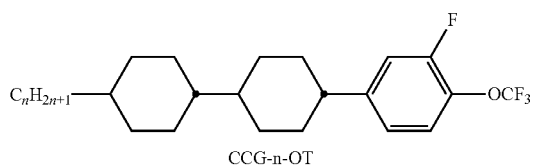
CCG-n-OT
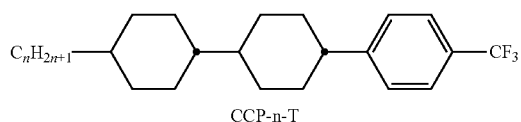
CCP-n-T TABLE D-continued
Illustrative structures
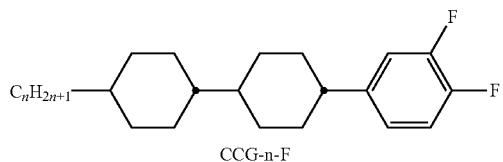
CCG-n-F
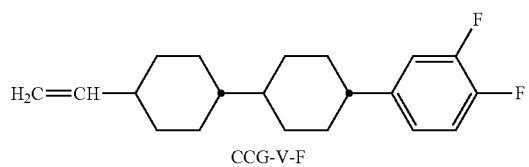
CCG-V-F
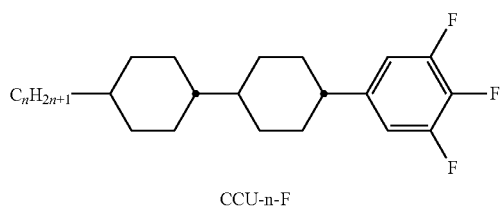
CCU-n-F
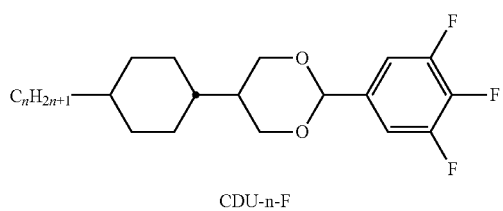
CDU-n-F
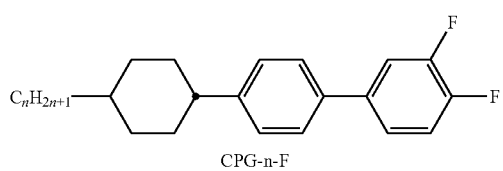
CPG-n-F
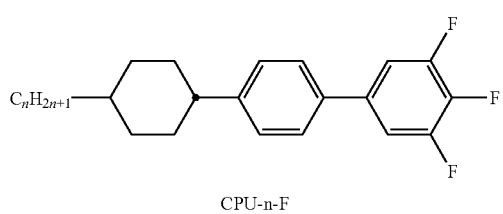
CPU-n-F
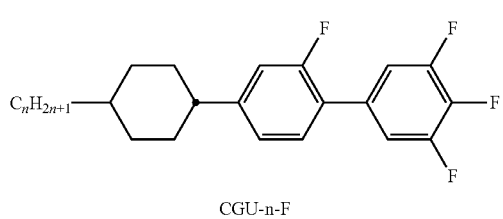
CGU-n-F
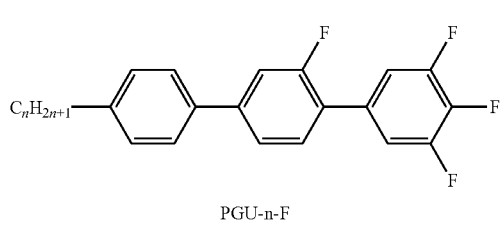
PGU-n-F TABLE D-continued
Illustrative structures
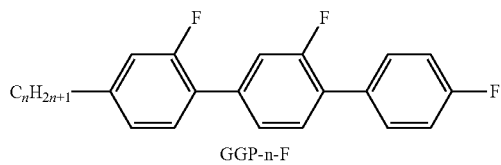
GGP-n-F
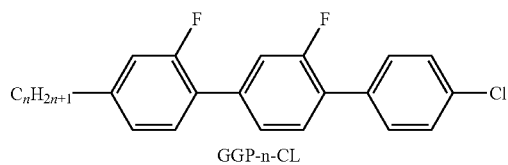
GGP-n-CL
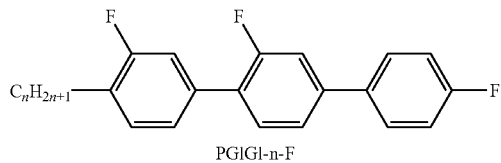
PGlGl-n-F
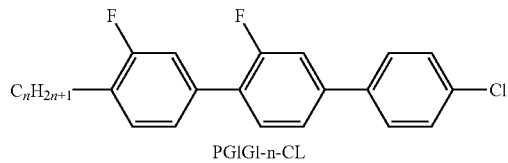
PGlGl-n-CL
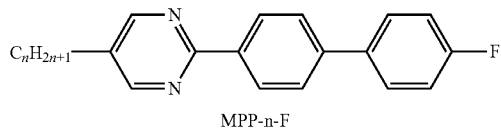
MPP-n-F
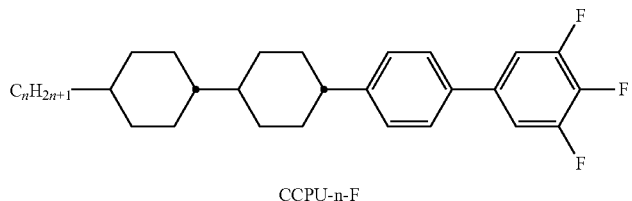
CCPU-n-F
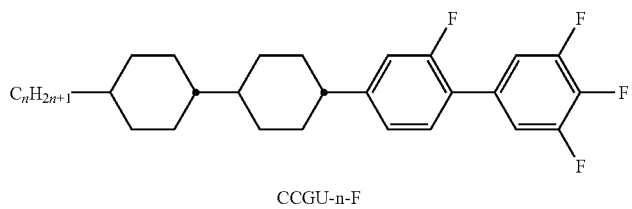
CCGU-n-F
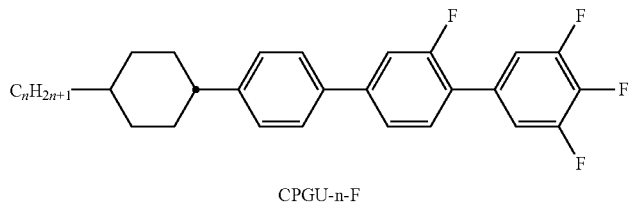
CPGU-n-F TABLE D-continued
Illustrative structures
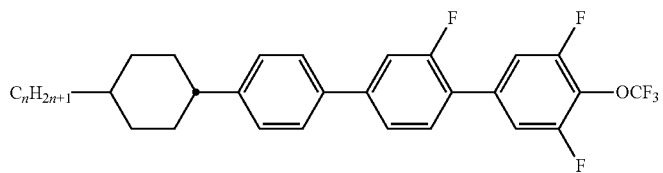
CPGU-n-OT
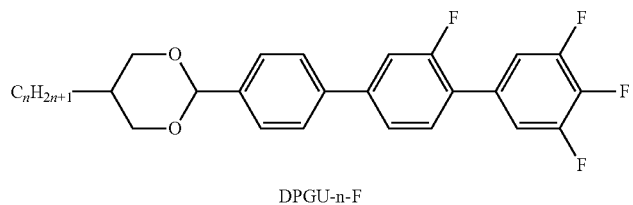
DPGU-n-F
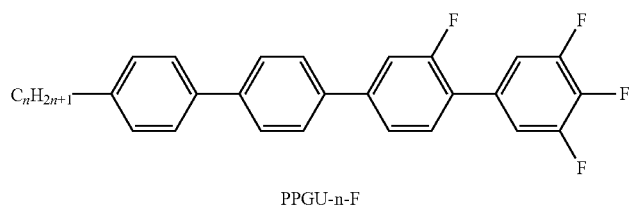
PPGU-n-F
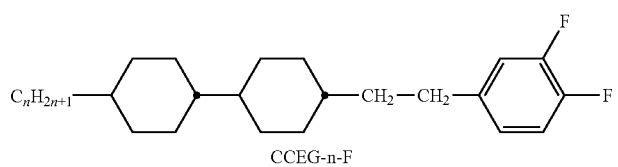
CCEG-n-F
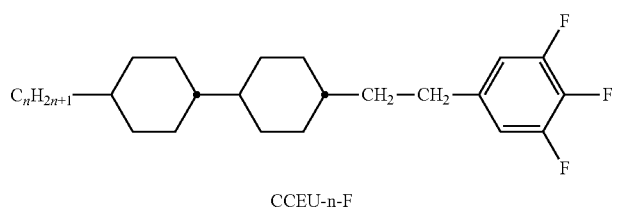
CCEU-n-F
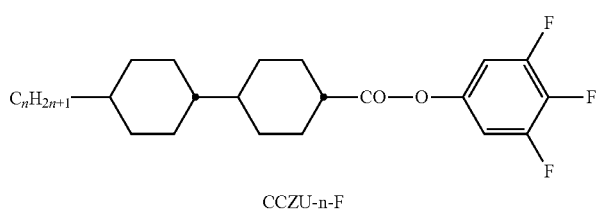
CCZU-n-F
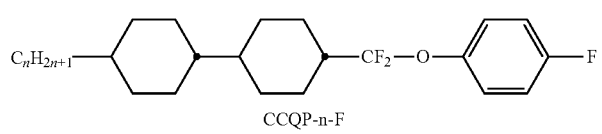
CCQP-n-F
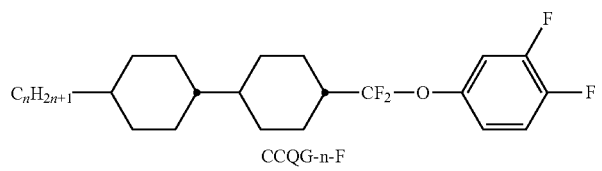
CCQG-n-F TABLE D-continued
Illustrative structures
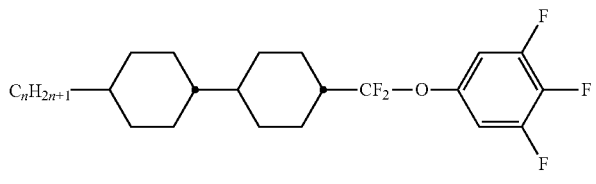
CCQU-n-F
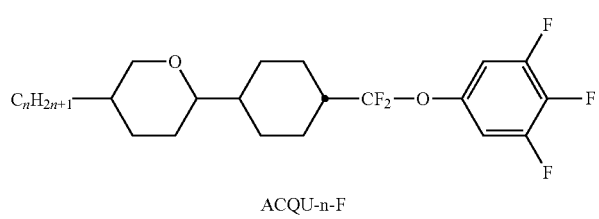
ACQU-n-F
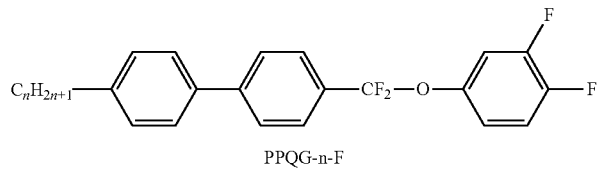
PPQG-n-F
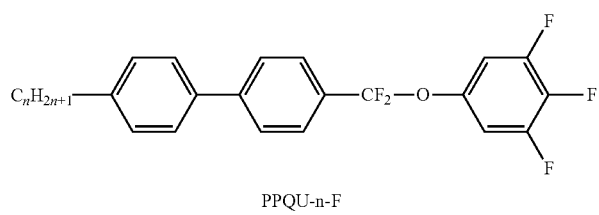
PPQU-n-F
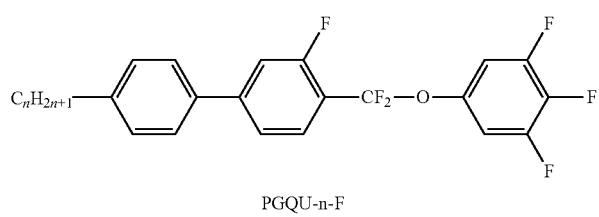
PGQU-n-F
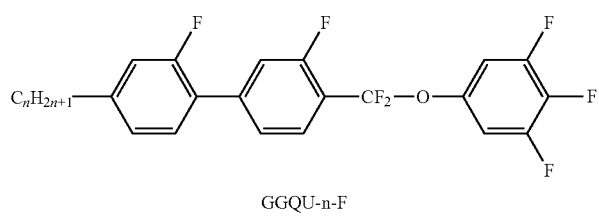
GGQU-n-F
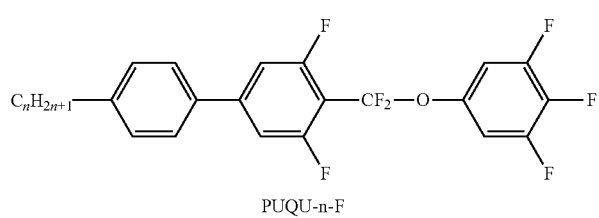
PUQU-n-F TABLE D-continued
Illustrative structures
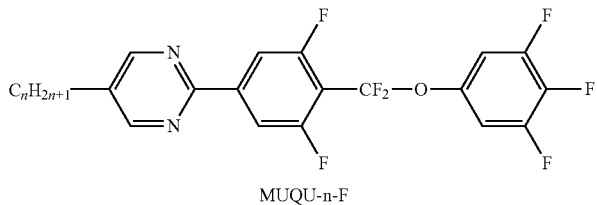
MUQU-n-F
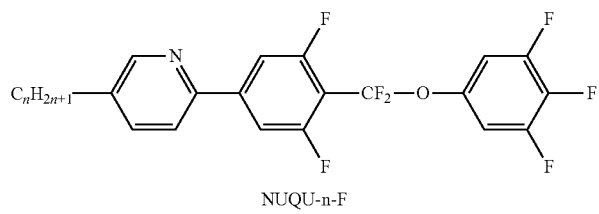
NUQU-n-F
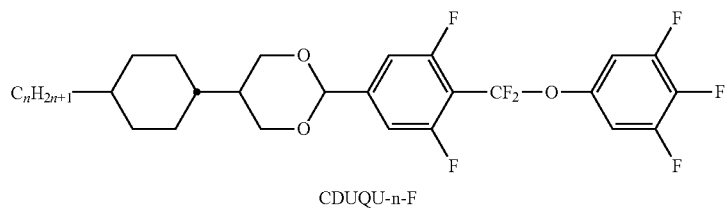
CDUQU-n-F
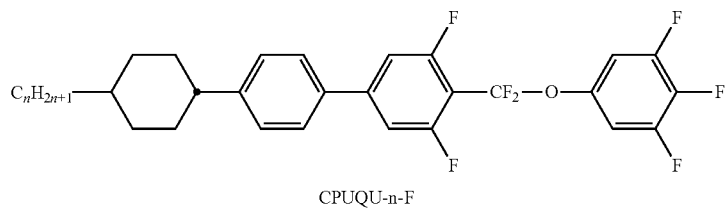
CPUQU-n-F
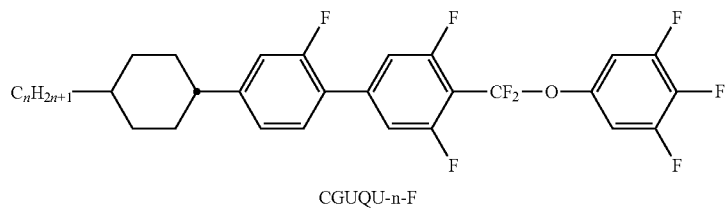
CGUQU-n-F
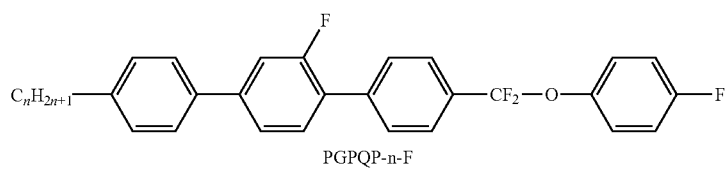
PGPQP-n-F
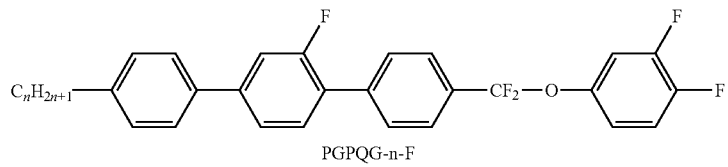
PGPQG-n-F TABLE D-continued
Illustrative structures
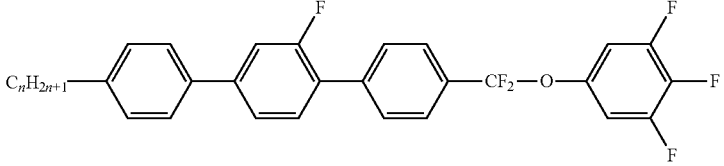
PGPQU-n-F
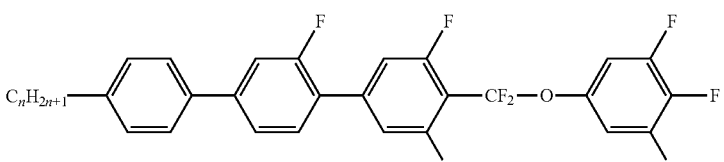
PGUQU-n-F
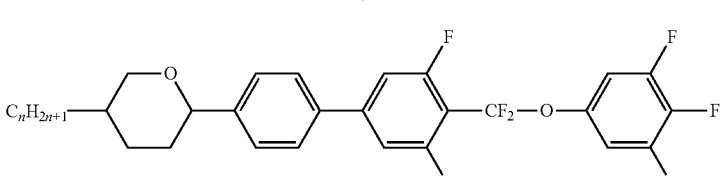
APUQU-n-F
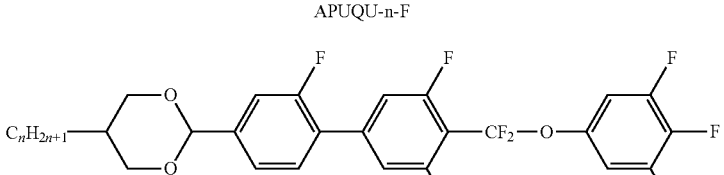
DGUQU-n-F
In a preferred embodiment of the present invention, the LC media according to the invention, especially those with negative dielectric anisotropy, comprise one or more compounds selected from the group consisting of compounds from Table D.
TABLE E
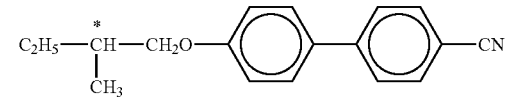
C 15
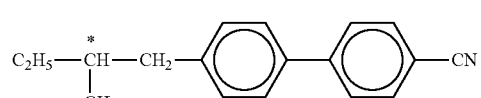
CB 15
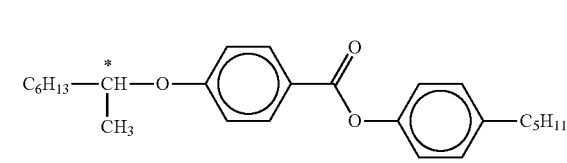
CM 21

TABLE E-continued
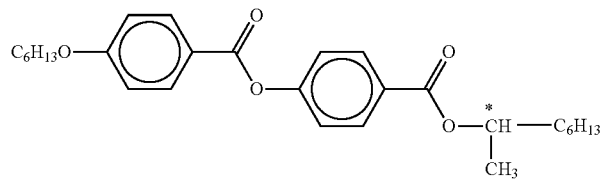
R/S-811
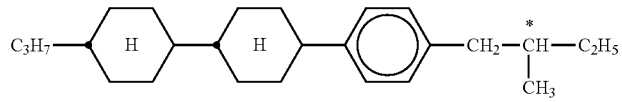
CM 44
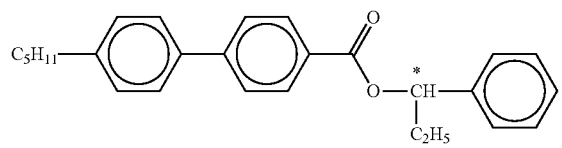
CM 45
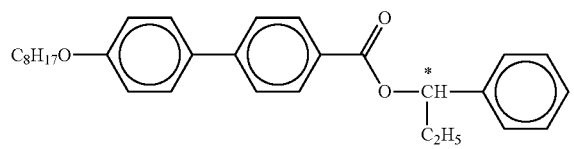
CM 47
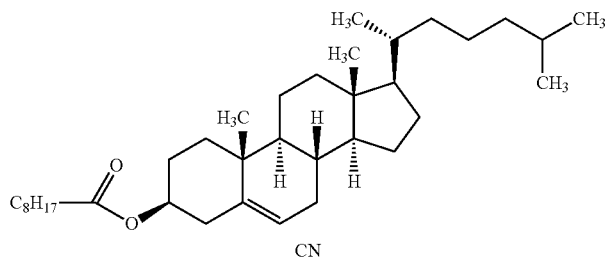
CN
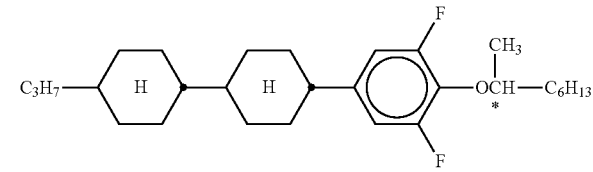
R/S-2011
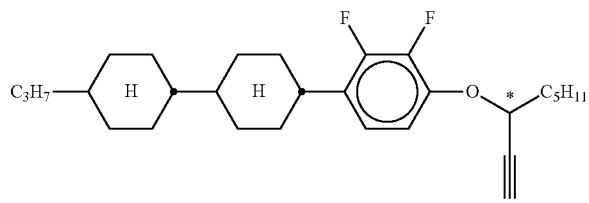
R/S-3011

TABLE E-continued

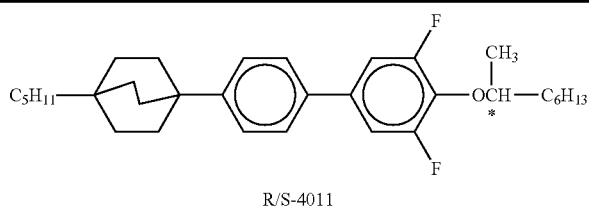
R/S-4011

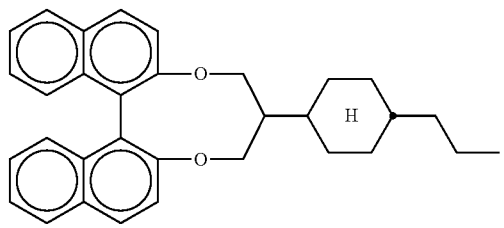
R/S-5011

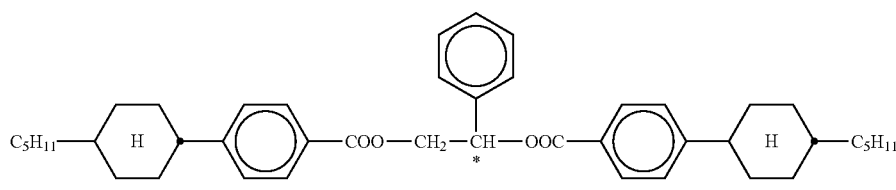
R/S-1011

Table E shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE F

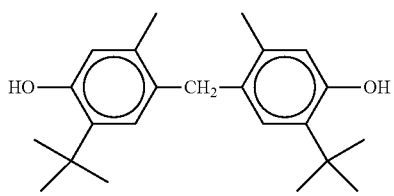

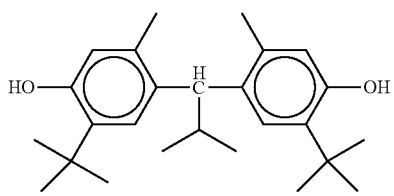

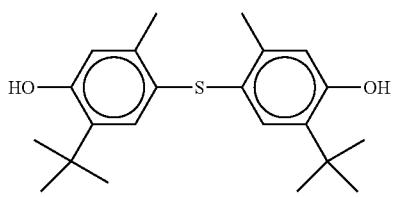

TABLE F-continued
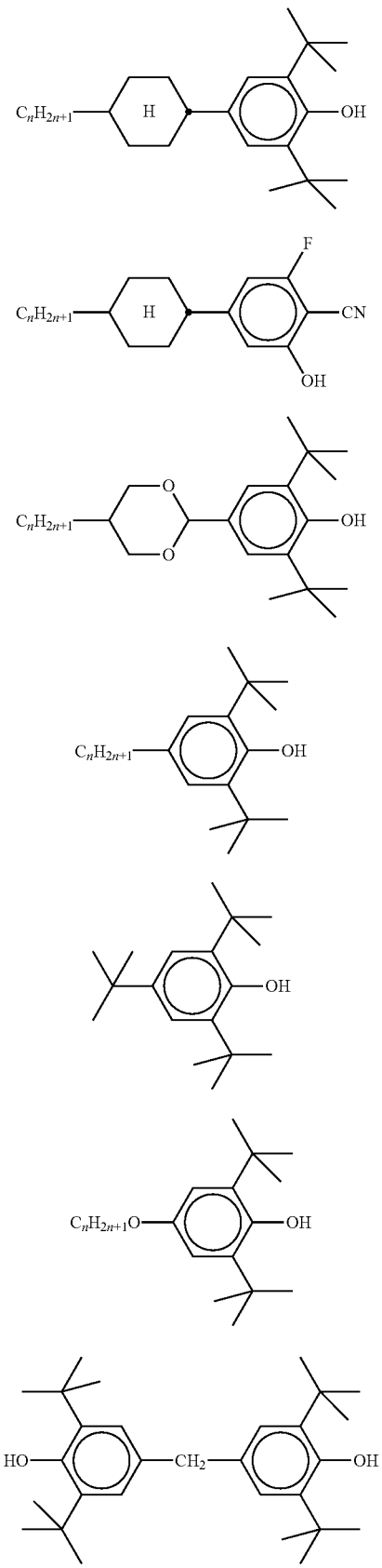

TABLE F-continued
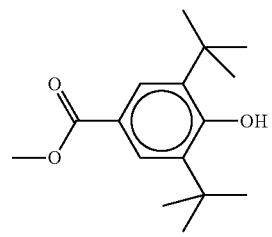
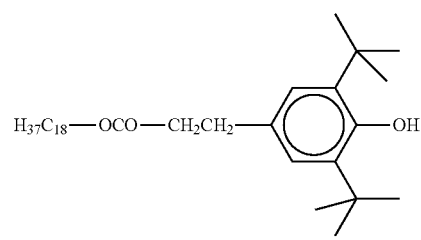
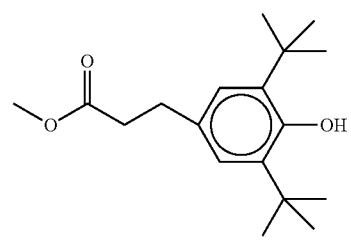
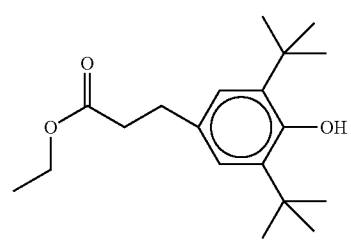
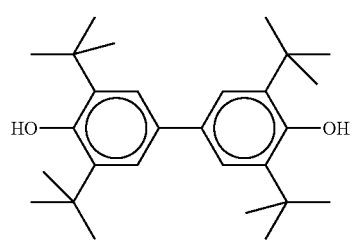

TABLE F-continued
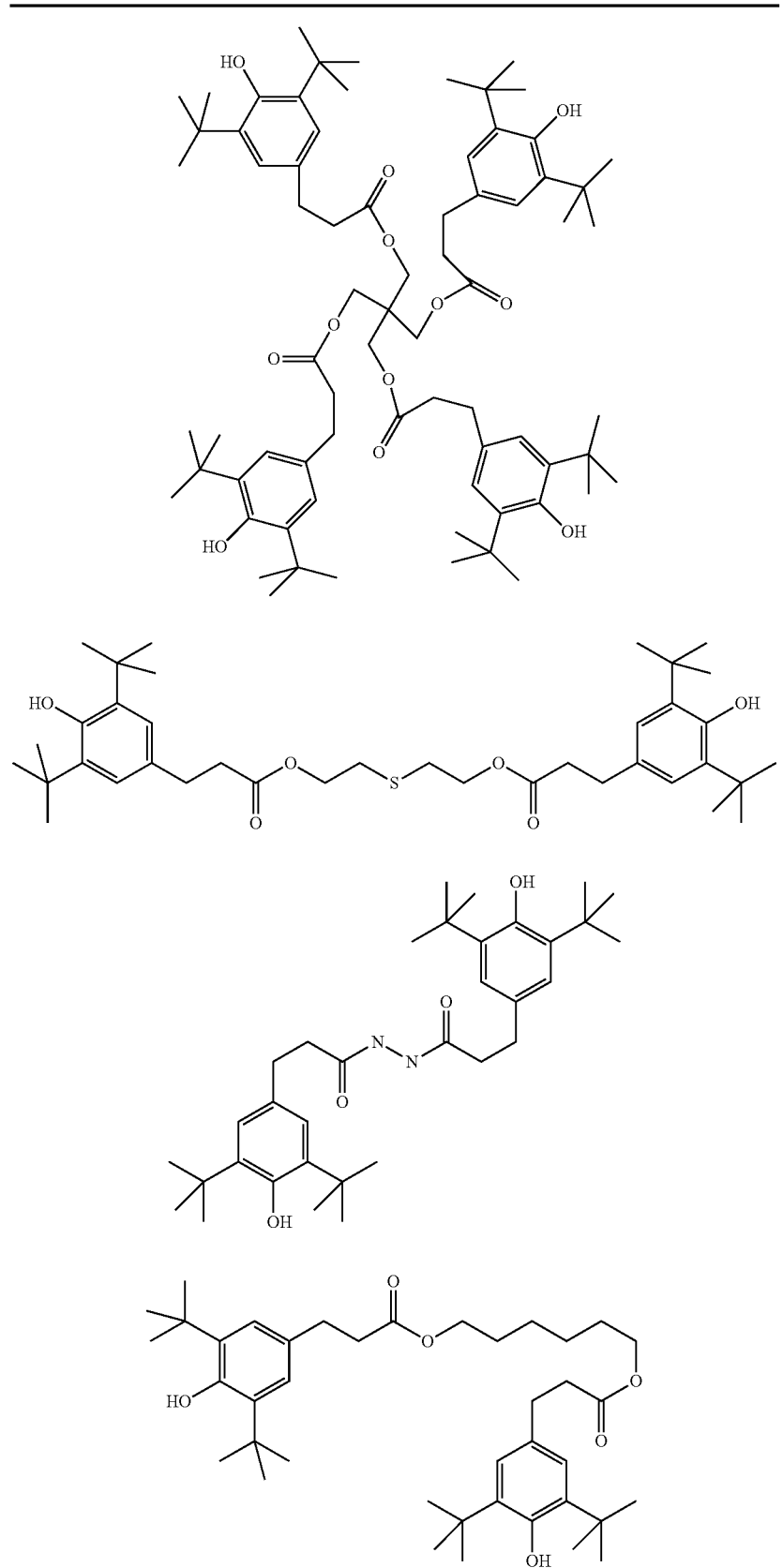

TABLE F-continued
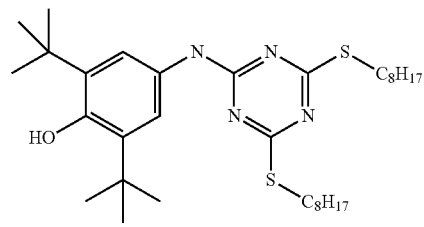
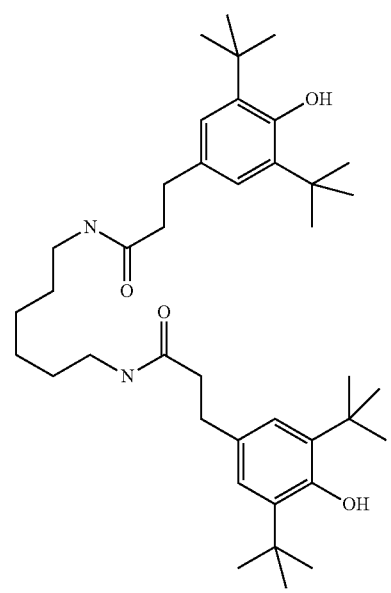 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
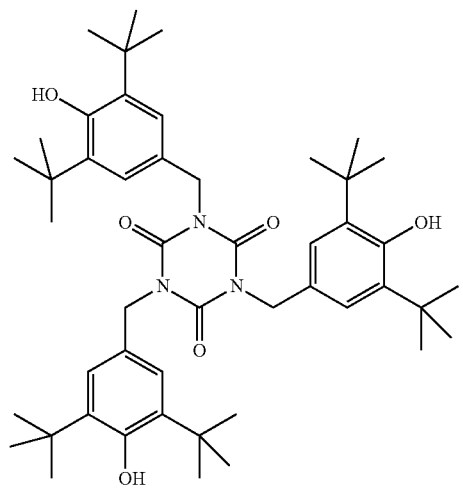 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]

TABLE F-continued
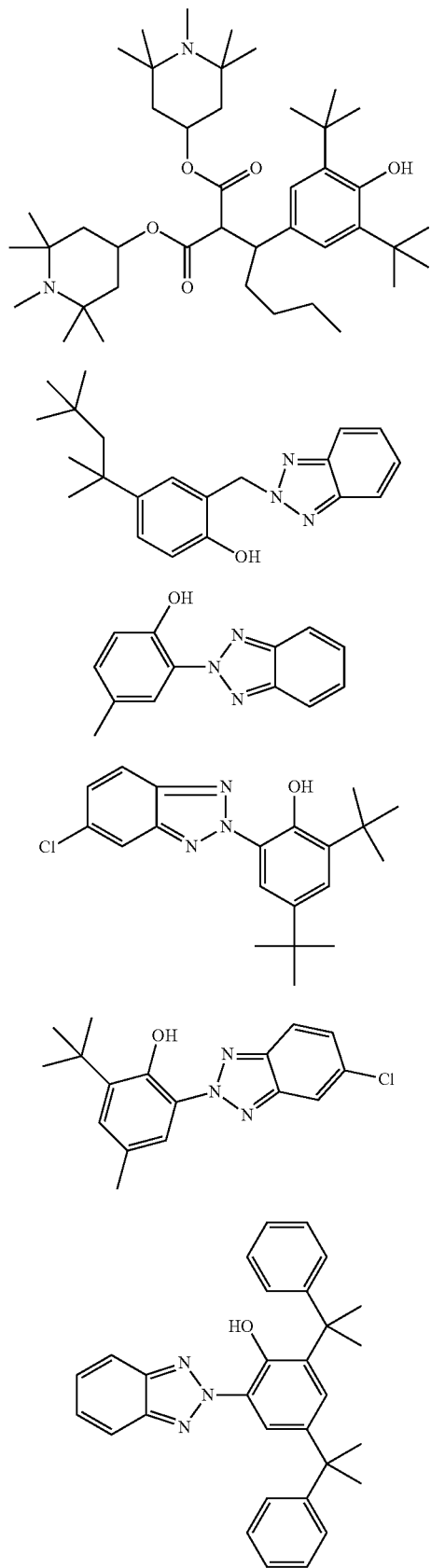

TABLE F-continued
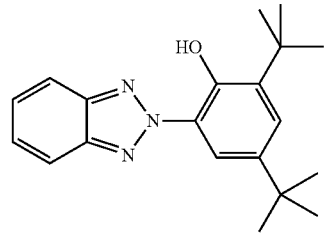 [SMILES: CC(C)(C)c1cc(-n2nc3ccccc3n2)c(O)c(C(C)(C)C)c1]
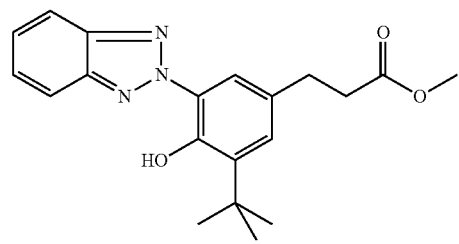 [SMILES: COC(=O)CCc1cc(-n2nc3ccccc3n2)c(O)c(C(C)(C)C)c1]
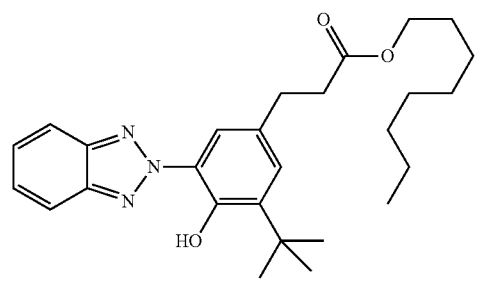 [SMILES: CCCCCCCCOC(=O)CCc1cc(-n2nc3ccccc3n2)c(O)c(C(C)(C)C)c1]
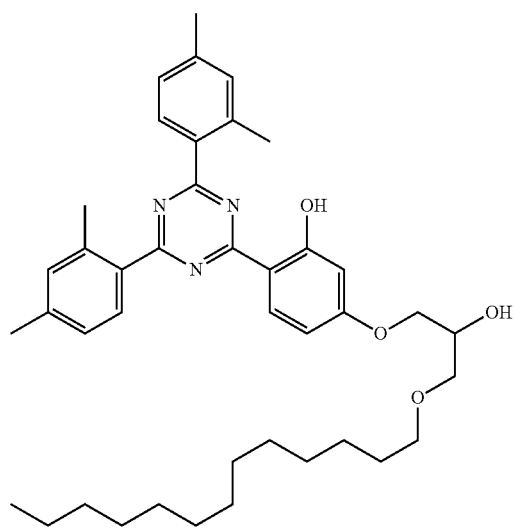 [SMILES: CCCCCCCCCCCCCOCC(O)COc1ccc(-c2nc(-c3ccc(C)cc3C)nc(-c3ccc(C)cc3C)n2)c(O)c1]

TABLE F-continued
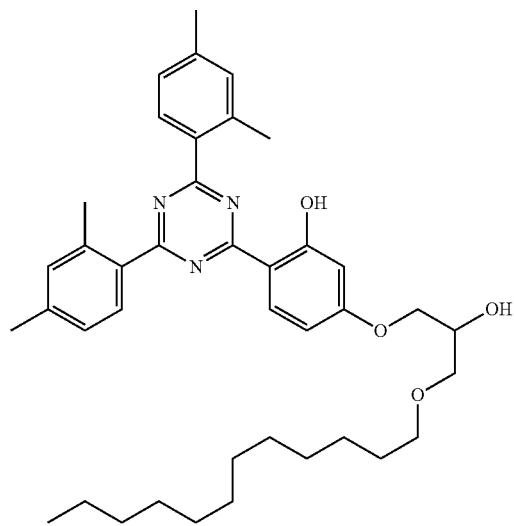 [SMILES: CCCCCCCCCCCCOCC(O)COc1ccc(-c2nc(-c3ccc(C)cc3C)nc(-c3ccc(C)cc3C)n2)c(O)c1]
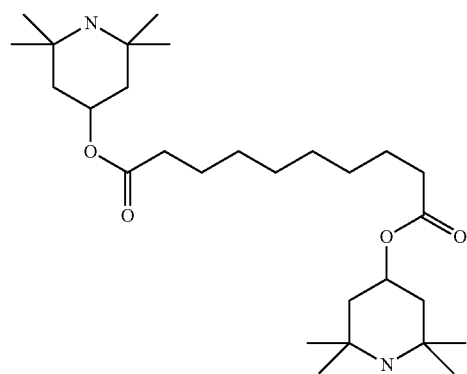
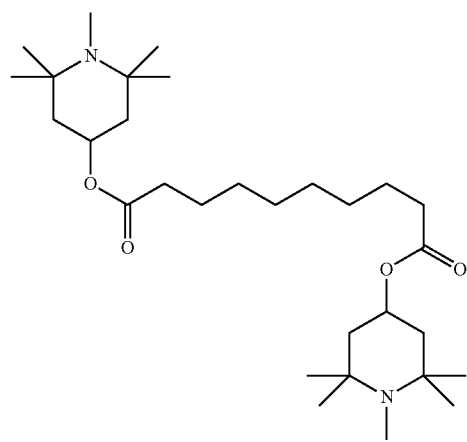

TABLE F-continued
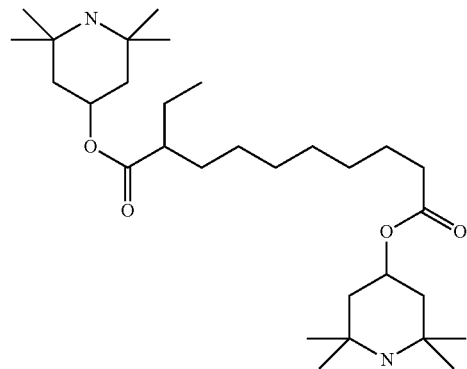
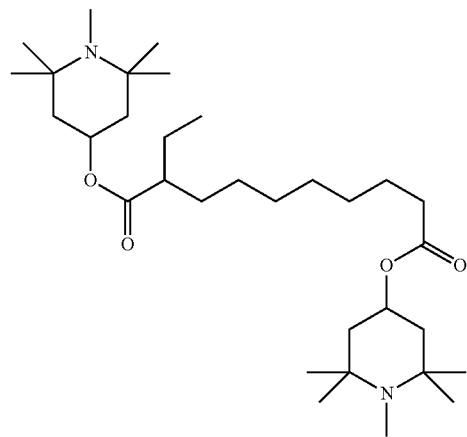
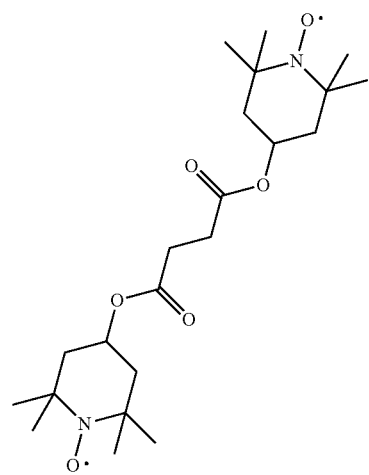

TABLE F-continued
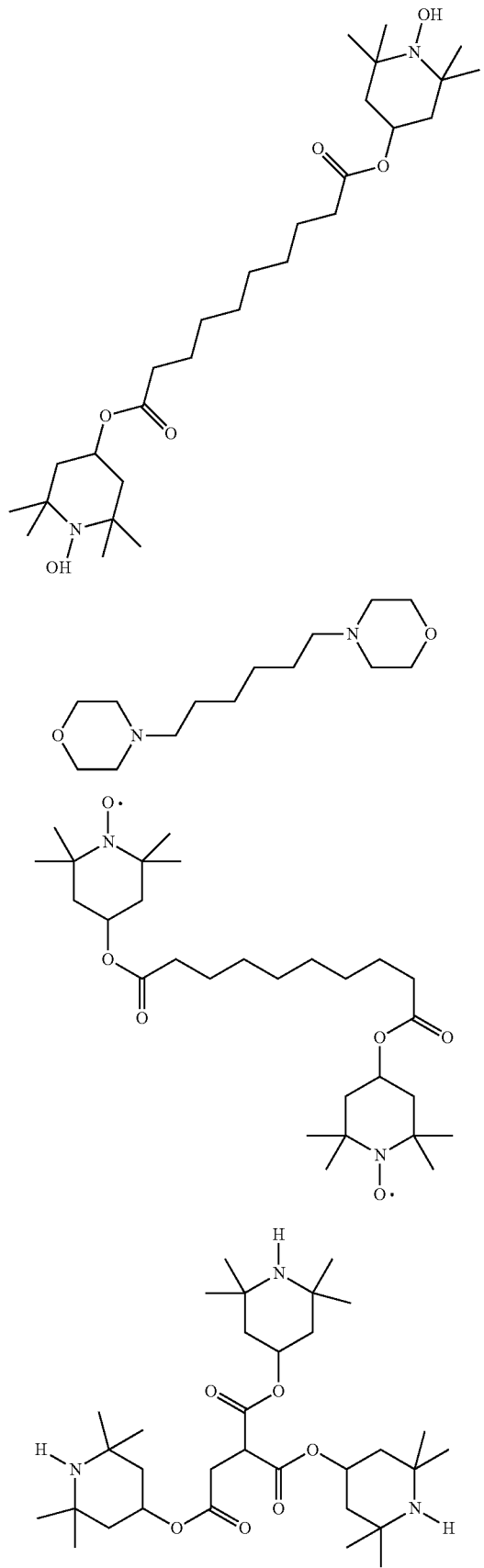

TABLE F-continued
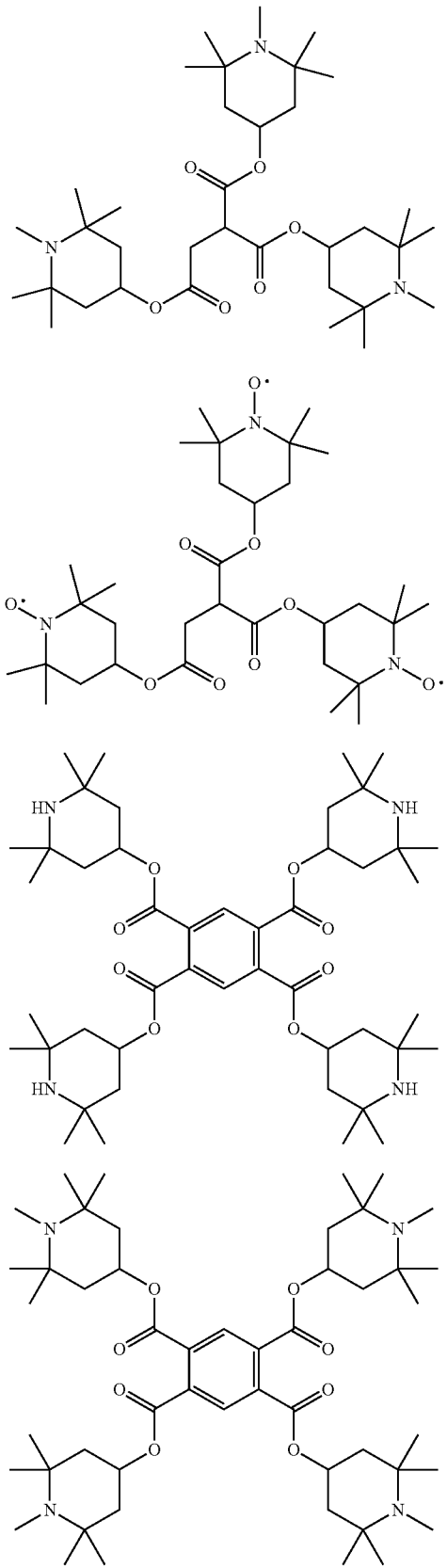

TABLE F-continued

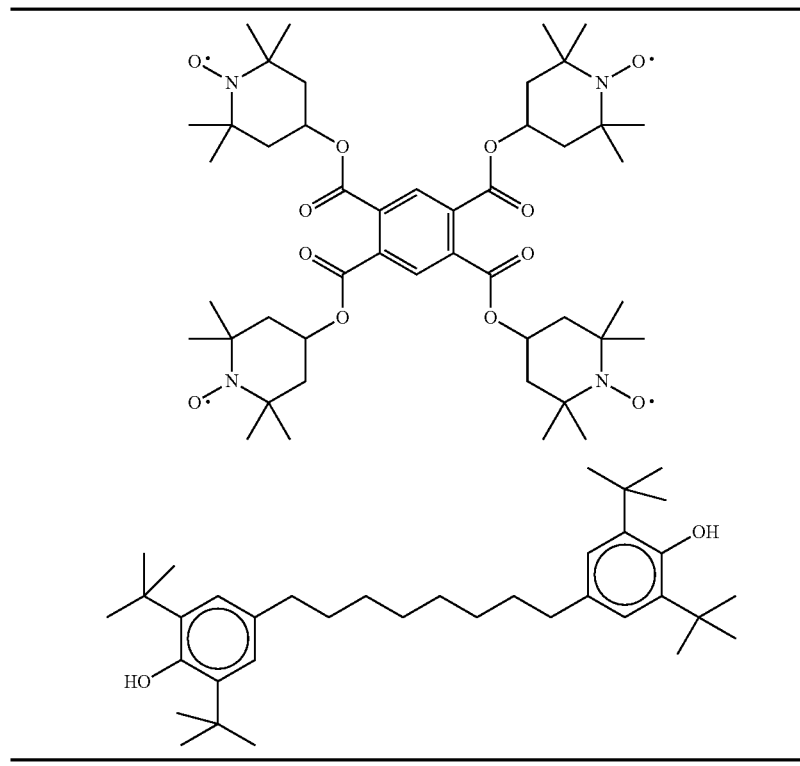

Table F shows possible stabilisers which can be added to the LC media according to the invention. Therein n denotes an integer from 1 to 12, preferably 1, 2, 3, 4, 5, 6, 7 or 8, and terminal methyl groups are not shown.

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table F.

TABLE G

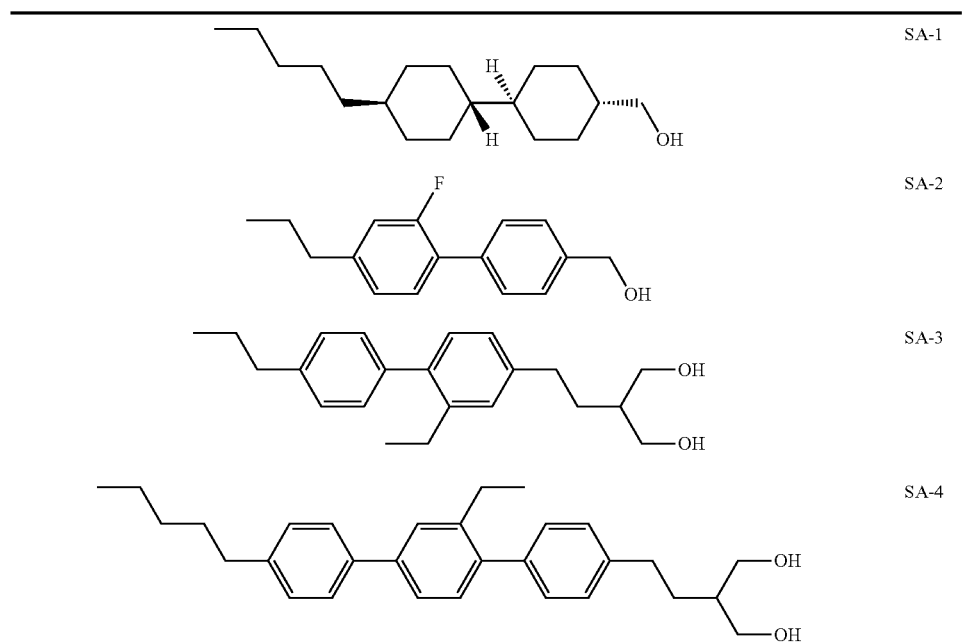

TABLE G-continued

| | |
|---|---|
| (structure) | SA-5 |
| (structure) | SA-6 |
| (structure) | SA-7 |
| (structure) | SA-8 |
| (structure) | SA-9 |
| (structure) | SA-10 |
| (structure) | SA-11 |

TABLE G-continued
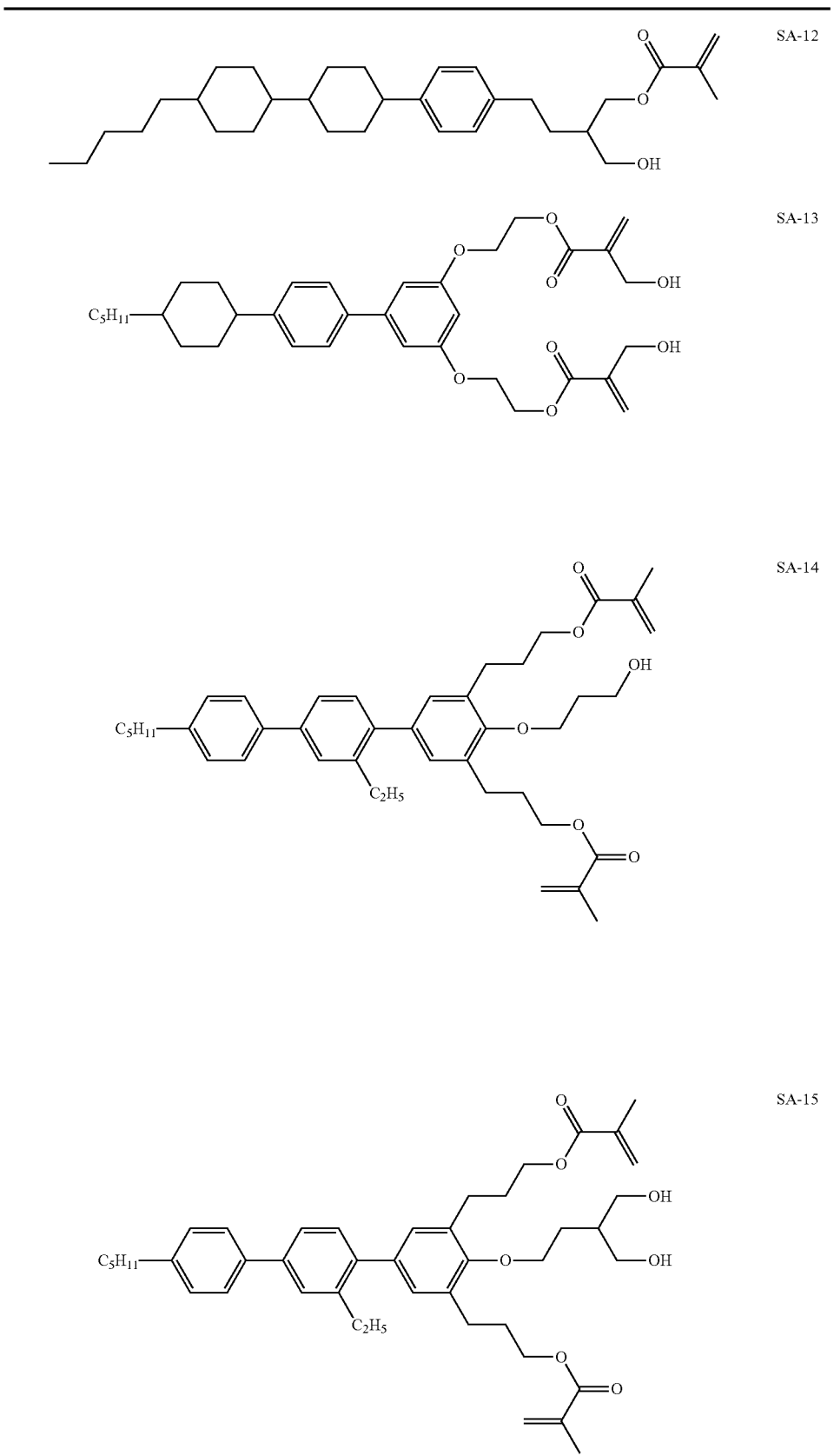

TABLE G-continued
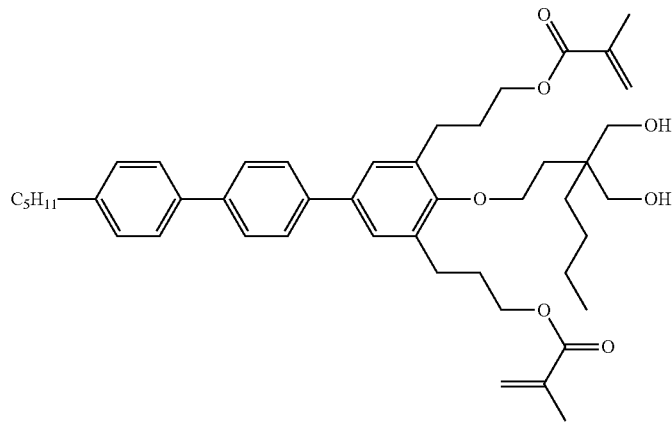
SA-16
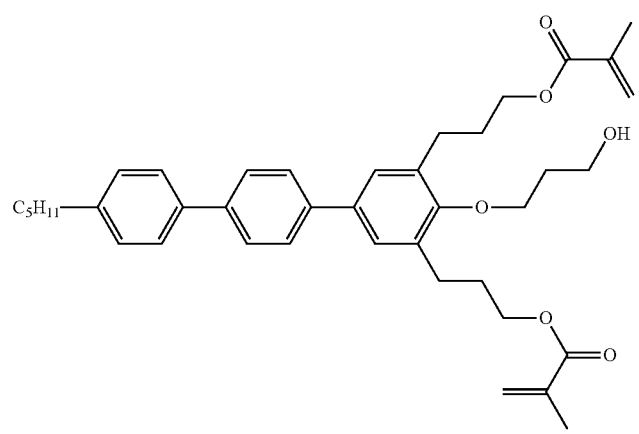
SA-17
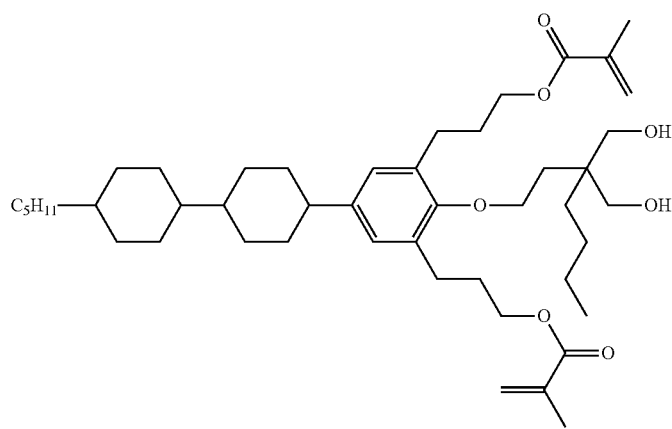
SA-18

TABLE G-continued
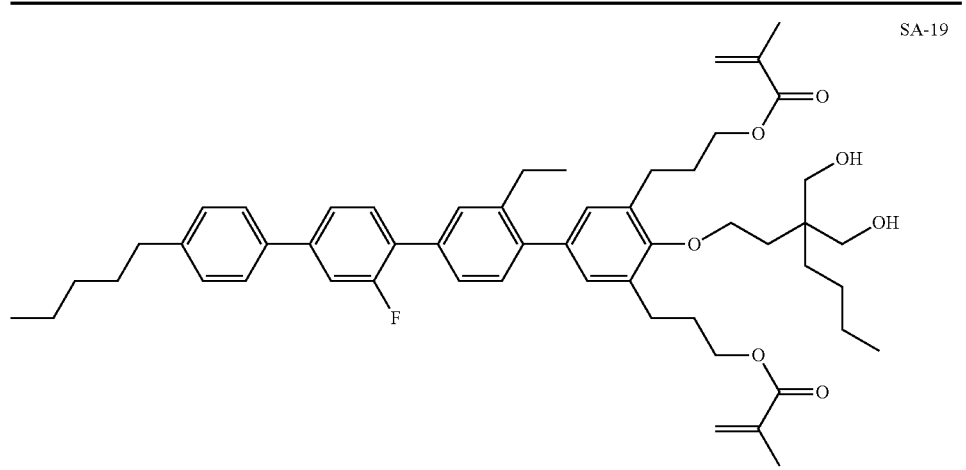
SA-19
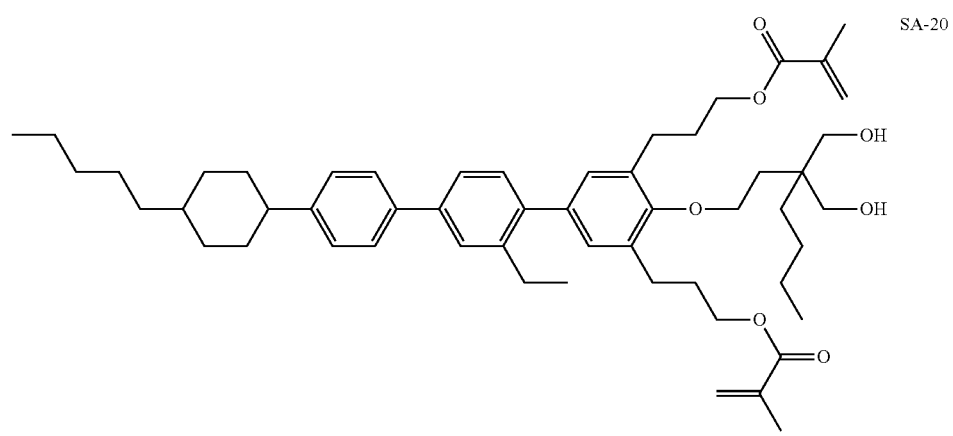
SA-20
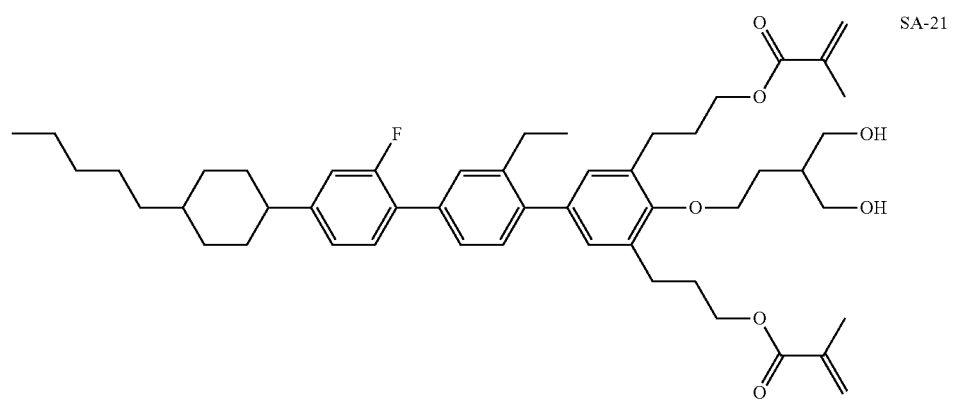
SA-21

TABLE G-continued
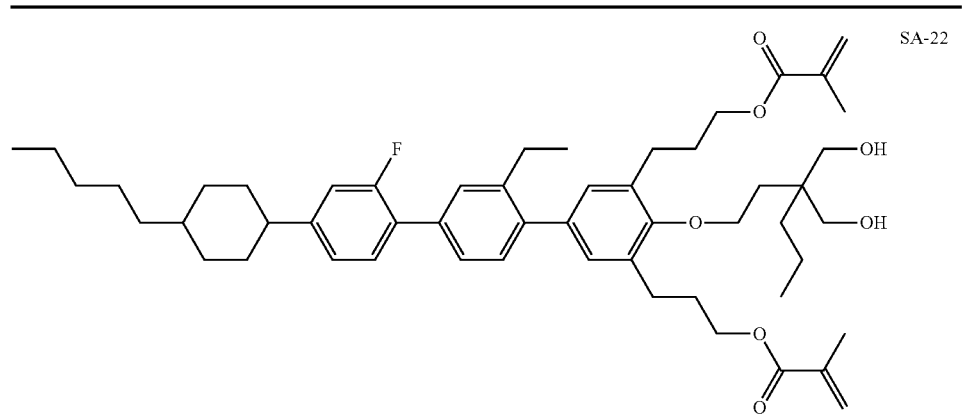
SA-22
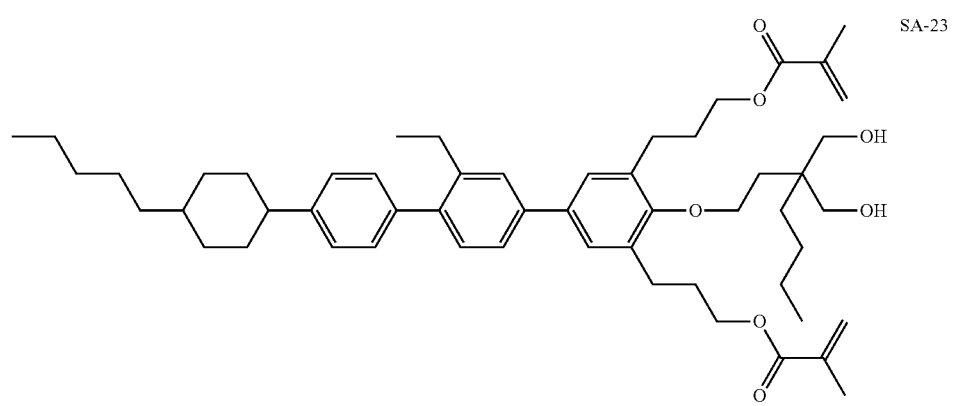
SA-23
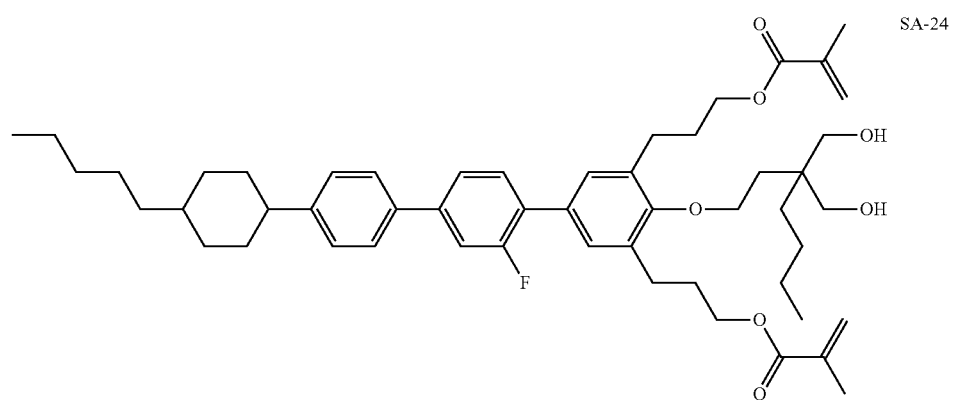
SA-24

TABLE G-continued
SA-25
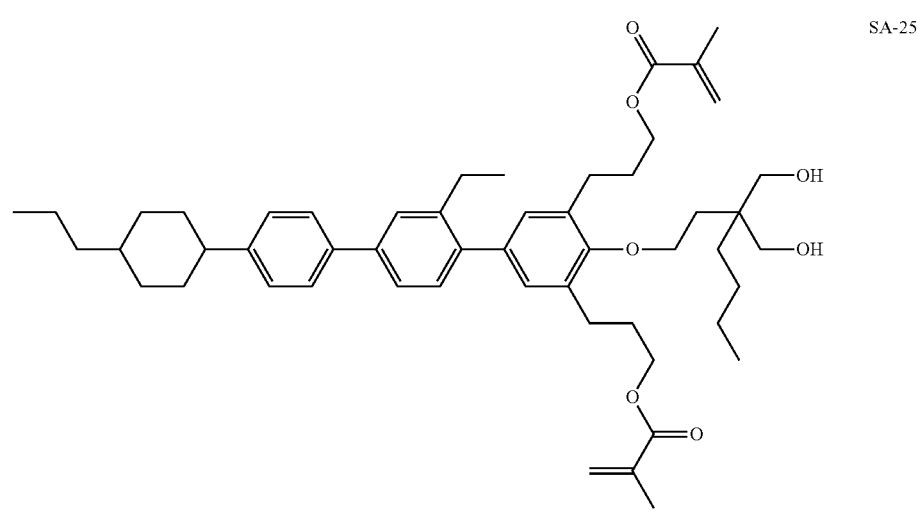
SA-26
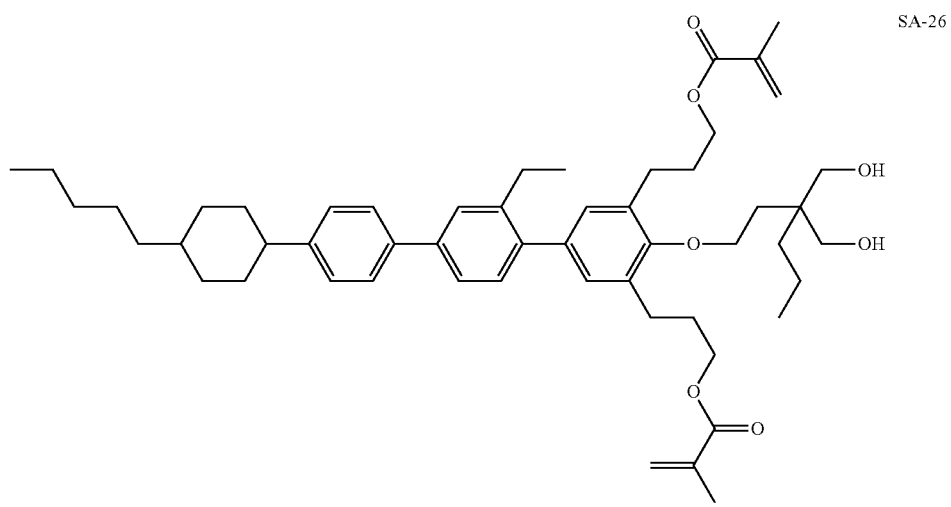
SA-27
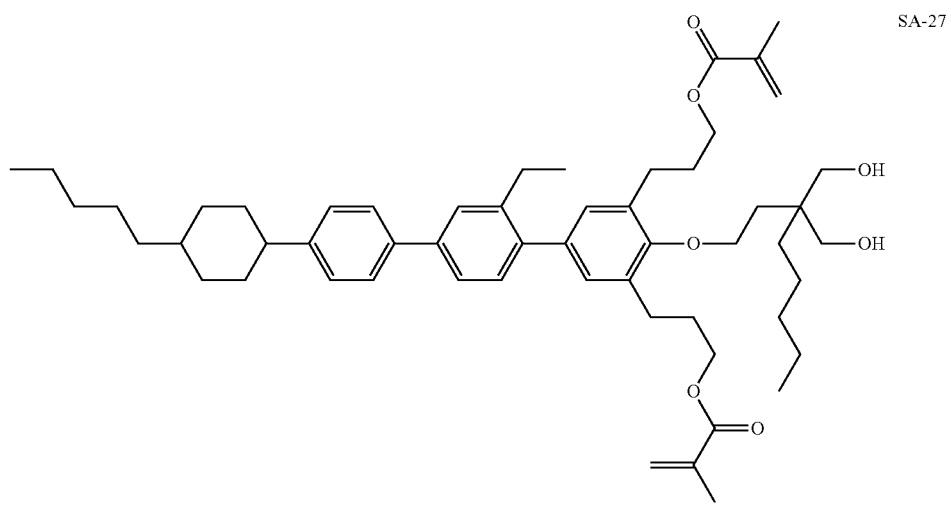

TABLE G-continued
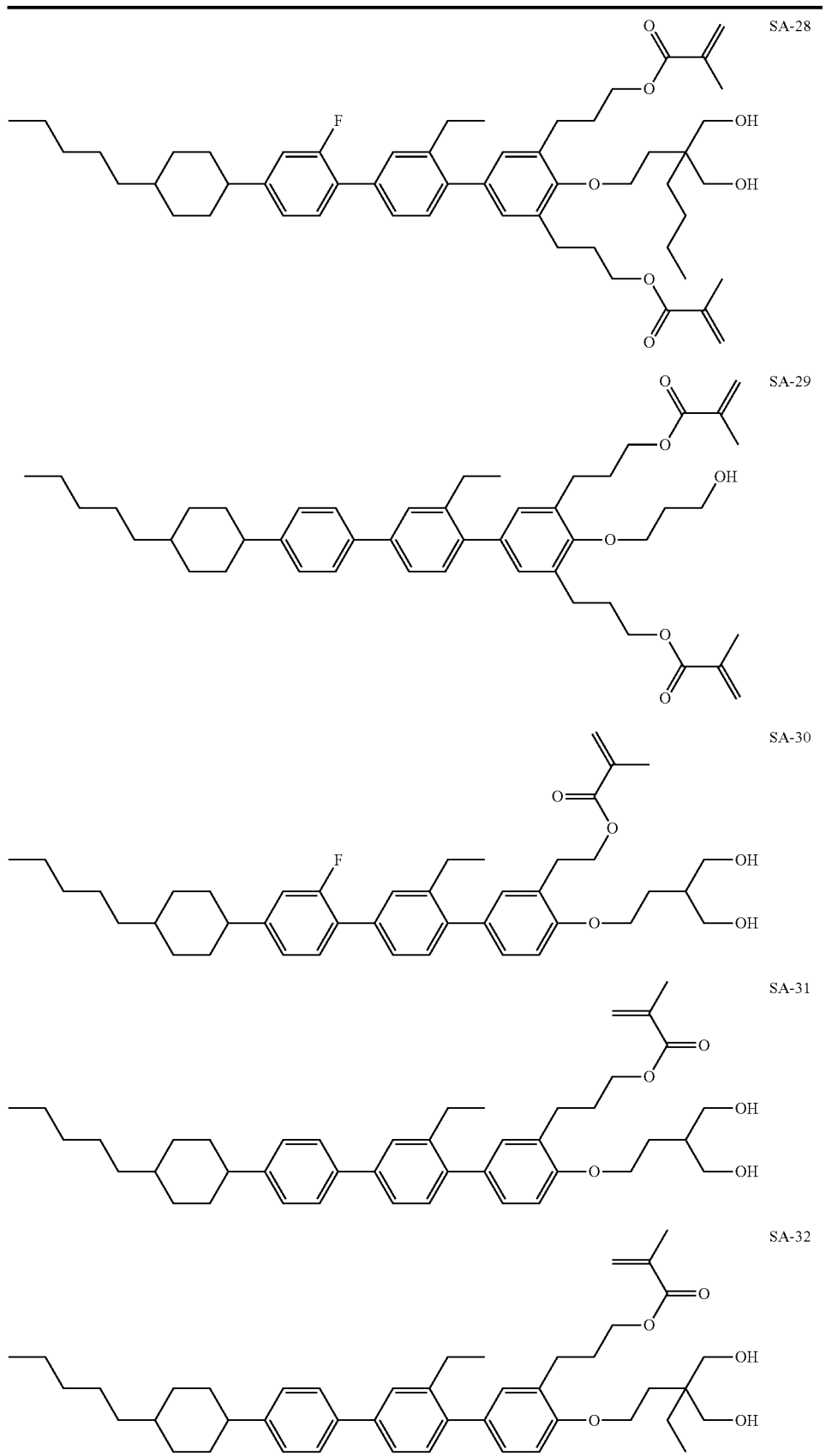

TABLE G-continued

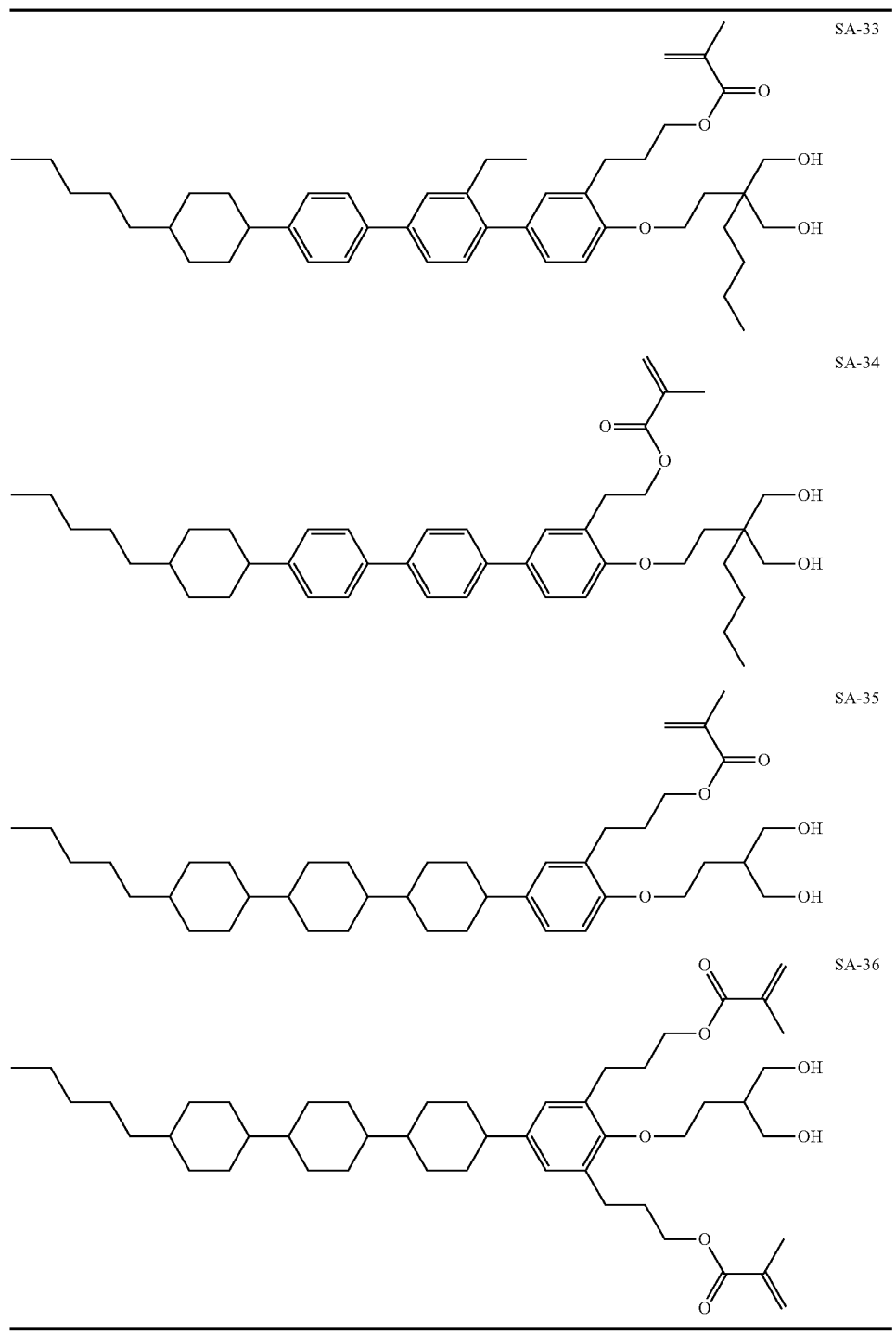

Table G shows self-alignment additives for vertical alignment which can be used in LC media according to the present invention together with the polymerizable compounds of formula I:

In a preferred embodiment, the LC media and displays according to the present invention comprise one or more SA additives selected from formulae SA-1 to SA-34, preferably from formulae SA-14 to SA-34, very preferably from formulae SA-20 to SA-28, most preferably of formula SA-20, in combination with one or more RMs of formula I. Very preferred is a combination of polymerizable compound 1, 2 or 3 of Example 1 below, very preferably of polymerizable compound 3 of Example 1, with an SA additive of formula SA-20 to SA-28, very preferably of formula SA-20.

EXAMPLES

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

In addition, the following abbreviations and symbols are used:
$V_0$ threshold voltage, capacitive [V] at 20° C.,
$n_e$ extraordinary refractive index at 2030 and 589 nm,
$n_o$ extraordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon\|$ dielectric permittivity parallel to the director at 20° C. and 1 kHz,
$\Delta\varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta\varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display used for measurement of the capacitive threshold voltage consists of two plane-parallel glass outer plates at a separation of 25 µm, each of which has on the inside an electrode layer and an unrubbed polyimide alignment layer on top, which effect a homeotropic edge alignment of the liquid crystal molecules.

The display or test cell used for measurement of the tilt angles consists of two plane-parallel glass outer plates at a separation of 4 µm, each of which has on the inside an electrode layer and a polyimide alignment layer on top, where the two polyimide layers are rubbed antiparallel to one another and effect a homeotropic edge alignment of the liquid crystal molecules.

The polymerisable compounds are polymerised in the display or test cell by irradiation with UV light of defined intensity for a prespecified time, with a voltage simultaneously being applied to the display (usually 10 V to 30 V alternating current, 1 kHz). In the examples, unless indicated otherwise, a metal halide lamp and an intensity of 100 mW/cm² is used for polymerisation. The intensity is measured using a standard meter (Hoenle UV-meter high end with UV sensor).

The tilt angle is determined using the Mueller Matrix Polarimeter "AxoScan" from Axometrics. A low value (i.e. a large deviation from the 90° angle) corresponds to a large tilt here.

Unless stated otherwise, the term "tilt angle" means the angle between the LC director and the substrate, and "LC director" means in a layer of LC molecules with uniform orientation the preferred orientation direction of the optical main axis of the LC molecules, which corresponds, in case of calamitic, uniaxially positive birefringent LC molecules, to their molecular long axis.

Example 1: Polymerisable Compounds

Polymerisable compound (or "RM") RM-1 is prepared as follows

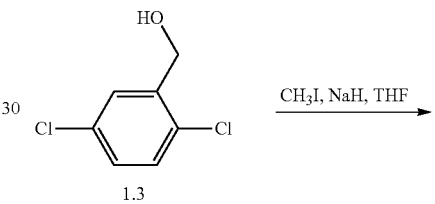

1.4: A suspension of sodium hydride (5.4 g, 60% in mineral oil, 135.6 mmol) was added to a stirred solution of benzyl alcohol 1.3 (20.0 g, 113.0 mmol) in THF (20 mL) at 0° C. The resulting mixture was stirred for 10 min at the same temperature before it was treated with methyl iodide (8.7 mL, 135.6 mmol). The reaction mixture was stirred for 4 hours at ambient temperature, carefully quenched with water and extracted with ethyl acetate. Aqueous phase was separated and extracted with ethyl acetate (2 times). The combined organic phase was washed with sat. NaCl solution, dried over $Na_2SO_4$, filtered and concentrated in vacuo. The residue was purified with flash chromatography (heptane) to give 1.4 as a colorless oil. (21.0 g, 97%; GC: 99.9%).

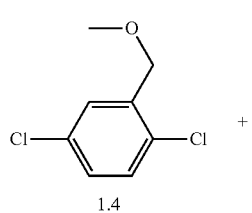 +

-continued

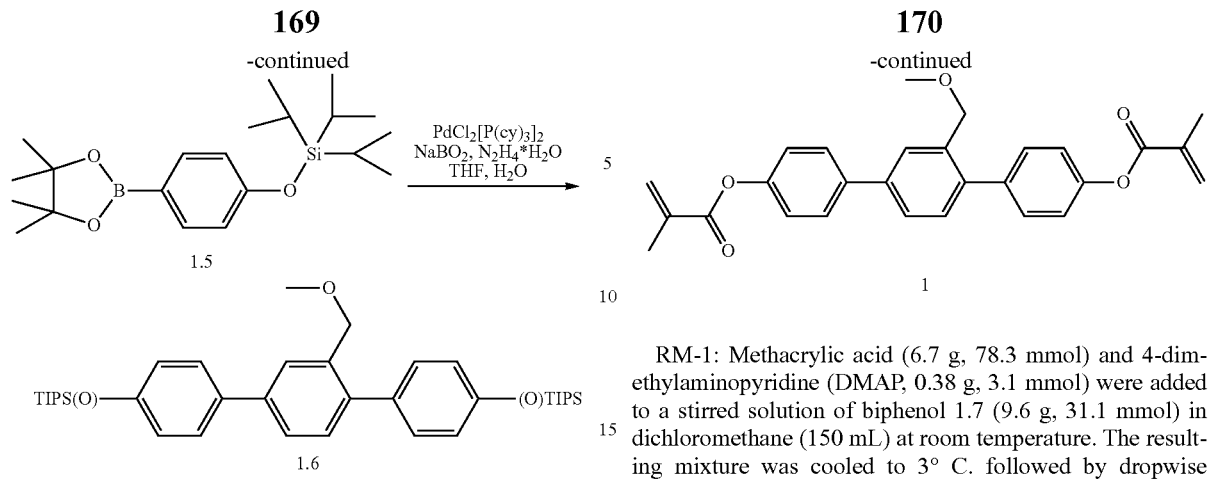

1.6: Hydrazine hydrate (0.2 mL, 80%, 0.004 mol) was added to a stirred solution of sodium metaborate tetrahydrate (43.3 g, 0.314 mol) and PdCl$_2$[P(cy)$_3$]$_2$ (3.1 g, 0.004 mol) in THF (5 mL)/water (60 mL) at room temperature. The resulting mixture was stirred for 5 min at ambient temperature before it was treated with a solution of 1.4 (20.0 g, 0.105 mol) and 1.5 (74.9 g, 0.199 mol) in THF (520 mL). The reaction mixture was stirred overnight at 70° C., phases separated and the aqueous phase was extracted with methyl tert-butyl ether (2 times). The combined organics were washed with water, dried over Na$_2$SO$_4$, filtered and concentrated in vacuo. The residue (67.0 g, 103%) was used in the next step without further purification.

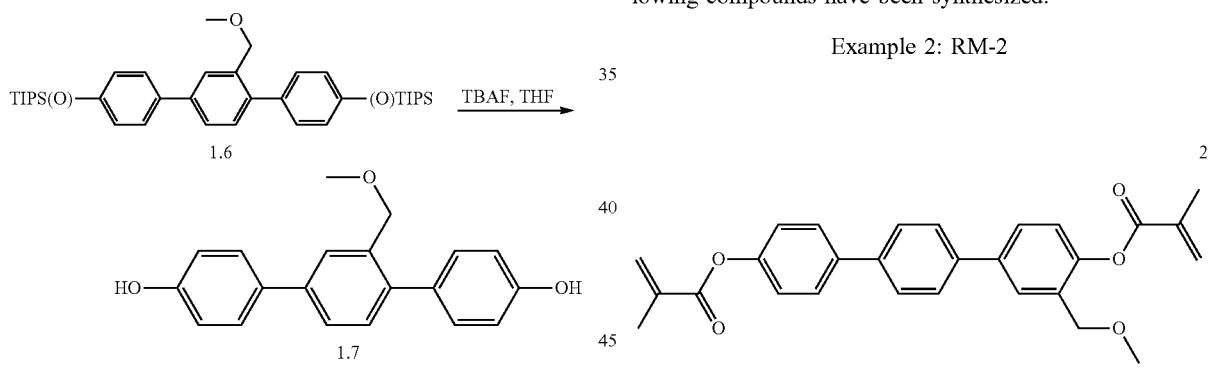

1.7: A solution of TBAF (in THF, 1.0 M, 158 mL, 158 mmol) was added dropwise to a stirred solution of 1.6 (42.0 g, 67.8 mmol) in THF (500 mL) at 5° C. The resulting mixture was stirred 30 min at 3° C., followed by 1 h at ambient temperature, before it was poured on 40 mL ice, acidified with HCl (2.0 M) until pH=6 and extracted with ethyl acetate (3 times). The combined organic phase was washed with sat. NaCl solution, dried over Na$_2$SO$_4$, filtered and concentrated in vacuo. The residue was purified with flash chromatography (dichloromethane/methanol) to give 1.7 as white crystals (9.6 g, 46%).

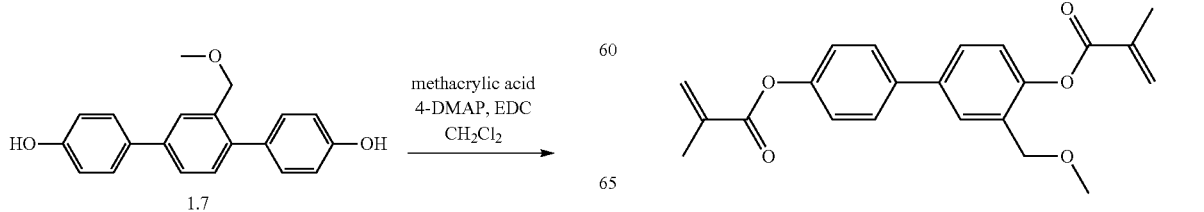

-continued

RM-1: Methacrylic acid (6.7 g, 78.3 mmol) and 4-dimethylaminopyridine (DMAP, 0.38 g, 3.1 mmol) were added to a stirred solution of biphenol 1.7 (9.6 g, 31.1 mmol) in dichloromethane (150 mL) at room temperature. The resulting mixture was cooled to 3° C. followed by dropwise addition 1-ethyl-3-(3-dimethylaminopropyl)carbodiimide (12.2 g, 78.3 mmol) in dichloromethane (20 mL). The reaction mixture was allowed to warm to room temperature and stirred overnight, before it was concentrated in vacuo. The residue was purified by flash chromatography (heptane/ethyl acetate) and recrystallized from heptane/ethanol (2:1) to give 1 as white crystals (10.2 g, 74%; HPLC: 99.7%). $^1$H NMR (CDCl$_3$): 2.12-2.13 (m, 6H), 3.41 (s, 3H), 4.43 (s, 2H), 5.80-5.82 (m, 2H), 6.41-6.42 (m, 2H), 7.27-7.21 (m, 4H), 7.40 (d, J=7.9 Hz, 1H), 7.45-7.49 (m, 2H), 7.60 (dd, J=7.9, 2.0 Hz, 1H), 7.74-7.65 (m, 2H), 7.78 (d, J=1.9 Hz, 1H); EI-MS: 442.0.

DSC: Tg 0 K 117 l.

In analogy to polymerizable compound RM-1, the following compounds have been synthesized:

Example 2: RM-2

RM-2: Melting Point: 117° C. $^1$H NMR (CDCl$_3$): δ 7.76 (d, J=2.3 Hz, 1H), 7.72-7.66 (m, 6H), 7.62 (dd, J=8.3, 2.4 Hz, 1H), 7.27-7.22 (m, 3H), 6.42 (dt, J=8.0, 1.2 Hz, 2H), 5.82 (dp, J=7.9, 1.6 Hz, 2H), 4.51 (s, 2H), 3.43 (s, 3H), 2.13 (t, J=1.2 Hz, 3H), 2.12 (t, J=1.3 Hz, 3H). EI-MS: 442.2

Example 3: RM-3

RM-3: Melting Point: 74° C. ¹H NMR (CDCl₃): δ 7.69 (d, J=2.3 Hz, 1H), 7.65-7.61 (m, 2H), 7.55 (dd, J=8.3, 2.4 Hz, 1H), 7.26-7.19 (m, 3H), 6.41 (dt, J=8.3, 1.2 Hz, 2H), 5.81 (dt, J=8.3, 1.6 Hz, 2H), 4.49 (s, 2H), 3.42 (s, 3H), 2.12 (t, J=1.3 Hz, 3H), 2.11 (t, J=1.2 Hz, 3H). EI-MS: 366.0

Example 4: RM-4

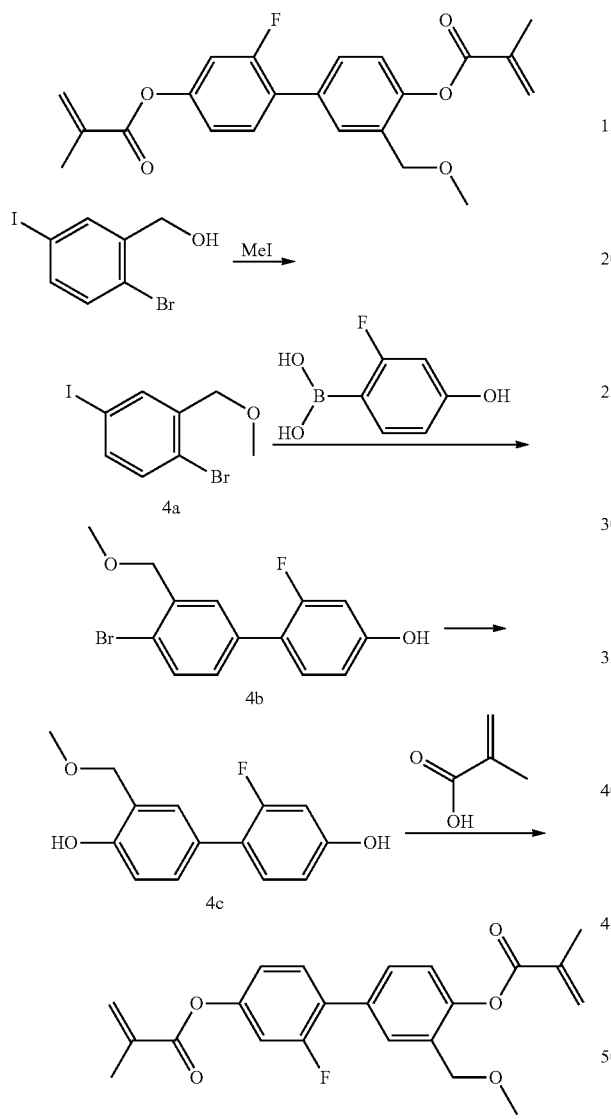

4a: To a solution of (2-bromo-5-iodo-phenyl)-methanol (100.0 g, 0.32 mol) in 250 ml THF is added at 0° C. sodium hydrid (15.3 g. 0.38 mol) in several portions. The reaction mixture is stirred at 0° C. for 30 min, to which methyl iodine (24.5 ml, 0.38 mol) is added dropwise, and then stirred 1 h at room temperature. The reaction mixture is carefully treated with ice-water and extracted with ethyl acetate. The organic phase is combined, dried over anhydrous sodium sulfate, and filtrated. After removing solvent in vacuo, the obtained crude product is purified by column chromatography on silica gel to provide 4a as yellow oil (85.5 g).

4b: To a solution of 4a (9.5 g, 29.0 mmol) and 2-fluoro-4-hydroxylphenyl boronic acid (4.8 g, 30.5 mmol) in 50 ml 1,4-dioxane was added sodium carbonate (6.5 g, 61 mmol) and 13 ml distilled water. After carefully degassing with argon, [1,1'-bis(diphenylphosphino)ferrocene]dichloropalladium(II) (0.85 g, 1.2 mmol) is added. The reaction mixture is heated to reflux and stirred overnight. After cooling to room temperature, the reaction mixture is carefully neutralized with 2 M HCl. The aqueous phase is separated and extracted with ethyl acetate. The organic phase is combined, dried over anhydrous sodium sulfate, and filtrated. After removing solvent in vacuo, the obtained crude product is purified by column chromatography on silica gel to provide 4b as white solid (5.6 g).

4c: To a mixture of 4b (5.6 g, 18 mmol) in 125 ml 1,4-dioxane and KOH (2.2 g, 39 mmol) in 3 ml distilled water was added Pd₂(dba)₃ (0.56 g, 0.61 mmol) and ᵗBu-X-Phos (0.97 g, 2.23 mmol). The reaction mixture is heated to reflux and stirred overnight. After cooling to room temperature, the reaction mixture is carefully neutralized with 2 M HCl. The aqueous phase is separated and extracted with toluene. The organic phase is combined, dried over anhydrous sodium sulfate, and filtrated. After removing solvent in vacuo, the obtained crude product is purified by column chromatography on silica gel with heptane/ethyl acetate mixture as eluent to provide 4c as brown oil (1.0 g).

RM-4: Methacrylic acid (0.78 ml, 9.3 mmol) and 4-(dimethylamino)pyridine (0.049 g, 0.4 mmol) is added to a solution of 1c (1.0 g, 4.0 mmol) in dichlormethane. The reaction mixture is treated dropwise at 0° C. with a solution of N-(3-dimethylaminopropyl)-N'-ethylcarbodiimide (1.5 g, 9.7 mmol) in DCM and stirred further for 2 hs at room temperature. The reaction mixture is concentrated in vacuo, and the oily residue is purified by column chromatography on silica gel with heptane/elthyl acetate mixture as eluent to afford RM-4 as white solid (0.69 g).

In analogy to Example 4, the following polymerizable compounds are synthesized:

Example 5: RM-5

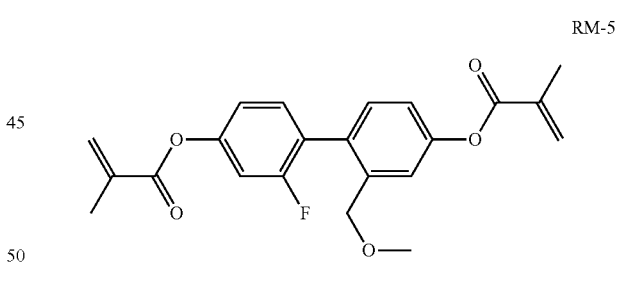

Example 6: RM-6

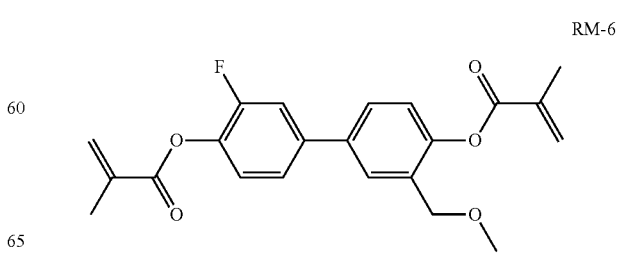

Mixture Examples

LC media according to the invention are prepared using the following liquid-crystalline mixtures consisting of low-molecular-weight components in the percentage proportions by weight indicated (acronyms cf. Tables above).

| H1: Nematic host mixture ($\Delta\varepsilon < 0$) | | | |
|---|---|---|---|
| CPP-3-2 | 6.50% | Clearing point [° C.]: | 74.7 |
| CC-3-V1 | 8.00% | $\Delta n$ (589 nm, 20° C.): | 0.1039 |
| CC-2-3 | 17.00% | $\Delta\varepsilon$ (1 kHz, 20° C.): | −3.0 |
| CC-3-4 | 6.50% | $\varepsilon_\parallel$ (1 kHz, 20° C.): | 3.4 |
| CCY-3-O1 | 3.50% | $K_3/K_1$ | 1.07 |
| CCY-3-O2 | 12.50% | $\gamma_1$ (20° C.) [mPa · s]: | 106 |
| CPY-2-O2 | 5.50% | $V_0$ (20° C.) [V]: | 2.10 |
| CPY-3-O2 | 10.00% | | |
| CY-3-O2 | 15.50% | | |
| CP-3-O1 | 4.50% | | |
| PP-1-2V1 | 5.00% | | |
| PY-3-O2 | 5.50% | | |

| H2: Nematic host mixture ($\Delta\varepsilon < 0$) | | | |
|---|---|---|---|
| CPP-3-2 | 6.0% | Clearing point [° C.]: | 74.8 |
| CC-3-V1 | 6.0% | $\Delta n$ (589 nm, 20° C.): | 0.107 |
| CC-3-4 | 9.0% | $\Delta\varepsilon$ (1 kHz, 20° C.): | −3.3 |
| CC-3-5 | 7.0% | $\varepsilon_\parallel$ (1 kHz, 20° C.): | 3.6 |
| CCP-3-1 | 8.0% | $\varepsilon_\perp$ (1 kHz, 20° C.): | 6.9 |
| CCP-3-3 | 3.0% | $K_1$ (20° C.) [pN]: | 14.2 |
| CCY-3-1 | 2.0% | $K_3$ (20° C.) [pN]: | 16.5 |
| CCY-3-O2 | 10.5% | $\gamma_1$ (20° C.) [mPa · s]: | 118 |
| CCY-4-O2 | 5.0% | $V_0$ (20° C.) [V]: | |
| CPY-3-O2 | 3.5% | | |
| CY-3-O2 | 14% | | |
| CP-3-O1 | 5.5% | | |
| PY-1-O4 | 6.5% | | |
| PY-3-O2 | 14% | | |

| H3: Nematic host mixture ($\Delta\varepsilon < 0$) | | | |
|---|---|---|---|
| CY-3-O2 | 15.5% | Clearing point [° C.]: | 75.1 |
| CCY-3-O3 | 8.00% | $\Delta n$ (589 nm, 20° C.): | 0.098 |
| CCY-4-O2 | 10.0% | $\Delta\varepsilon$ (1 kHz, 20° C.): | −3.0 |
| CPY-2-O2 | 5.50% | $\varepsilon_\parallel$ (1 kHz, 20° C.): | 3.4 |
| CPY-3-O2 | 11.5% | $\varepsilon_\perp$ (1 kHz, 20° C.): | 6.4 |
| CC-3-4 | 9.25% | $K_1$ (20° C.) [pN]: | 13.1 |
| CC-2-3 | 24.5% | $K_3$ (20° C.) [pN]: | 13.3 |
| PYP-2-3 | 8.75% | $\gamma_1$ (20° C.) [mPa · s]: | 113 |
| CP-3-O1 | 7.00% | $V_0$ (20° C.) [V]: | 2.22 |

| H4: Nematic host mixture ($\Delta\varepsilon < 0$) | | | |
|---|---|---|---|
| CY-3-O4 | 14.0% | Clearing point [° C.]: | 80.0 |
| CCY-3-O2 | 9.00% | $\Delta n$ (589 nm, 20° C.): | 0.090 |
| CCY-3-O3 | 9.00% | $\Delta\varepsilon$ (1 kHz, 20° C.): | −3.3 |
| CPY-2-O2 | 10.0% | $\varepsilon_\parallel$ (1 kHz, 20° C.): | 3.4 |
| CPY-3-O2 | 10.0% | $\varepsilon_\perp$ (1 kHz, 20° C.): | 6.7 |
| CCY-3-1 | 8.00% | $K_1$ (20° C.) [pN]: | 15.1 |
| CC-3-4 | 9.00% | $K_3$ (20° C.) [pN]: | 14.6 |
| CC-3-5 | 6.00% | $\gamma_1$ (20° C.) [mPa · s]: | 140 |
| CP-5-3 | 10.0% | $V_0$ (20° C.) [V]: | 2.23 |
| CC-3-O1 | 6.00% | | |
| CC-3-O3 | 9.00% | | |

| H5: Nematic host mixture ($\Delta\varepsilon < 0$) | | | |
|---|---|---|---|
| CC-3-V1 | 9.00% | Clearing point [° C.]: | 74.7 |
| CC-2-3 | 18.0% | $\Delta n$ (589 nm, 20° C.): | 0.098 |
| CC-3-4 | 3.00% | $\Delta\varepsilon$ (1 kHz, 20° C.): | −3.4 |
| CC-3-5 | 7.00% | $\varepsilon_\parallel$ (1 kHz, 20° C.): | 3.5 |
| CCP-3-1 | 5.50% | $\varepsilon_\perp$ (1 kHz, 20° C.): | 6.9 |
| CCY-3-O2 | 11.5% | $K_1$ (20° C.) [pN]: | 14.9 |
| CPY-2-O2 | 8.00% | $K_3$ (20° C.) [pN]: | 15.9 |
| CPY-3-O2 | 11.0% | $\gamma_1$ (20° C.) [mPa · s]: | 108 |
| CY-3-O2 | 15.5% | $V_0$ (20° C.) [V]: | 2.28 |
| PY-3-O2 | 11.5% | | |

| H6: Nematic host mixture ($\Delta\varepsilon < 0$) | | | |
|---|---|---|---|
| CC-3-V | 37.5% | Clearing point [° C.]: | 74.8 |
| CC-3-V1 | 2.00% | $\Delta n$ (589 nm, 20° C.): | 0.099 |
| CCY-4-O2 | 14.5% | $\Delta\varepsilon$ (1 kHz, 20° C.): | −2.9 |
| CPY-2-O2 | 10.5% | $\varepsilon_\parallel$ (1 kHz, 20° C.): | 3.7 |
| CPY-3-O2 | 9.50% | $\varepsilon_\perp$ (1 kHz, 20° C.): | 6.6 |
| CY-3-O2 | 15.0% | $K_1$ (20° C.) [pN]: | 12.2 |
| CY-3-O4 | 4.50% | $K_3$ (20° C.) [pN]: | 13.4 |
| PYP-2-4 | 5.50% | $\gamma_1$ (20° C.) [mPa · s]: | 92 |
| PPGU-3-F | 1.00% | $V_0$ (20° C.) [V]: | 2.28 |

| H7: Nematic host mixture ($\Delta\varepsilon < 0$) | | | |
|---|---|---|---|
| CC-2-3 | 20.0% | Clearing point [° C.]: | 74.8 |
| CC-3-O1 | 6.00% | $\Delta n$ (589 nm, 20° C.): | 0.105 |
| CC-3-4 | 6.00% | $\Delta\varepsilon$ (1 kHz, 20° C.): | −3.2 |
| CCP-3-1 | 3.00% | $\varepsilon_\parallel$ (1 kHz, 20° C.): | 3.5 |
| CCY-3-O2 | 11.0% | $\varepsilon_\perp$ (1 kHz, 20° C.): | 6.8 |
| CPY-2-O2 | 12.0% | $K_1$ (20° C.) [pN]: | 12.7 |
| CPY-3-O2 | 11.0% | $K_3$ (20° C.) [pN]: | 13.6 |
| CY-3-O2 | 14.0% | $\gamma_1$ (20° C.) [mPa · s]: | 120 |
| CY-3-O4 | 4.00% | $V_0$ (20° C.) [V]: | 2.16 |
| CP-3-O1 | 4.00% | | |
| PYP-2-3 | 9.00% | | |

| H8: Nematic host mixture ($\Delta\varepsilon < 0$) | | | |
|---|---|---|---|
| CC-4-V | 17.0% | Clearing point [° C.]: | 106.1 |
| CCP-V-1 | 15.0% | $\Delta n$ (589 nm, 20° C.): | 0.120 |
| CCEPC-3-3 | 2.50% | $\Delta\varepsilon$ (1 kHz, 20° C.): | −3.6 |
| CCY-3-O2 | 4.00% | $\varepsilon_\parallel$ (1 kHz, 20° C.): | 3.5 |
| CCY-3-O3 | 5.00% | $\varepsilon_\perp$ (1 kHz, 20° C.): | 7.0 |
| CCY-4-O2 | 5.00% | $K_1$ (20° C.) [pN]: | 16.8 |
| CLY-3-2 | 3.50% | $K_3$ (20° C.) [pN]: | 17.3 |
| CLY-3-O3 | 2.00% | $\gamma_1$ (20° C.) [mPa · s]: | 207 |
| CPY-2-O2 | 8.00% | $V_0$ (20° C.) [V]: | 2.33 |
| CPY-3-O2 | 10.0% | | |
| CY-3-O4 | 17.0% | | |
| PYP-2-3 | 11.0% | | |

| H9: Nematic host mixture ($\Delta\varepsilon < 0$) | | | |
|---|---|---|---|
| CY-3-O2 | 15.0% | Clearing point [° C.]: | 75.5 |
| CCY-4-O2 | 9.50% | $\Delta n$ (589 nm, 20° C.): | 0.108 |
| CCY-5-O2 | 5.00% | $\Delta\varepsilon$ (1 kHz, 20° C.): | −3.0 |
| CPY-2-O2 | 9.00% | $\varepsilon_\parallel$ (1 kHz, 20° C.): | 3.5 |
| CPY-3-O2 | 9.00% | $\varepsilon_\perp$ (1 kHz, 20° C.): | 6.5 |
| CC-3-4 | 9.00% | $K_1$ (20° C.) [pN]: | 12.9 |
| CC-2-3 | 22.0% | $K_3$ (20° C.) [pN]: | 13.0 |
| PYP-2-3 | 7.00% | $\gamma_1$ (20° C.) [mPa · s]: | 115 |
| PYP-2-4 | 7.50% | $V_0$ (20° C.) [V]: | 2.20 |
| CP-3-O1 | 7.00% | | |

| H10: Nematic host mixture (Δε < 0) | | | |
|---|---|---|---|
| CY-3-O2 | 15.0% | Clearing point [° C.]: | 74.7 |
| CY-5-O2 | 6.50% | Δn (589 nm, 20° C.): | 0.108 |
| CCY-3-O2 | 11.0% | Δε (1 kHz, 20° C.): | −3.0 |
| CPY-2-O2 | 5.50% | $\varepsilon_\parallel$ (1 kHz, 20° C.): | 3.6 |
| CPY-3-O2 | 10.5% | $\varepsilon_\perp$ (1 kHz, 20° C.): | 6.6 |
| CC-3-V | 28.5% | $K_1$ (20° C.) [pN]: | 12.9 |
| CC-3-V1 | 10.0% | $K_3$ (20° C.) [pN]: | 15.7 |
| PYP-2-3 | 12.5% | $\gamma_1$ (20° C.) [mPa·s]: | 97 |
| PPGU-3-F | 0.50% | $V_0$ (20° C.) [V]: | 2.42 |

| H11: Nematic host mixture (Δε < 0) | | | |
|---|---|---|---|
| CC-3-5 | 9.50% | Clearing point [° C.]: | 79.1 |
| CC-5-O1 | 5.00% | Δn (589 nm, 20° C.): | 0.091 |
| CCY-2-1 | 9.50% | Δε (1 kHz, 20° C.): | −3.6 |
| CCY-3-1 | 10.5% | $\varepsilon_\parallel$ (1 kHz, 20° C.): | 3.5 |
| CCY-3-O2 | 10.5% | $\varepsilon_\perp$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $\gamma_1$ (20° C.) [mPa·s]: | 178 |
| CY-5-O4 | 11.0% | $V_0$ (20° C.) [V]: | 2.12 |
| CP-5-3 | 13.5% | | |

| H12: Nematic host mixture (Δε < 0) | | | |
|---|---|---|---|
| CPP-3-2 | 4.00% | Clearing point [° C.]: | 74.8 |
| CC-3-V1 | 8.00% | Δn (589 nm, 20° C.): | 0.106 |
| CC-2-3 | 13.0% | Δε (1 kHz, 20° C.): | −3.5 |
| CC-3-4 | 7.00% | $\varepsilon_\parallel$ (1 kHz, 20° C.): | 3.6 |
| CC-3-5 | 7.00% | $\varepsilon_\perp$ (1 kHz, 20° C.): | 7.1 |
| CCY-3-O2 | 13.0% | $K_1$ (20° C.) [pN]: | 14.8 |
| CPY-2-O2 | 7.00% | $K_3$ (20° C.) [pN]: | 15.8 |
| CPY-3-O2 | 12.0% | $\gamma_1$ (20° C.) [mPa·s]: | 115 |
| CY-3-O2 | 12.0% | $V_0$ (20° C.) [V]: | 2.23 |
| CP-3-O1 | 2.00% | | |
| PY-3-O2 | 15.0% | | |

| H13: Nematic host mixture (Δε < 0) | | | |
|---|---|---|---|
| CY-3-O4 | 22.0% | Clearing point [° C.]: | 86.9 |
| CY-5-O4 | 12.0% | Δn (589 nm, 20° C.): | 0.111 |
| CCY-3-O2 | 6.00% | Δε (1 kHz, 20° C.): | −4.9 |
| CCY-3-O3 | 6.00% | $\varepsilon_\parallel$ (1 kHz, 20° C.): | 3.8 |
| CCY-4-O2 | 6.00% | $\varepsilon_\perp$ (1 kHz, 20° C.): | 8.7 |
| CPY-2-O2 | 10.0% | $K_1$ (20° C.) [pN]: | 14.9 |
| CPY-3-O2 | 10.0% | $K_3$ (20° C.) [pN]: | 15.9 |
| PYP-2-3 | 7.00% | $\gamma_1$ (20° C.) [mPa·s]: | 222 |
| CC-3-V1 | 7.00% | $V_0$ (20° C.) [V]: | 1.91 |
| CC-5-V | 10.0% | | |
| CCEPC-3-3 | 2.00% | | |
| CCEPC-3-5 | 2.00% | | |

| H14: Nematic host mixture (Δε < 0) | | | |
|---|---|---|---|
| CY-3-O4 | 12.0% | Clearing point [° C.]: | 86.0 |
| CY-5-O2 | 10.0% | Δn (589 nm, 20° C.): | 0.110 |
| CY-5-O4 | 8.00% | Δε (1 kHz, 20° C.): | −5.0 |
| CCY-3-O2 | 8.00% | $\varepsilon_\parallel$ (1 kHz, 20° C.): | 3.8 |
| CCY-4-O2 | 7.00% | $\varepsilon_\perp$ (1 kHz, 20° C.): | 8.8 |
| CCY-5-O2 | 6.00% | $K_1$ (20° C.) [pN]: | 14.7 |
| CCY-2-1 | 8.00% | $K_3$ (20° C.) [pN]: | 16.0 |
| CCY-3-1 | 7.00% | $\gamma_1$ (20° C.) [mPa·s]: | 250 |
| CPY-3-O2 | 9.00% | $V_0$ (20° C.) [V]: | 1.90 |
| CPY-3-O2 | 9.00% | | |
| CPP-3-2 | 6.00% | | |
| CP-5-3 | 10.0% | | |

| H15: Nematic host mixture (Δε < 0) | | | |
|---|---|---|---|
| CC-3-V1 | 10.25% | Clearing point [° C.]: | 74.7 |
| CC-2-3 | 18.5% | Δn (589 nm, 20° C.): | 0.103 |
| CC-3-5 | 6.75% | Δε (1 kHz, 20° C.): | −3.1 |
| CCP-3-1 | 6.00% | $\varepsilon_\parallel$ (1 kHz, 20° C.): | 3.4 |
| CCY-3-1 | 2.50% | $\varepsilon_\perp$ (1 kHz, 20° C.): | 6.4 |
| CCY-3-O2 | 12.0% | $K_1$ (20° C.) [pN]: | 15.4 |
| CPY-2-O2 | 6.00% | $K_3$ (20° C.) [pN]: | 16.8 |
| CPY-3-O2 | 9.75% | $\gamma_1$ (20° C.) [mPa·s]: | 104 |
| CY-3-O2 | 11.5% | $V_0$ (20° C.) [V]: | 2.46 |
| PP-1-2V1 | 3.75% | | |
| PY-3-O2 | 13.0% | | |

| H16: Nematic host mixture (Δε < 0) | | | |
|---|---|---|---|
| CC-3-V | 27.5% | Clearing point [° C.]: | 74.7 |
| CC-3-V1 | 10.0% | Δn (589 nm, 20° C.): | 0.104 |
| CC-3-5 | 8.00% | Δε (1 kHz, 20° C.): | −3.0 |
| CCY-3-O2 | 9.25% | $\varepsilon_\parallel$ (1 kHz, 20° C.): | 3.4 |
| CLY-3-O2 | 10.0% | $\varepsilon_\perp$ (1 kHz, 20° C.): | 6.4 |
| CPY-3-O2 | 11.75% | $K_1$ (20° C.) [pN]: | 15.3 |
| PY-3-O2 | 14.0% | $K_3$ (20° C.) [pN]: | 16.2 |
| PY-4-O2 | 9.00% | $\gamma_1$ (20° C.) [mPa·s]: | 88 |
| PYP-2-4 | 0.50% | $V_0$ (20° C.) [V]: | 2.44 |

| H17: Nematic host mixture (Δε < 0) | | | |
|---|---|---|---|
| CPP-3-2 | 6.50% | Clearing point [° C.]: | 74.7 |
| CC-3-V1 | 8.00% | Δn (589 nm, 20° C.): | 0.104 |
| CC-2-3 | 17.0% | Δε (1 kHz, 20° C.): | −3.0 |
| CC-3-4 | 6.50% | $\varepsilon_\parallel$ (1 kHz, 20° C.): | 3.4 |
| CCY-3-O1 | 3.50% | $\varepsilon_\perp$ (1 kHz, 20° C.): | 6.3 |
| CCY-3-O2 | 12.5% | $K_1$ (20° C.) [pN]: | 14.8 |
| CPY-2-O2 | 5.50% | $K_3$ (20° C.) [pN]: | 15.8 |
| CPY-3-O2 | 10.0% | $\gamma_1$ (20° C.) [mPa·s]: | 106 |
| CY-3-O2 | 15.5% | | |
| CP-3-O1 | 4.50% | | |
| PP-1-2V1 | 5.00% | | |
| PY-3-O2 | 5.50% | | |

| H18: Nematic host mixture (Δε < 0) | | | |
|---|---|---|---|
| CPP-3-2 | 10.5% | Clearing point [° C.]: | 74.5 |
| CC-3-4 | 9.0% | Δn (589 nm, 20° C.): | 0.104 |
| CC-3-5 | 9.0% | Δε (1 kHz, 20° C.): | −3.4 |
| CCP-3-1 | 8.0% | $\varepsilon_\parallel$ (1 kHz, 20° C.): | 3.7 |
| CCY-3-O2 | 9.5% | $\varepsilon_\perp$ (1 kHz, 20° C.): | 7 |
| CCY-4-O2 | 5.5% | $K_1$ (20° C.) [pN]: | 14 |
| CPY-3-O2 | 5.5% | $K_3$ (20° C.) [pN]: | 15.7 |
| CY-3-O2 | 15% | $\gamma_1$ (20° C.) [mPa·s]: | 128 |
| CY-5-O2 | 5.0% | | |
| CP-3-O1 | 7.0% | | |
| PY-3-O2 | 16% | | |

| H19: Nematic host mixture (Δε < 0) | | | |
|---|---|---|---|
| CC-4-V | 10.0% | Clearing point [° C.]: | 77.0 |
| CC-5-V | 13.5% | Δn (589 nm, 20° C.): | 0.113 |
| PGU-3-F | 6.50% | Δε (1 kHz, 20° C.): | 19.2 |
| ACQU-2-F | 10.0% | $\varepsilon_\parallel$ (1 kHz, 20° C.): | 23.8 |
| ACQU-3-F | 12.0% | $\varepsilon_\perp$ (1 kHz, 20° C.): | 4.6 |
| PUQU-3-F | 11.0% | $K_1$ (20° C.) [pN]: | 11.5 |
| CCP-V-1 | 12.0% | $K_3$ (20° C.) [pN]: | 11.1 |
| APUQU-2-F | 6.00% | $\gamma_1$ (20° C.) [mPa · s]: | 122 |
| APUQU-3-F | 7.00% | $V_0$ (20° C.) [V]: | 0.81 |
| PGUQU-3-F | 8.00% | | |
| CPGU-3-OT | 4.00% | | |

| H20: Nematic host mixture (Δε < 0) | | | |
|---|---|---|---|
| PGU-2-F | 3.50% | Clearing point [° C.]: | 77.0 |
| PGU-3-F | 7.00% | Δn (589 nm, 20° C.): | 0.105 |
| CC-3-V1 | 15.0% | Δε (1 kHz, 20° C.): | 7.2 |
| CC-4-V | 18.0% | $\varepsilon_\parallel$ (1 kHz, 20° C.): | 10.3 |
| CC-5-V | 20.0% | $\varepsilon_\perp$ (1 kHz, 20° C.): | 3.1 |
| CCP-V-1 | 6.00% | $K_1$ (20° C.) [pN]: | 15.3 |
| APUQU-3-F | 15.0% | $K_3$ (20° C.) [pN]: | 13.5 |
| PUQU-3-F | 5.50% | $\gamma_1$ (20° C.) [mPa · s]: | 63 |
| PGP-2-4 | 3.00% | $V_0$ (20° C.) [V]: | 1.53 |
| CPP-3-2 | 7.00% | | |

| H21: Nematic host mixture (Δε < 0) | | | |
|---|---|---|---|
| APUQU-2-F | 6.00% | Clearing point [° C.]: | 74.0 |
| APUQU-3-F | 12.0% | Δn (589 nm, 20° C.): | 0.120 |
| PUQU-3-F | 18.0% | Δε (1 kHz, 20° C.): | 17.4 |
| CPGU-3-OT | 9.00% | $\varepsilon_\parallel$ (1 kHz, 20° C.): | 22.0 |
| CCGU-3-F | 3.00% | $\varepsilon_\perp$ (1 kHz, 20° C.): | 4.5 |
| CPU-3-F | 14.0% | $K_1$ (20° C.) [pN]: | 10.1 |
| CCQU-3-F | 10.0% | $K_3$ (20° C.) [pN]: | 10.8 |
| CC-3-V | 25.0% | $\gamma_1$ (20° C.) [mPa · s]: | 111 |
| PGP-2-2V | 3.00% | $V_0$ (20° C.) [V]: | 0.80 |

| H22: Nematic host mixture (Δε < 0) | | | |
|---|---|---|---|
| PUQU-3-F | 15.0% | Clearing point [° C.]: | 74.3 |
| APUQU-2-F | 5.00% | Δn (589 nm, 20° C.): | 0.120 |
| APUQU-3-F | 12.0% | Δε (1 kHz, 20° C.): | 14.9 |
| CCQU-3-F | 11.0% | $\varepsilon_\parallel$ (1 kHz, 20° C.): | 19.1 |
| CCQU-5-F | 1.50% | $\varepsilon_\perp$ (1 kHz, 20° C.): | 4.3 |
| CPGU-3-OT | 5.00% | $K_1$ (20° C.) [pN]: | 11.2 |
| CPP-3-OT | 4.50% | $K_3$ (20° C.) [pN]: | 10.8 |
| CGU-3-F | 10.0% | $\gamma_1$ (20° C.) [mPa · s]: | 98 |
| PGP-2-3 | 1.50% | $V_0$ (20° C.) [V]: | 0.91 |
| PGP-2-2V | 8.00% | | |
| CC-3-V | 26.5% | | |

| H23: Nematic host mixture (Δε > 0) | | | |
|---|---|---|---|
| CCQU-3-F | 9.00% | Clearing point [° C.]: | 94.5 |
| CCQU-5-F | 9.00% | Δn (589 nm, 20° C.): | 0.121 |
| PUQU-3-F | 16.0% | Δε (1 kHz, 20° C.): | 20.4 |
| APUQU-2-F | 8.00% | $\varepsilon_\parallel$ (1 kHz, 20° C.): | 24.7 |
| APUQU-3-F | 9.00% | $\varepsilon_\perp$ (1 kHz, 20° C.): | 4.3 |
| PGUQU-3-F | 8.00% | $K_1$ (20° C.) [pN]: | 12.1 |
| CPGU-3-OT | 7.00% | $K_3$ (20° C.) [pN]: | 13.9 |
| CC-4-V | 18.0% | $\gamma_1$ (20° C.) [mPa · s]: | 163 |
| CC-5-V | 5.00% | $V_0$ (20° C.) [V]: | 0.81 |
| CCP-V-1 | 6.00% | | |
| CCEPC-3-3 | 3.00% | | |
| PPGU-3-F | 2.00% | | |

| H24: Nematic host mixture (Δε > 0) | | | |
|---|---|---|---|
| CC-3-V | 28.50% | Clearing point [° C.]: | 85.6 |
| CCP-V-1 | 3.00% | Δn (589 nm, 20° C.): | 0.121 |
| CCEPC-3-3 | 2.00% | Δε (1 kHz, 20° C.): | 19.5 |
| PGU-2-F | 4.00% | $\varepsilon_\parallel$ (1 kHz, 20° C.): | 23.8 |
| CCQU-3-F | 8.00% | $\varepsilon_\perp$ (1 kHz, 20° C.): | 4.3 |
| CCQU-5-F | 6.00% | $K_1$ (20° C.) [pN]: | 11.6 |
| CCGU-3-F | 3.00% | $K_3$ (20° C.) [pN]: | 12.7 |
| PUQU-2-F | 2.00% | $\gamma_1$ (20° C.) [mPa · s]: | 126 |
| PUQU-3-F | 10.0% | $V_0$ (20° C.) [V]: | 0.81 |
| APUQU-2-F | 6.00% | | |
| APUQU-3-F | 9.00% | | |
| PGUQU-3-F | 5.00% | | |
| PGUQU-4-F | 5.00% | | |
| PGUQU-5-F | 4.00% | | |
| CPGU-3-OT | 4.00% | | |
| PPGU-3-F | 0.50% | | |

| H25: Nematic host mixture (Δε < 0) | | | |
|---|---|---|---|
| CC-3-V1 | 9.00% | Clearing point [° C.]: | 74.6 |
| CC-3-O1 | 3.50% | Δn (589 nm, 20° C.): | 0.0984 |
| CC-3-4 | 8.00% | Δε (1 kHz, 20° C.): | −3.6 |
| CC-3-5 | 8.00% | $\varepsilon_\parallel$ (1 kHz, 20° C.): | 3.6 |
| CCP-3-1 | 6.00% | $\varepsilon_\perp$ (1 kHz, 20° C.): | 7.1 |
| CCY-3-O1 | 6.50% | $K_1$ (20° C.) [pN]: | 14.1 |
| CCY-3-O2 | 12.5% | $K_3$ (20° C.) [pN]: | 17 |
| CPY-3-O2 | 10.0% | $\gamma_1$ (20° C.) [mPa · s]: | 119 |
| CY-3-O2 | 15.5% | $V_0$ (20° C.) [V]: | 2.31 |
| CP-3-O1 | 8.5% | | |
| PY-3-O2 | 12.5% | | |

| H26: Nematic host mixture (Δε < 0) | | | |
|---|---|---|---|
| CC-3-5 | 9.50% | Clearing point [° C.]: | 79.1 |
| CC-5-O1 | 5.00% | Δn (589 nm, 20° C.): | 0.0911 |
| CCY-2-1 | 9.50% | Δε (1 kHz, 20° C.): | −3.6 |
| CCY-3-1 | 10.5% | $\varepsilon_\parallel$ (1 kHz, 20° C.): | 3.5 |
| CCY-3-O2 | 10.5% | $\varepsilon_\perp$ (1 kHz, 20° C.): | 7.1 |
| CCY-5-O2 | 9.50% | $K_1$ (20° C.) [pN]: | 14.6 |
| CPY-2-O2 | 12.0% | $K_3$ (20° C.) [pN]: | 14.5 |
| CY-3-O4 | 9.00% | $\gamma_1$ (20° C.) [mPa · s]: | 178 |
| CY-5-O4 | 11.0% | $V_0$ (20° C.) [V]: | 2.12 |
| CP-5-3 | 13.5% | | |

| H27: Nematic host mixture (Δε < 0) | | | |
|---|---|---|---|
| CC-3-V | 37.5% | Clearing point [° C.]: | 74.8 |
| CC-3-V1 | 2.00% | Δn (589 nm, 20° C.): | 0.0987 |
| CCY-4-O2 | 14.5% | Δε (1 kHz, 20° C.): | −2.9 |
| CPY-2-O2 | 10.5% | $\varepsilon_\parallel$ (1 kHz, 20° C.): | 3.7 |
| CPY-3-O2 | 9.5% | $\varepsilon_\perp$ (1 kHz, 20° C.): | 6.6 |
| CY-3-O2 | 15.0% | $K_1$ (20° C.) [pN]: | 12.2 |
| CY-3-O4 | 4.50% | $K_3$ (20° C.) [pN]: | 13.4 |
| PYP-2-4 | 5.50% | $\gamma_1$ (20° C.) [mPa · s]: | 92 |
| PPGU-3-F | 1.00% | $V_0$ (20° C.) [V]: | 2.28 |

| H28: Nematic host mixture (Δε < 0) | | | |
|---|---|---|---|
| CC-3-V | 37.5% | Clearing point [° C.]: | 75.4 |
| CC-5-O1 | 2.00% | Δn (589 nm, 20° C.): | 0.1034 |
| CCY-3-O2 | 12.0% | Δε (1 kHz, 20° C.): | −3.3 |
| CCY-3-O3 | 6.50% | $\varepsilon_\parallel$ (1 kHz, 20° C.): | 3.6 |
| CPY-2-O2 | 12.0% | $\varepsilon_\perp$ (1 kHz, 20° C.): | 6.9 |
| CPY-3-O2 | 10.0% | $K_1$ (20° C.) [pN]: | 13.4 |
| CY-3-O2 | 2.00% | $K_3$ (20° C.) [pN]: | 15 |

| H28: Nematic host mixture (Δε < 0) | | | |
|---|---|---|---|
| PY-3-O2 | 16.0% | γ₁ (20° C.) [mPa · s]: | 95 |
| CP-3-O1 | 2.00% | V₀ (20° C.) [V]: | 2.24 |

| H29: Nematic host mixture (Δε < 0) | | | |
|---|---|---|---|
| CC-3-V | 22.5% | Clearing point [° C.]: | 74.8 |
| CC-3-V1 | 9.75% | Δn (589 nm, 20° C.): | 0.1027 |
| CC-1-3 | 0.75% | Δε (1 kHz, 20° C.): | −3.2 |
| CC-3-4 | 5.5% | ε∥ (1 kHz, 20° C.): | 3.5 |
| CC-3-5 | 4.00% | ε⊥ (1 kHz, 20° C.): | 6.8 |
| CCY-3-O1 | 10% | K₁ (20° C.) [pN]: | 14.4 |
| CCY-3-O2 | 12% | K₃ (20° C.) [pN]: | 15.2 |
| CPY-2-O2 | 10% | γ₁ (20° C.) [mPa · s]: | |
| CPY-3-O2 | 2.0% | V₀ (20° C.) [V]: | 2.29 |
| CY-3-O2 | 0.5% | | |
| PP-1-2V1 | 0.25% | | |
| PY-1-O4 | 4.25% | | |
| PY-3-O2 | 17% | | |
| PYP-2-3 | 1.5% | | |

| H30: Nematic host mixture (Δε < 0) | | | |
|---|---|---|---|
| CPP-3-2 | 4.0% | Clearing point [° C.]: | 74.6 |
| CC-3-V | 10% | Δn (589 nm, 20° C.): | 0.099 |
| CC-3-V1 | 8.5% | Δε (1 kHz, 20° C.): | −3.4 |
| CC-3-4 | 4.5% | ε∥ (1 kHz, 20° C.): | 3.6 |
| CC-3-5 | 8.0% | ε⊥ (1 kHz, 20° C.): | 7 |
| CCP-3-1 | 4.25% | K₁ (20° C.) [pN]: | 14.2 |
| CCY-3-O1 | 6.5% | K₃ (20° C.) [pN]: | 15.9 |
| CCY-3-O2 | 12.75% | γ₁ (20° C.) [mPa · s]: | 108 |
| CCY-4-O2 | 6.0% | V₀ (20° C.) [V]: | 2.28 |
| CY-3-O2 | 15.5% | | |
| CP-3-O1 | 2.0% | | |
| PY-3-O2 | 16% | | |
| PYP-2-3 | 2.0% | | |

| H31: Nematic host mixture (Δε < 0) | | | |
|---|---|---|---|
| CC-3-V | 15% | Clearing point [° C.]: | 74.4 |
| CC-3-V1 | 9.0% | Δn (589 nm, 20° C.): | 0.1086 |
| CC-2-3 | 8.0% | Δε (1 kHz, 20° C.): | −3.2 |
| CC-3-4 | 7.5% | ε∥ (1 kHz, 20° C.): | 3.5 |
| CCY-3-O2 | 10% | ε⊥ (1 kHz, 20° C.): | 6.7 |
| CCY-5-O2 | 8.0% | K₁ (20° C.) [pN]: | 14.3 |
| CPY-2-O2 | 3.0% | K₃ (20° C.) [pN]: | 15.7 |
| CPY-3-O2 | 8.5% | γ₁ (20° C.) [mPa · s]: | 102 |
| CY-3-O2 | 7.0% | V₀ (20° C.) [V]: | 2.33 |
| PY-3-O2 | 16% | | |
| PYP-2-3 | 8.0% | | |

| H32: Nematic host mixture (Δε < 0) | | | |
|---|---|---|---|
| CPP-3-2 | 6.0% | Clearing point [° C.]: | 75.2 |
| CC-3-O1 | 4.0% | Δn (589 nm, 20° C.): | 0.1095 |
| CC-3-4 | 9.0% | Δε (1 kHz, 20° C.): | −3.1 |
| CC-3-5 | 9.0% | ε∥ (1 kHz, 20° C.): | 3.6 |
| CCP-3-1 | 8.0% | ε⊥ (1 kHz, 20° C.): | 6.7 |
| CCP-3-3 | 1.0% | K₁ (20° C.) [pN]: | 13.8 |
| CCY-3-O2 | 12% | K₃ (20° C.) [pN]: | 16.5 |
| CLY-3-O2 | 1.0% | γ₁ (20° C.) [mPa · s]: | 119 |
| CPY-3-O2 | 11% | V₀ (20° C.) [V]: | 2.41 |
| CY-3-O2 | 9.5% | | |
| CP-3-O1 | 11.5% | | |
| PY-3-O2 | 18% | | |

| H33: Nematic host mixture (Δε < 0) | | | |
|---|---|---|---|
| CPP-3-2 | 3.0% | Clearing point [° C.]: | 75.2 |
| CC-3-V1 | 9.0% | Δn (589 nm, 20° C.): | 0.1098 |
| CC-3-O1 | 2.5% | Δε (1 kHz, 20° C.): | −3.1 |
| CC-3-4 | 9.0% | ε∥ (1 kHz, 20° C.): | 3.6 |
| CC-3-5 | 9.0% | ε⊥ (1 kHz, 20° C.): | 6.7 |
| CCP-3-1 | 7.5% | K₁ (20° C.) [pN]: | 14.6 |
| CCP-V2-1 | 5.0% | K₃ (20° C.) [pN]: | 16.6 |
| CCY-3-O2 | 4.0% | γ₁ (20° C.) [mPa · s]: | 114 |
| CPY-2-O2 | 5.5% | V₀ (20° C.) [V]: | 2.43 |
| CPY-3-O2 | 10.5% | | |
| CY-3-O2 | 15% | | |
| CP-3-O1 | 1.5% | | |
| PY-3-O2 | 18% | | |
| PPGU-3-F | 0.5% | | |

| H34: Nematic host mixture (Δε < 0) | | | |
|---|---|---|---|
| CPP-3-2 | 8.5% | Clearing point [° C.]: | 74.7 |
| CC-3-V1 | 9.0% | Δn (589 nm, 20° C.): | 0.1097 |
| CC-3-O1 | 2.0% | Δε (1 kHz, 20° C.): | −3.1 |
| CC-3-4 | 9.0% | ε∥ (1 kHz, 20° C.): | 3.5 |
| CC-3-5 | 9.0% | ε⊥ (1 kHz, 20° C.): | 6.6 |
| CCP-3-1 | 2.5% | K₁ (20° C.) [pN]: | 14.2 |
| CCP-V2-1 | 5.0% | K₃ (20° C.) [pN]: | 16.6 |
| CCY-3-O2 | 7.5% | γ₁ (20° C.) [mPa · s]: | 112 |
| CLY-3-O2 | 1.0% | V₀ (20° C.) [V]: | 2.44 |
| CPY-3-O2 | 10.5% | | |
| CY-3-O2 | 15% | | |
| CP-3-O1 | 3.0% | | |
| PY-3-O2 | 18% | | |

| H35: Nematic host mixture (Δε < 0) | | | |
|---|---|---|---|
| B-2O-O5 | 4.0% | Clearing point [° C.]: | 75 |
| CPP-3-2 | 2.0% | Δn (589 nm, 20° C.): | 0.1094 |
| CC-3-O1 | 5.0% | Δε (1 kHz, 20° C.): | −3.1 |
| CC-3-4 | 9.0% | ε∥ (1 kHz, 20° C.): | 3.6 |
| CC-3-5 | 9.0% | ε⊥ (1 kHz, 20° C.): | 6.7 |
| CCP-3-1 | 8.0% | K₁ (20° C.) [pN]: | 13.9 |
| CCP-3-3 | 5.0% | K₃ (20° C.) [pN]: | 16.4 |
| CCY-3-O2 | 11.5% | γ₁ (20° C.) [mPa · s]: | 117 |
| CLY-3-O2 | 1.0% | V₀ (20° C.) [V]: | 2.42 |
| CPY-3-O2 | 10.5% | | |
| CY-3-O2 | 2.0% | | |
| CP-3-O1 | 15% | | |
| PY-3-O2 | 18% | | |

| H36: Nematic host mixture (Δε < 0) | | | |
|---|---|---|---|
| CPP-3-2 | 7.5% | Clearing point [° C.]: | 74.8 |
| CC-3-V1 | 9.0% | Δn (589 nm, 20° C.): | 0.1098 |
| CC-3-O1 | 1.5% | Δε (1 kHz, 20° C.): | −3.1 |
| CC-3-4 | 9.0% | ε∥ (1 kHz, 20° C.): | 3.5 |
| CC-3-5 | 9.0% | ε⊥ (1 kHz, 20° C.): | 6.6 |
| CCP-3-1 | 4.0% | K₁ (20° C.) [pN]: | 14.4 |
| CCP-V2-1 | 5.0% | K₃ (20° C.) [pN]: | 16.6 |
| CCY-3-O2 | 7.0% | γ₁ (20° C.) [mPa · s]: | 112 |
| CPY-2-O2 | 2.0% | V₀ (20° C.) [V]: | 2.44 |

| H36: Nematic host mixture (Δε < 0) | | |
|---|---|---|
| CPY-3-O2 | 10% | |
| CY-3-O2 | 15% | |
| CP-3-O1 | 3.0% | |
| PY-3-O2 | 18% | |

| H37: Nematic host mixture (Δε < 0) | | | |
|---|---|---|---|
| CY-3-O2 | 10% | Clearing point [° C.]: | 100 |
| CY-3-O4 | 20% | Δn (589 nm, 20° C.): | 0.0865 |
| CY-5-O4 | 20% | Δε (1 kHz, 20° C.): | −5.4 |
| CCY-3-O2 | 6.0% | $\varepsilon_\parallel$ (1 kHz, 20° C.): | 3.9 |
| CCY-3-O3 | 6.0% | $\varepsilon_\perp$ (1 kHz, 20° C.): | 9.3 |
| CCY-4-O2 | 6.0% | $K_1$ (20° C.) [pN]: | 15.6 |
| CCY-5-O2 | 6.0% | $K_3$ (20° C.) [pN]: | 16.6 |
| CCZC-3-3 | 3.0% | $\gamma_1$ (20° C.) [mPa·s]: | 347 |
| CCZC-3-5 | 3.5% | $V_0$ (20° C.) [V]: | 1.84 |
| CCZC-4-3 | 3.5% | | |
| CCZC-4-5 | 3.5% | | |
| CCEPC-3-3 | 4.0% | | |
| CCEPC-3-4 | 4.5% | | |
| CCEPC-3-5 | 4.0% | | |

| H38: Nematic host mixture (Δε < 0) | | | |
|---|---|---|---|
| Y-4O-O4 | 12.5% | Clearing point [° C.]: | 105 |
| CY-3-O4 | 5.0% | Δn (589 nm, 20° C.): | 0.0868 |
| CY-5-O4 | 18% | Δε (1 kHz, 20° C.): | −5.4 |
| CCY-3-O1 | 4.0% | $\varepsilon_\parallel$ (1 kHz, 20° C.): | 4.2 |
| CCY-3-O2 | 6.0% | $\varepsilon_\perp$ (1 kHz, 20° C.): | 9.6 |
| CCY-3-O3 | 6.0% | $K_1$ (20° C.) [pN]: | 16.7 |
| CCY-4-O2 | 6.0% | $K_3$ (20° C.) [pN]: | 16.5 |
| CCY-5-O2 | 6.0% | $\gamma_1$ (20° C.) [mPa·s]: | |
| CPY-3-O2 | 4.5% | $V_0$ (20° C.) [V]: | 1.85 |
| CCZC-3-3 | 4.0% | | |
| CCZC-3-5 | 4.0% | | |
| CCZC-4-3 | 4.0% | | |
| CCZC-4-5 | 4.0% | | |
| CCOC-3-3 | 2.0% | | |
| CCOC-4-3 | 2.0% | | |
| CCEPC-3-3 | 4.0% | | |
| CCEPC-3-4 | 4.0% | | |
| CCEPC-3-5 | 4.0% | | |

| H39: Nematic host mixture (Δε < 0) | | | |
|---|---|---|---|
| Y-4O-O4 | 3.0% | Clearing point [° C.]: | 108 |
| CY-3-O4 | 8.0% | Δn (589 nm, 20° C.): | 0.1096 |
| CCY-3-O1 | 4.0% | Δε (1 kHz, 20° C.): | −2.4 |
| CCY-3-O2 | 6.0% | $\varepsilon_\parallel$ (1 kHz, 20° C.): | 3.2 |
| CCY-3-O3 | 6.0% | $\varepsilon_\perp$ (1 kHz, 20° C.): | 5.6 |
| CPY-2-O2 | 8.0% | $K_1$ (20° C.) [pN]: | 16.3 |
| CPY-3-O2 | 8.0% | $K_3$ (20° C.) [pN]: | 18.9 |
| CP-3-O1 | 5.5% | $\gamma_1$ (20° C.) [mPa·s]: | |
| CC-4-V | 15% | $V_0$ (20° C.) [V]: | 2.99 |
| CC-3-V1 | 5.5% | | |
| CCP-V-1 | 13% | | |
| CCP-V2-1 | 13% | | |
| CPTP-3-O1 | 5.0% | | |

| H40: Nematic host mixture (Δε < 0) | | | |
|---|---|---|---|
| CY-3-O4 | 16% | Clearing point [° C.]: | 109 |
| CCY-3-O1 | 4.0% | Δn (589 nm, 20° C.): | 0.0854 |
| CCY-3-O2 | 6.0% | Δε (1 kHz, 20° C.): | −2.3 |
| CCY-3-O3 | 6.0% | $\varepsilon_\parallel$ (1 kHz, 20° C.): | 3.1 |
| CCY-4-O2 | 6.0% | $\varepsilon_\perp$ (1 kHz, 20° C.): | 5.4 |
| CCY-5-O2 | 5.0% | $K_1$ (20° C.) [pN]: | 16.3 |
| CC-3-O1 | 6.0% | $K_3$ (20° C.) [pN]: | 19.4 |
| CC-4-V | 15% | $\gamma_1$ (20° C.) [mPa·s]: | |
| CC-3-V1 | 6.0% | $V_0$ (20° C.) [V]: | 3.08 |
| CCP-V-1 | 13% | | |
| CCP-V2-1 | 13% | | |
| CCEPC-3-3 | 4.0% | | |

| H41: Nematic host mixture (Δε < 0) | | | |
|---|---|---|---|
| Y-4O-O4 | 10% | Clearing point [° C.]: | 107 |
| CY-3-O2 | 7.0% | Δn (589 nm, 20° C.): | 0.1104 |
| CY-3-O4 | 15% | Δε (1 kHz, 20° C.): | −6 |
| CCY-3-O1 | 4.0% | $\varepsilon_\parallel$ (1 kHz, 20° C.): | 4.3 |
| CCY-3-O2 | 6.0% | $\varepsilon_\perp$ (1 kHz, 20° C.): | 10.3 |
| CCY-3-O3 | 6.0% | $K_1$ (20° C.) [pN]: | 15.7 |
| CCY-4-O2 | 6.0% | $K_3$ (20° C.) [pN]: | 19.1 |
| CCY-5-O2 | 6.0% | $\gamma_1$ (20° C.) [mPa·s]: | |
| CPY-2-O2 | 9.0% | $V_0$ (20° C.) [V]: | 1.88 |
| CPY-3-O2 | 9.0% | | |
| CCP-V-1 | 8.5% | | |
| CCEPC-3-3 | 4.0% | | |
| CCEPC-3-4 | 4.0% | | |
| CCEPC-3-5 | 3.5% | | |
| CGPC-3-3 | 2.0% | | |

| H42: Nematic host mixture (Δε < 0) | | | |
|---|---|---|---|
| Y-4O-O4 | 10% | Clearing point [° C.]: | 108 |
| CY-3-O2 | 4.0% | Δn (589 nm, 20° C.): | 0.1403 |
| CY-3-O4 | 15% | Δε (1 kHz, 20° C.): | −6.4 |
| CCY-3-O1 | 4.0% | $\varepsilon_\parallel$ (1 kHz, 20° C.): | 4.3 |
| CCY-3-O2 | 6.0% | $\varepsilon_\perp$ (1 kHz, 20° C.): | 10.7 |
| CCY-3-O3 | 6.0% | $K_1$ (20° C.) [pN]: | 16.8 |
| CCY-4-O2 | 6.0% | $K_3$ (20° C.) [pN]: | 20.5 |
| CLY-3-O2 | 5.0% | $\gamma_1$ (20° C.) [mPa·s]: | |
| CPY-2-O2 | 5.0% | $V_0$ (20° C.) [V]: | 1.89 |
| CPY-3-O2 | 5.0% | | |
| PTY-3-O2 | 10% | | |
| PTY-5-O2 | 10% | | |
| CCP-V-1 | 7.0% | | |
| CCP-V2-1 | 7.0% | | |

| H43: Nematic host mixture (Δε < 0) | | | |
|---|---|---|---|
| Y-4O-O4 | 10% | Clearing point [° C.]: | 109 |
| CCY-3-O1 | 5.0% | Δn (589 nm, 20° C.): | 0.1405 |
| PTY-3-O2 | 3.0% | Δε (1 kHz, 20° C.): | −2 |
| PTY-3-O2 | 10% | $\varepsilon_\parallel$ (1 kHz, 20° C.): | 3.4 |
| PTY-5-O2 | 10% | $\varepsilon_\perp$ (1 kHz, 20° C.): | 5.4 |
| CP-3-O1 | 4.0% | $K_1$ (20° C.) [pN]: | 16.5 |
| CC-4-V | 15% | $K_3$ (20° C.) [pN]: | 19.9 |
| CC-3-V1 | 8.0% | $\gamma_1$ (20° C.) [mPa·s]: | |
| CCP-V-1 | 13% | $V_0$ (20° C.) [V]: | 3.34 |
| CCP-V2-1 | 13% | | |
| CPTP-3-1 | 4.5% | | |
| CPTP-3-2 | 4.5% | | |

| H44: Nematic host mixture (Δε < 0) | | | |
|---|---|---|---|
| CY-3-O4 | 13% | Clearing point [° C.]: | 107 |
| CCY-3-O1 | 4.0% | Δn (589 nm, 20° C.): | 0.082 |

| H44: Nematic host mixture (Δε < 0) | | | |
|---|---|---|---|
| CCY-3-O2 | 5.0% | Δε (1 kHz, 20° C.): | −2 |
| CCY-3-O3 | 5.0% | ε∥ (1 kHz, 20° C.): | 3 |
| CCY-4-O2 | 5.0% | ε⊥ (1 kHz, 20° C.): | 5 |
| CCY-5-O2 | 5.0% | $K_1$ (20° C.) [pN]: | 16.3 |
| CC-3-O1 | 13% | $K_3$ (20° C.) [pN]: | 19.2 |
| CC-4-V | 12% | $γ_1$ (20° C.) [mPa · s]: | |
| CC-3-V1 | 6.0% | $V_0$ (20° C.) [V]: | 3.29 |
| CCP-V-1 | 13% | | |
| CCP-V2-1 | 13% | | |
| CCZC-3-3 | 3.0% | | |
| CCEPC-3-3 | 3.0% | | |

| H45: Nematic host mixture (Δε < 0) | | | |
|---|---|---|---|
| Y-4O-O4 | 5.0% | Clearing point [° C.]: | 107 |
| CY-3-O4 | 15% | Δn (589 nm, 20° C.): | 0.0821 |
| CY-5-O4 | 14.5% | Δε (1 kHz, 20° C.): | −4.5 |
| CCY-3-O1 | 5.0% | ε∥ (1 kHz, 20° C.): | 3.7 |
| CCY-3-O2 | 6.0% | ε⊥ (1 kHz, 20° C.): | 8.2 |
| CCY-3-O3 | 6.0% | $K_1$ (20° C.) [pN]: | 16 |
| CCY-4-O2 | 6.0% | $K_3$ (20° C.) [pN]: | 17 |
| CCY-5-O2 | 6.0% | $γ_1$ (20° C.) [mPa · s]: | |
| CC-4-V | 8.5% | $V_0$ (20° C.) [V]: | 2.04 |
| CCZC-3-3 | 3.0% | | |
| CCZC-3-5 | 3.0% | | |
| CCZC-4-3 | 3.0% | | |
| CCZC-4-5 | 3.0% | | |
| CCOC-3-3 | 4.0% | | |
| CCEPC-3-3 | 4.0% | | |
| CCEPC-3-4 | 4.0% | | |
| CCEPC-3-5 | 4.0% | | |

| H46: Nematic host mixture (Δε < 0) | | | |
|---|---|---|---|
| B-2O-O5 | 4.0% | Clearing point [° C.]: | 75 |
| CPP-3-2 | 4.5% | Δn (589 nm, 20° C.): | 0.1095 |
| CC-3-V1 | 9.0% | Δε (1 kHz, 20° C.): | −3.1 |
| CC-3-O1 | 3.0% | ε∥ (1 kHz, 20° C.): | 3.6 |
| CC-3-4 | 9.0% | ε⊥ (1 kHz, 20° C.): | 6.7 |
| CC-3-5 | 9.0% | $K_1$ (20° C.) [pN]: | 14.5 |
| CCP-3-1 | 8.0% | $K_3$ (20° C.) [pN]: | 16.7 |
| CCP-V2-1 | 5.0% | $γ_1$ (20° C.) [mPa · s]: | 109 |
| CCY-3-O2 | 6.0% | $V_0$ (20° C.) [V]: | 2.43 |
| CPY-3-O2 | 10.5% | | |
| CY-3-O2 | 9.5% | | |
| CP-3-O1 | 4.5% | | |
| PY-3-O2 | 18% | | |

| H47: Nematic host mixture (Δε < 0) | | | |
|---|---|---|---|
| B-2O-O5 | 4.0% | Clearing point [° C.]: | 75.2 |
| CPP-3-2 | 12% | Δn (589 nm, 20° C.): | 0.1101 |
| CC-3-V1 | 9.0% | Δε (1 kHz, 20° C.): | −3.1 |
| CC-3-5 | 5.5% | ε∥ (1 kHz, 20° C.): | 3.6 |
| CCP-3-1 | 5.5% | ε⊥ (1 kHz, 20° C.): | 6.7 |
| CCP-V2-1 | 5.0% | $K_1$ (20° C.) [pN]: | 13 |
| CCY-3-O2 | 4.0% | $K_3$ (20° C.) [pN]: | 16.3 |
| CLY-3-O2 | 1.0% | $γ_1$ (20° C.) [mPa · s]: | 121 |
| CPY-2-O2 | 2.5% | $V_0$ (20° C.) [V]: | 2.39 |
| CPY-3-O2 | 10.5% | | |
| CY-3-O2 | 15% | | |
| CY-3-O4 | 11% | | |
| CP-3-O1 | 15% | | |

General Procedure for Mixture Examples

Polymerizable mixtures are prepared by adding to any of the nemtic host mixtures H1 to H47 above a polymerizable compound of the synthesis examples 1 to 6 (e.g. RM-3, 0.3%) and one or more self-alignment additives for vertical alignment selected from Table G (e.g. SA-20, 1.0%).

Mixture Example 1: Polymerisable Mixture P1

The polymerisable mixture P1 according to the present invention is prepared by adding a polymerisable compound RM-3 (0.30%) and the self-alignment additive SA-20 to nematic LC host mixture H1.

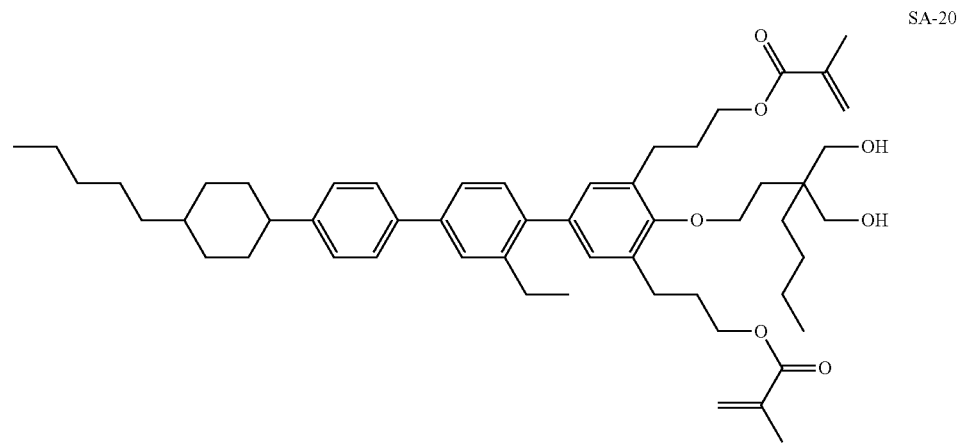 [SMILES: C=C(C)C(=O)OCCCc1cc(-c2ccc(-c3ccc(C4CCC(CCCCC)CC4)cc3)cc2CC)cc(CCCOC(=O)C(=C)C)c1OCCC(CO)(CO)CCCC]

SA-20

Comparative Mixture Example: Polymerisable Mixture C1

For comparison purpose, polymerisable mixture C1 is prepared by replacing the polymerisable compound by the compound RM-C1, which has a biphenyl core and no lateral substituent.

RM-C1

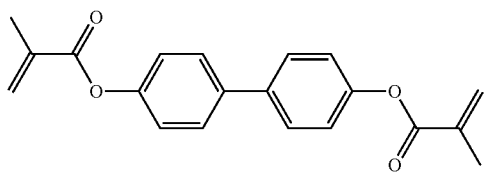

The concentrations of the RMs in the polymerisable mixtures are 0.3% by weight each. The compositions of the individual polymerisable mixtures are shown in Table 1.

TABLE 1

Mixtures comprising liquid-crystalline LC component B) (LC Host), polymerisable compounds (RM) and self-alignment additive (SA, polymerisable):

| Mix. No. | C1 | P1 |
|---|---|---|
| LC Host | H1 | H1 |
| RM | RM-C1 | RM-3 |
| wt. % RM | 0.30 | 0.30 |
| SA | SA-20 | SA-20 |
| wt. % SA | 1.0 | 1.0 |

Use Examples

The individual polymerisable mixtures are filled into PSA test cells, the RM is polymerised under application of a voltage, and several properties like residual RM content, VHR under backlight stress, tilt angle generation and tilt angle stability are measured.

Residual RM Measurement

The content of residual, unpolymerised RM (in % by weight) in the mixture after UV exposure is determined. The UV procedure is made in analogy to process conditions in panel manufacture (first UV curing for 2 min; second UV end-curing for 120 min)

For this purpose the polymerisable mixtures are filled into electrooptic test cells made of soda lime glass coated with an approximately 200 nm thick layer of ITO with a cell gap of 6-7 µm.

The test cells are illuminated for 2 min by a MH-lamp (UV-Cube 2000) using a 320 nm long pass filter (N-WG320) and a light intensity of 100 mW/cm², causing polymerisation of the RM. End-curing is made with a C-type light source for 120 min.

After polymerization the test cells are opened, and the mixture is dissolved and rinsed out of the test cell with 2 ml ethyl methyl ketone and analyzed by High Performance Liquid Chromatography (HPLC). The results are shown in Table 2.

TABLE 2

| | Residual RM content: | | |
|---|---|---|---|
| Mixture | UV Time/min | 0 | 2 + 120 |
| C1 | residual RM/% abs | 0.3 | 0.004 |
| P1 | | 0.3 | 0.000 |

For the polymerizable mixture P1 according to the invention, with the RM-3 polymerizable compound, no residual RM could be detected within the detection limit of about 0.001%. In the comparative mixture C1, with the RM-C1 polymerizable compound, 0.004% of RM-C1 could be detected.

From Table 2 it can be seen that, for polymerisable mixtures with RM-3 according to the invention, the amount of residual RM is significantly lower compared to polymerisable mixtures with conventional RM-C1.

Voltage Holding Ratio (VHR)

For measuring the VHR the polymerisable mixtures are filled into electrooptic test cells which consist of two AF glass substrates with an approximately 20 nm thick ITO layer.

The VHR is measured at 60° C. with application of a voltage of 1 V/60 Hz before and after illumination. The VHR is determined before and after UV process and after a backlight stress of 6 days. UV process for VHR measurements: Metal halide lamp, (100 mW/cm3, with 320 nm cut filter for 120 min) at 40° C. Backlight stress: storage below a high-power backlight at 40° C.

The difference in VHR between the different RMs, based on RM-C1 is expressed according to:

$$\Delta VHR = VHR_{RM} - VHR_{RM\text{-}C1}$$

A positive value corresponds to an improvement in VHR with respect to the reference C1 composition containing RM-C1, a negative value represents a decrease in VHR with respect to the reference.

The results are shown in Table 3.

TABLE 3

Difference of VHR values between sample and mixtures with reference RM-C1:

| | Δ VHR (%) | | |
|---|---|---|---|
| Mixture | before UV process illumination | After UV process | After 6 days backlight |
| P1 | 0 | 0 | 0 |

From Table 3 it can be seen that P1 according to the invention is able to maintain the VHR level of the reference C1 composition.

Tilt Angle Generation

For measuring the tilt angle generation the polymerisable mixtures are filled into electrooptic test cells made of two soda-lime glass substrates coated with an ITO electrode layer of approx. 200 nm thickness without VA-polyimide alignment layer. The cell gap is approx. 4 µm.

The test cells are illuminated by a MH-lamp (UV-Cube 2000) using a 320 nm long pass filter (N-WG320) and a light intensity of 100 mW/cm² at 20° C. with an applied square voltage of 24 VRMS (alternating current, 1 khz), causing polymerisation of the RM and a generation of a tilt angle. Illumination times are given in the respective tables. The generated tilt was measured after a period of time of 12 hours using the Mueller Matrix Polarimeter "AxoScan" from Axometrics. The results are shown in Table 4.

TABLE 4

| | Tilt angle generation: | | |
|---|---|---|---|
| Mixture | UV Time/min | 0 | 2 |
| C1 | Tilt/° | 90 | 82 |
| P1 | | 90 | 85 |

From Table 4 it can be seen that, in LC host H1 with RM-1 according to the invention, the tilt angle generation leads to a desirable tilt angle of 85° (5° deviation from vertical direction), while the comparative tilt angle is 8° from vertical, which is already somewhat outside the optimum range.

Tilt Stability

The mixtures are filled into test cells made of soda lime glass coated with a 200 nm layer of ITO and a 30 nm layer of poly imide (JALS-2096-R1). The polyimide layers are rubbed anti-parallel to each other. Cell gap is approx. 4 µm.

The tilt is generated via illumination by a metal halide lamp (UV-Cube 2000) using a 320 nm long pass filter (N-WG320) and a light intensity of 100 mW/cm² at 20° C. with an applied square voltage of 10 $V_{RMS}$ (1 khz). The generated tilt is measured after a period of time of 12 hours using the Mueller Matrix Polarimeter "AxoScan" from Axometrics.

For RM-C1 a pre-tilt of 84.8° was generated in mixture C1 and for RM-3 a tilt angle of 87.5° was generated in mixture P1. Then the cells were electrically stressed with a square wave of 10 VRMS at 1 kHz frequency for 168 h at 40° C. After a relaxation time of 10-20 min the tilt angles were measured again. The results are shown below in Table 5 according to the following equation:

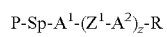

tilt$_{after\ stress}$−tilt$_{after\ tilt\ generation}$=Δ-tilt

The closer this value gets to 0, the more stable is the generated tilt. A high tilt stability is also an indicator for reduced image sticking in the display.

TABLE 5

Tilt Stability:

| Mixture | Δ Tilt/° |
|---------|----------|
| P1      | 0.5      |
| C1      | 0.5      |

From Table 5 it can be seen that the generated tilt with RM-3 is as stable as for the comparative RM-C1.

Overall the above results demonstrate that the RMs according to the present invention enable a fast UV-curing with complete polymerisation while maintaining a low ion content and high VHR in the mixture after UV-processing, and enable a tuned tilt angle generation with high tilt stability after electrical stress.

Thus, the RMs according to the present invention show a superior overall performance compared to RM of prior art.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosure[s] of all applications, patents and publications, cited herein and of corresponding European application No. 18192958.9, filed Sep. 6, 2018, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal (LC) medium comprising
   a polymerisable component A) comprising one or more polymerisable compounds of formula I,
   a liquid-crystalline LC component B) comprising one or more liquid-crystalline compounds, and
   one or more self-alignment additives for vertical alignment of formula II
   wherein the formula I is defined as:

$$P\text{-}Sp\text{-}A^1\text{-}(Z^1\text{-}A^2)_z\text{-}R \qquad I$$

in which:
   P a polymerisable group,
   Sp a spacer group or a single bond,
   $A^1$, $A^2$ benzene or naphthalene, which are optionally substituted by one or more groups L, $L^{11}$ or P-Sp-, provided that at least one group $A^1$ or $A^2$ is present and is substituted by at least one substituent $L^{11}$,
   $L^{11}$ —CH$_2$—O—CH$_3$, —CH$_2$—O—C$_2$H$_5$ or —CH$_2$—O—C$_3$H$_7$,
   $Z^1$ —O—, —S—, —CO—, —CO—O—, —O—CO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —CH=CF—, —CF=CH—, —C≡C—, —CH=CH—CO—O—, —O—CO—CH=CH—, —CH$_2$—CH$_2$—CO—O—, —O—CO—CH$_2$—CH$_2$—, —CR$^0$R$^{00}$—, or a single bond,
   $R^0$, $R^{00}$ H or alkyl having 1 to 12 C atoms,
   R H, L, $L^{11}$ or P-Sp-,
   L F, Cl, —CN, P-Sp- or straight chain, branched or cyclic alkyl having 1 to 25 C atoms, wherein one or more non-adjacent CH$_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by P-Sp-, F or Cl,
   z 0, 1, 2 or 3, and
   n1 1, 2, 3 or 4;
   wherein the formula II is defined as:

$$\text{MES-R}^a \qquad II$$

in which
   MES is a calamitic mesogenic group comprising two or more rings, which are connected directly or indirectly to each other or which are condensed to each other, which rings are optionally substituted and which mesogenic group is optionally substituted additionally by one or more polymerizable groups, which are connected to MES directly or via a spacer, and
   $R^a$ is a polar anchor group residing in a terminal position of the calamitic mesogenic group MES, the anchor group comprises at least one carbon atom and at least one group selected from —OH, —SH, —COOH, —CHO or primary or secondary amine function and the anchor group optionally comprises one or two polymerizable groups P.

2. The LC medium according to claim 1, wherein, in formula I:

-A$^1$-(Z-A$^2$)$_z$- is selected from the following formulae,

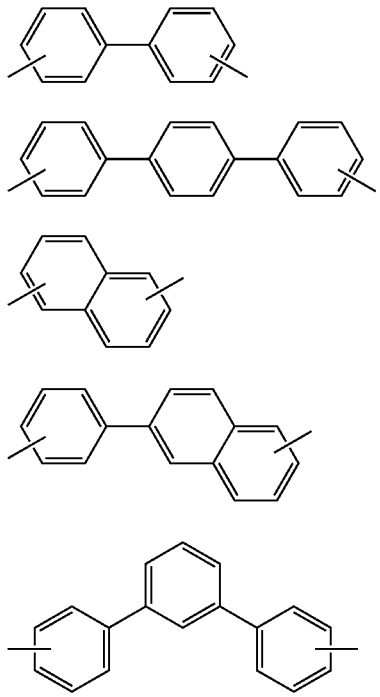

A1
A2
A3
A4
A5 wherein at least one ring is substituted by at least one group L$^{11}$ and the benzene and naphthalene rings are optionally further substituted by one or more groups L or P-Sp- as defined in claim 1.

3. The LC medium according to claim 1, wherein the compound of formula I is selected from compounds of the following subformulae:

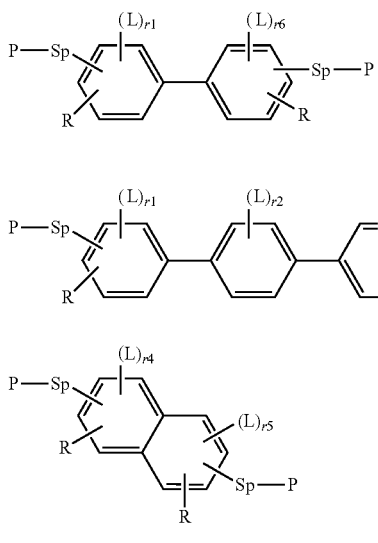

I1
I2
I3

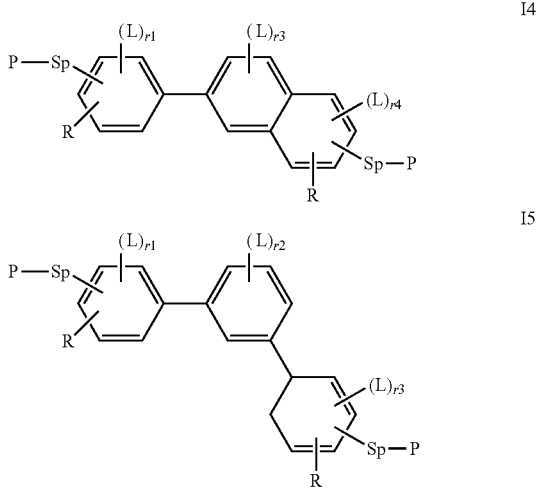

I4
I5 wherein
r1, r3, r6 are independently of each other 0, 1, 2 or 3,
r2 is 0, 1, 2, 3 or 4,
r4, r5 are independently of each other 0, 1 or 2,
provided that r1+r6≥1, r1+r2+r3≥1, r4+r5≥1, r1+r3+r4≥1,
at least one group L denotes —CH$_2$—O—CH$_3$, —CH$_2$—O—C$_2$H$_5$ or —CH$_2$—O—C$_3$H$_7$, and
wherein, in formula I1, at least one of the groups Sp is a single bond.

4. The LC medium according to claim 1, wherein the compound of formula I is selected from compounds of the following subformulae:

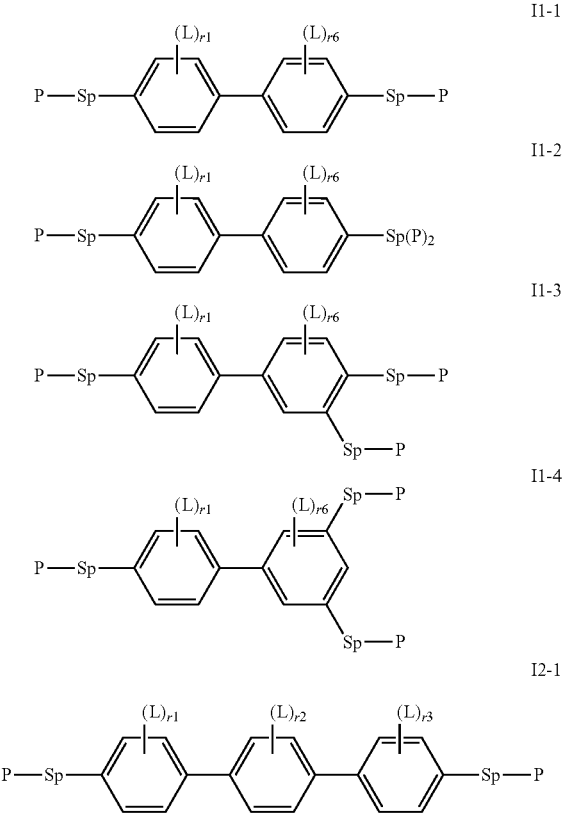

I1-1
I1-2
I1-3
I1-4
I2-1

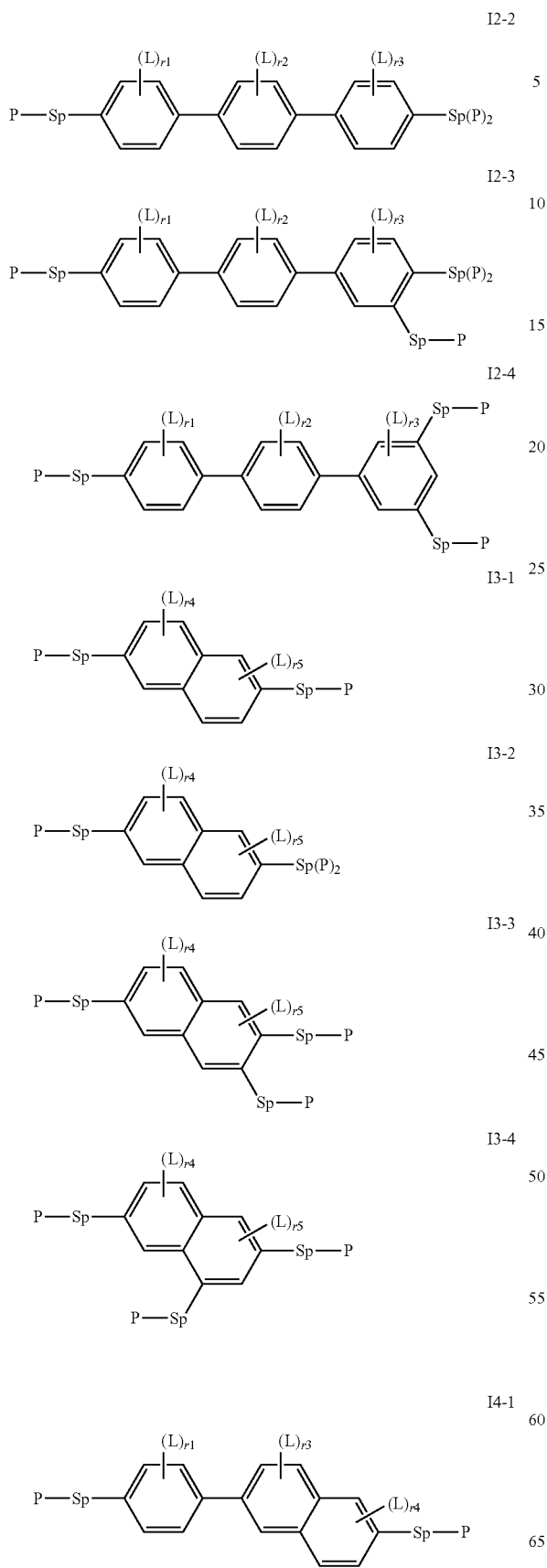
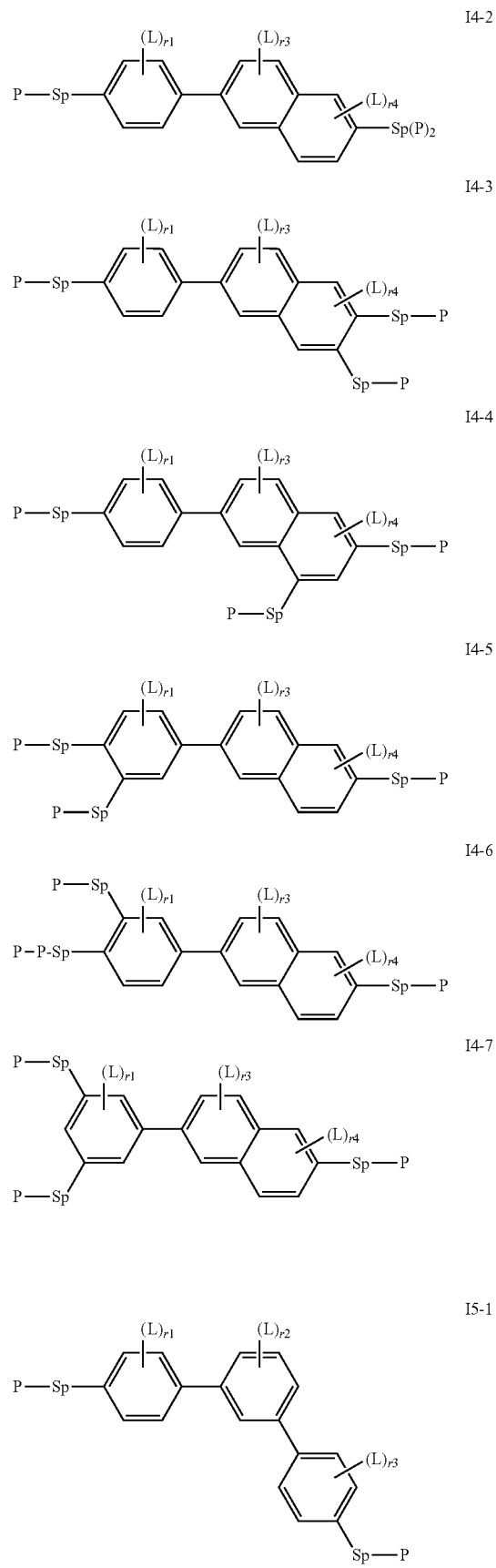

-continued

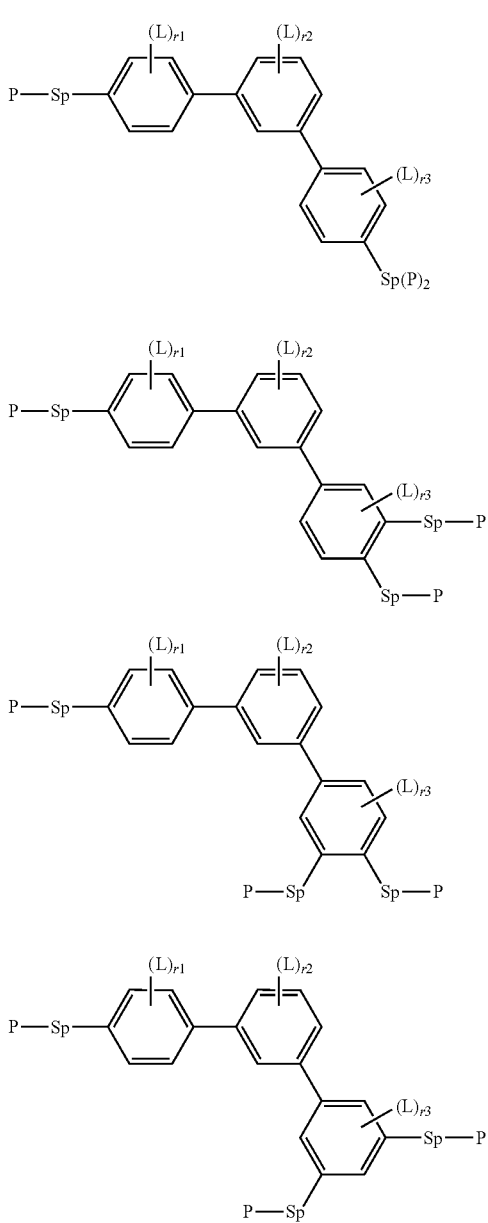

wherein:
r1, r3, r6 are independently of each other 0, 1, 2 or 3,
r2 is 0, 1, 2, 3 or 4,
r4, r5 are independently of each other 0, 1 or 2,
provided that r1+r6≥1, r1+r2+r3≥1, r4+r5≥1, r1+r3+r4≥1, and
at least one group L denotes —CH$_2$—O—CH$_3$, —CH$_2$—O—C$_2$H$_5$ or —CH$_2$—O—C$_3$H$_7$.

5. The LC medium according to claim 1, wherein, in formula I, P denotes acrylate or methacrylate.

6. The LC medium according to claim 1, wherein, in formula I, Sp is a single bond or denotes —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the A$^1$ group.

7. The LC medium according to claim 1, wherein said self-alignment additive for vertical alignment of formula II is of formula IIa R$^1$-[A$^2$-Z$^2$]$_m$-A$^1$-R$^a$    IIa in which
A$^1$, A$^2$ each, independently of one another, denote an aromatic, heteroaromatic, alicyclic or heterocyclic group, which may also contain fused rings, and which may also be mono- or polysubstituted by groups L$^1$ and/or -Sp-P, L$^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or P denotes a polymerizable group,
Sp denotes a spacer group or a single bond,
Z$^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(-Sp-P)—, —CH$_2$CH(-Sp-P)— or —CH(-Sp-P)CH(-Sp-P)—, n1 denotes 1, 2, 3 or 4,
m denotes 1, 2, 3, 4 or 5,
R$^0$ in each case, independently of one another, denotes alkyl having 1 to 12 C atoms,
R$^{00}$ in each case, independently of one another, denotes H or alkyl having 1 to 12 C atoms,
R$^1$ independently of one another, denotes H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P,
and
R$^a$ denotes a polar anchor group.

8. The liquid-crystalline medium according to claim 1, wherein said self-alignment additive for vertical alignment of formula II has an anchor group R$^a$ which is selected from the formulae:

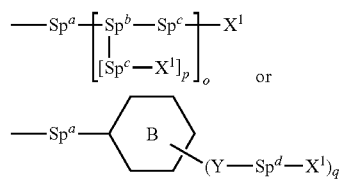

wherein
p denotes 1 or 2,
q denotes 2 or 3,
B denotes a substituted or unsubstituted ring system or condensed ring system,
Y independently of one another, denotes —O—, —S—, —C(O)—, —C(O)O—, —OC(O)—, —NR$^{11}$— or a single bond, o denotes 0 or 1, X$^1$ independently of one another, denotes H, alkyl, fluoroalkyl, OH, NH$_2$, NHR$^{11}$, NR$^{11}_2$, OR$^{11}$, C(O)OH, or —CHO, where at least one group X$^1$ denotes a radical selected from —OH, —NH$_2$, NHR$^{11}$, C(O)OH and —CHO, R$^{11}$ denotes alkyl having 1 to 12 C atoms, Sp$^a$, Sp$^c$, Sp$^d$ each, independently of one another, denote a spacer group or a single bond, and Sp$^b$ denotes a tri- or tetravalent group.

9. The liquid-crystalline medium according to claim 1, wherein said self-alignment additive for vertical alignment of formula II is selected from the compounds of formulae II-A to II-D,

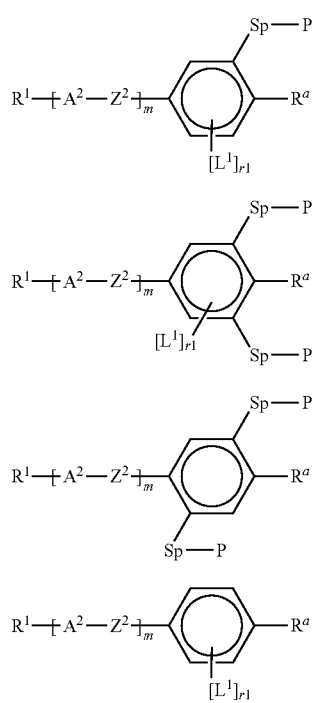

in which

A$^2$ each, independently of one another, denote an aromatic, heteroaromatic, alicyclic or heterocyclic group, which may also contain fused rings, and which may also be mono- or polysubstituted by groups L$^1$ and/or -Sp-P, L$^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, Sp denotes a spacer group or a single bond, Z$^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(-Sp-P)—, —CH$_2$CH(-Sp-P)—, or —CH(-Sp-P)CH(-Sp-P)—, n1 denotes 1, 2, 3 or 4, R$^0$ in each case, independently of one another, denotes alkyl having 1 to 12 C atoms, R$^{00}$ in each case, independently of one another, denotes H or alkyl having 1 to 12 C atoms, R$^1$ independently of one another, denotes H, halogen, straight-chain, branched or cyclic alkyl having 1 to 25 C atoms, in which, in addition, one or more non-adjacent CH$_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, R$^a$ denotes a polar anchor group, m 1, 2, 3 or 4, and r1 is 0, 1, 2, 3, or 4.

10. The LC medium according to claim 1, which comprises one or more liquid-crystalline LC component B) compounds of the formulae CY and/or PY:

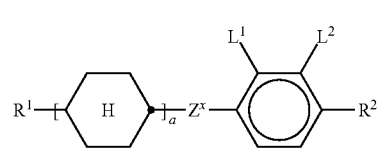

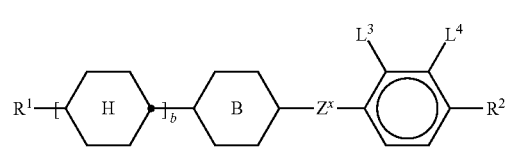

in which the individual radicals have the following meanings:

a denotes 1 or 2, b denotes 0 or 1,

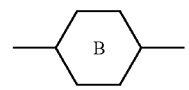

denotes

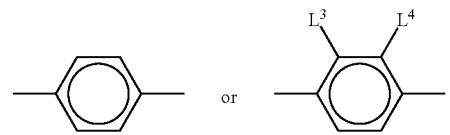

R$^1$ and R$^2$ each, independently of one another, denote alkyl having 1 to 12 C atoms, where, in addition, one or two non-adjacent CH$_2$ groups may be replaced by —O—, —CH=CH—, —CO—, —O—CO— or —CO—O— in such a way that O atoms are not linked directly to one another, Z^x denotes —CH=CH—, —CH$_2$O—, —OCH$_2$—, —CF$_2$O—, —OCF$_2$—, —O—, —CH$_2$—, —CH$_2$CH$_2$— or a single bond, and L$^{1-4}$ each, independently of one another, denote F, Cl, OCF$_3$, CF$_3$, CH$_3$, CH$_2$F, CHF$_2$.

11. The LC medium according to claim 1, which comprises one or more liquid-crystalline LC component B) compounds of the following formula:

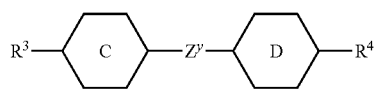  ZK in which the individual radicals have the following meanings:

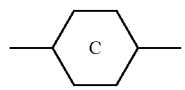

denotes

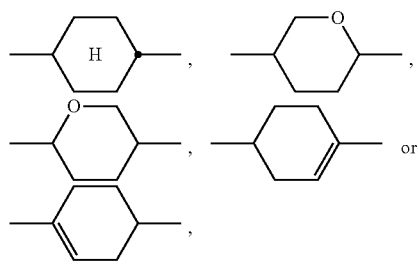

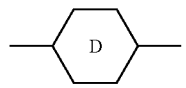

denotes

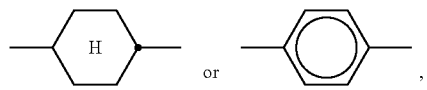

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$— or —CF=CF—.

12. The LC medium according to claim 1, wherein the polymerisable compounds of formula I have been polymerised.

13. A process of preparing an LC medium of claim 1, comprising the steps of mixing a liquid-crystalline component B) as defined in claim 1, with one or more compounds of formula I as defined in claim 1, with one or more compounds of formula II, and optionally with further liquid-crystalline compounds and/or additives.

14. An LC display comprising an LC medium as defined in claim 1.

15. The LC display of claim 14, which is a PSA display.

16. The LC display of claim 15, which is a PS-VA, PS-UB-FFS, PS-posi-VA or polymer stabilised SA-VA display.

17. The LC display of claim 15, which comprises two substrates, at least one which is transparent to light, an electrode provided on each substrate or two electrodes provided on only one of the substrates, and, located between the substrates, a layer of an LC medium as defined in claim 1, wherein the polymerisable compounds are polymerised between the substrates of the display.

18. A process for the production of an LC display according to claim 17, comprising the steps of providing the LC medium between the substrates of the display, and polymerising the polymerisable compounds.

19. The LC medium according to claim 5, wherein, in formula I, Sp is a single bond or denotes —(CH$_2$)$_{p2}$—, —(CH$_2$)$_{p2}$—O—, —(CH$_2$)$_{p2}$—CO—O—, —(CH$_2$)$_{p2}$—O—CO—, wherein p2 is 2, 3, 4, 5 or 6, and the O-atom or the CO-group, respectively, is connected to the A$^1$ group.

20. The LC medium according to claim 3, wherein said self-alignment additive for vertical alignment of formula II is of formula IIa $$R^1\text{-}[A^2\text{-}Z^2]_m\text{-}A^1\text{-}R^a \qquad \text{IIa}$$

in which

A$^1$, A$^2$ each, independently of one another, denote an aromatic, heteroaromatic, alicyclic or heterocyclic group, which may also contain fused rings, and which may also be mono- or polysubstituted by groups L$^1$ and/or -Sp-P, L$^1$ in each case, independently of one another, denotes F, Cl, Br, I, —CN, —NO$_2$, —NCO, —NCS, —OCN, —SCN, —C(=O)N(R$^0$)$_2$, —C(=O)R$^0$, optionally substituted silyl, optionally substituted aryl or cycloalkyl having 3 to 20 C atoms, or straight-chain or branched alkyl, alkoxy, alkylcarbonyl, alkoxycarbonyl, alkylcarbonyloxy or alkoxycarbonyloxy having up to 25 C atoms, in which, in addition, one or more H atoms may each be replaced by F or Cl, P denotes a polymerizable group, Sp denotes a spacer group or a single bond, Z$^2$ in each case, independently of one another, denotes a single bond, —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, —(CR$^0$R$^{00}$)$_{n1}$—, —CH(-Sp-P)—, —CH$_2$CH(-Sp-P)—, or —CH(-Sp-P)CH(-Sp-P)—, n1 denotes 1, 2, 3 or 4, m denotes 1, 2, 3, 4 or 5, R$^0$ in each case, independently of one another, denotes alkyl having 1 to 12 C atoms, R$^{00}$ in each case, independently of one another, denotes H or alkyl having 1 to 12 C atoms, $R^1$ independently of one another, denotes H, halogen, straight-chain, branched or cyclic alkyl having 1 to 25 C atoms, in which, in addition, one or more non-adjacent $CH_2$ groups may each be replaced by —O—, —S—, —CO—, —CO—O—, —O—CO—, or —O—CO—O— in such a way that O and/or S atoms are not linked directly to one another and in which, in addition, one or more H atoms may each be replaced by F or Cl, or a group -Sp-P, and $R^a$ denotes a polar anchor group.

\* \* \* \* \*